US012284498B2

(12) United States Patent
Sarode et al.

(10) Patent No.: US 12,284,498 B2
(45) Date of Patent: Apr. 22, 2025

(54) ROUTINES FOR PLAYBACK DEVICES

(71) Applicant: Sonos, Inc., Santa Barbara, CA (US)

(72) Inventors: Shilpa Sarode, Cambridge, MA (US); Joshua Salit, Danbury, CT (US); Nikit Waghela, New York, NY (US); Graham Bullis, Seattle, WA (US); Brandon Wright, Santa Barbara, CA (US); Luis Vega, Cambridge, MA (US)

(73) Assignee: SONOS, INC., Goleta, UT (US)

( * ) Notice: Subject to any disclaimer, the term of this patent is extended or adjusted under 35 U.S.C. 154(b) by 60 days.

(21) Appl. No.: 17/953,900

(22) Filed: Sep. 27, 2022

(65) Prior Publication Data
US 2023/0102244 A1 Mar. 30, 2023

Related U.S. Application Data

(60) Provisional application No. 63/261,823, filed on Sep. 29, 2021.

(51) Int. Cl.
*H04R 3/12* (2006.01)
*G06F 3/16* (2006.01)
*H04R 27/00* (2006.01)

(52) U.S. Cl.
CPC ............. *H04R 3/12* (2013.01); *G06F 3/165* (2013.01); *H04R 27/00* (2013.01);
(Continued)

(58) Field of Classification Search
CPC .... H04R 3/12; H04R 27/00; H04R 2227/003; H04R 2227/005; H04R 2420/07; G06F 3/165
See application file for complete search history.

(56) References Cited

U.S. PATENT DOCUMENTS 5,440,644 A  8/1995  Farinelli et al.
5,761,320 A  6/1998  Farinelli et al.
(Continued)

FOREIGN PATENT DOCUMENTS

EP    1389853 A1    2/2004
WO    200153994    7/2001
WO    2003093950 A2    11/2003

OTHER PUBLICATIONS

International Search Report and Written Opinion received for PCT Patent Application No. PCT/US22/44840, mailed on Jan. 20, 2023, 8 pages.

(Continued)

*Primary Examiner* — Akelaw Teshale
(74) *Attorney, Agent, or Firm* — Workman Nydegger

(57) ABSTRACT

A control device receives one or more first user inputs associating a particular playback mode with one or more playback devices and one or more user-defined acoustic parameters for particular media content that is associated with the particular playback mode. The control device associates a particular trigger condition with the particular playback mode. The particular trigger condition comprises a condition that causes the particular playback mode to be executed. The control device receives one or more second user inputs to activate a particular routine that is associated with the particular playback mode. After receiving the one or more second user inputs, the control device transmits a message that causes the one or more playback devices to play back the particular media content according to the one or more user-defined acoustic parameters.

20 Claims, 37 Drawing Sheets

(52) U.S. Cl.
CPC .. *H04R 2227/003* (2013.01); *H04R 2227/005* (2013.01); *H04R 2420/07* (2013.01)

(56) References Cited

U.S. PATENT DOCUMENTS

| | | | |
|---|---|---|---|
| 5,923,902 | A | 7/1999 | Inagaki |
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 * | 6/2004 | Chang .................. H04W 4/08 455/45 |
| 6,778,869 | B2 | 8/2004 | Champion |
| 7,130,608 | B2 * | 10/2006 | Hollstrom ......... H04M 1/72403 455/403 |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1 * | 8/2009 | Lambourne ............. G06F 3/165 700/94 |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington |
| 8,483,853 | B1 * | 7/2013 | Lambourne ............ H04H 60/80 709/217 |
| 8,942,252 | B2 | 1/2015 | Balassanian et al. |
| 2001/0005446 | A1 | 6/2001 | Uchikoga |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty, Jr. |
| 2004/0024478 | A1 | 2/2004 | Hans et al. |
| 2007/0142944 | A1 * | 6/2007 | Goldberg ............. G10H 1/0025 700/94 |
| 2014/0237222 | A1 * | 8/2014 | Bull .................. H04N 21/4858 713/1 |
| 2019/0324890 | A1 | 10/2019 | Li et al. |
| 2019/0373313 | A1 | 12/2019 | Jackson et al. |
| 2023/0095902 | A1 | 3/2023 | Sarode et al. |

OTHER PUBLICATIONS

AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
*Sonos, Inc. v. D&M Holdings*, DI 219, Claim Construction Opinion (Jan. 12, 2017) (24 pages).
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
International Preliminary Report on Patentability received for PCT Patent Application No. PCT/US22/44840, mailed on Apr. 11, 2024, 7 pages.

* cited by examiner

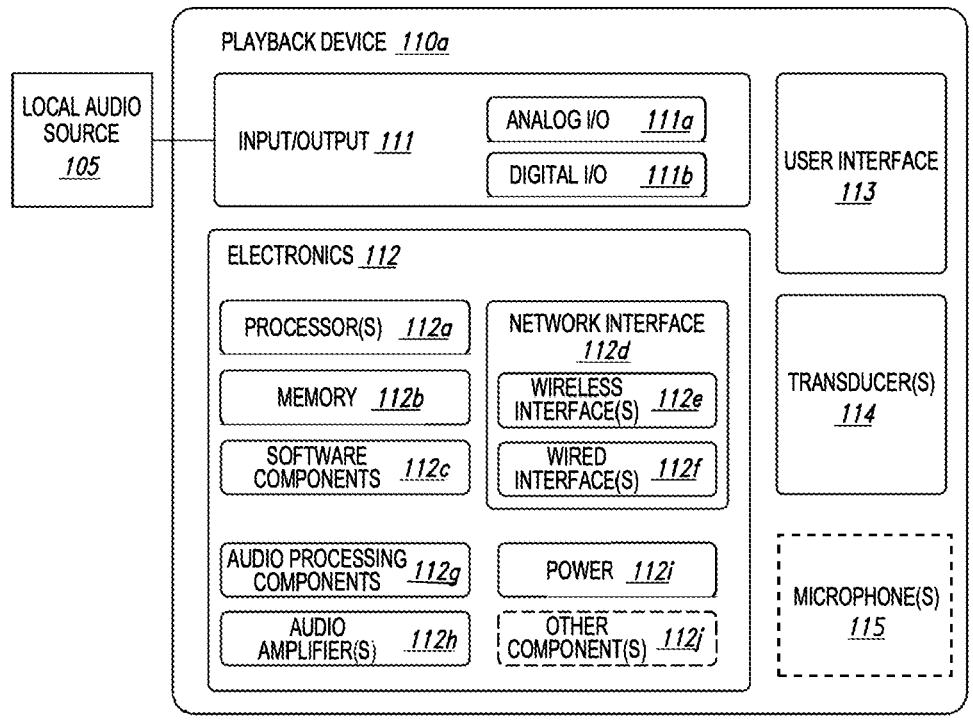
FIG. 1C
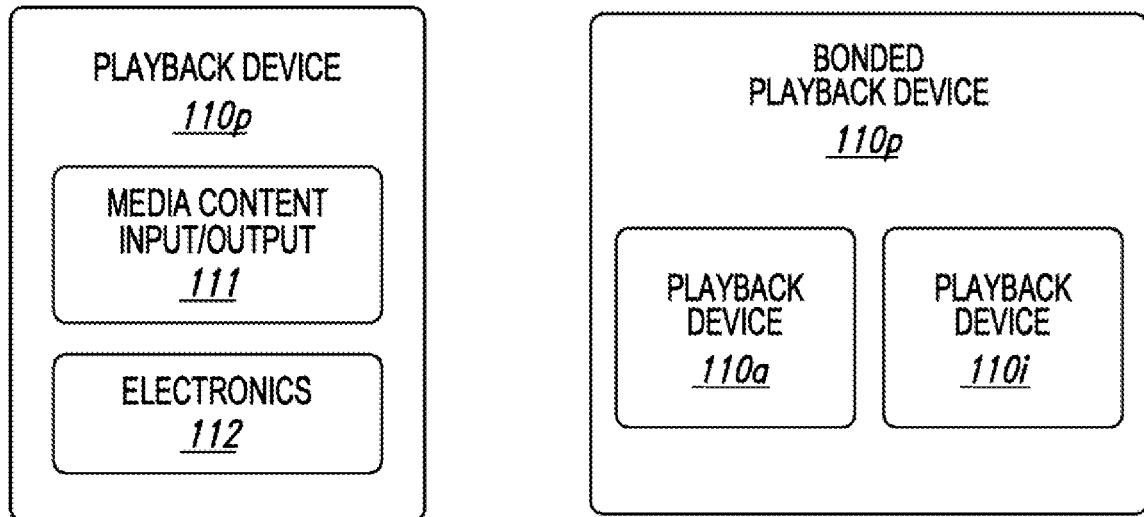
FIG. 1D
FIG. 1E

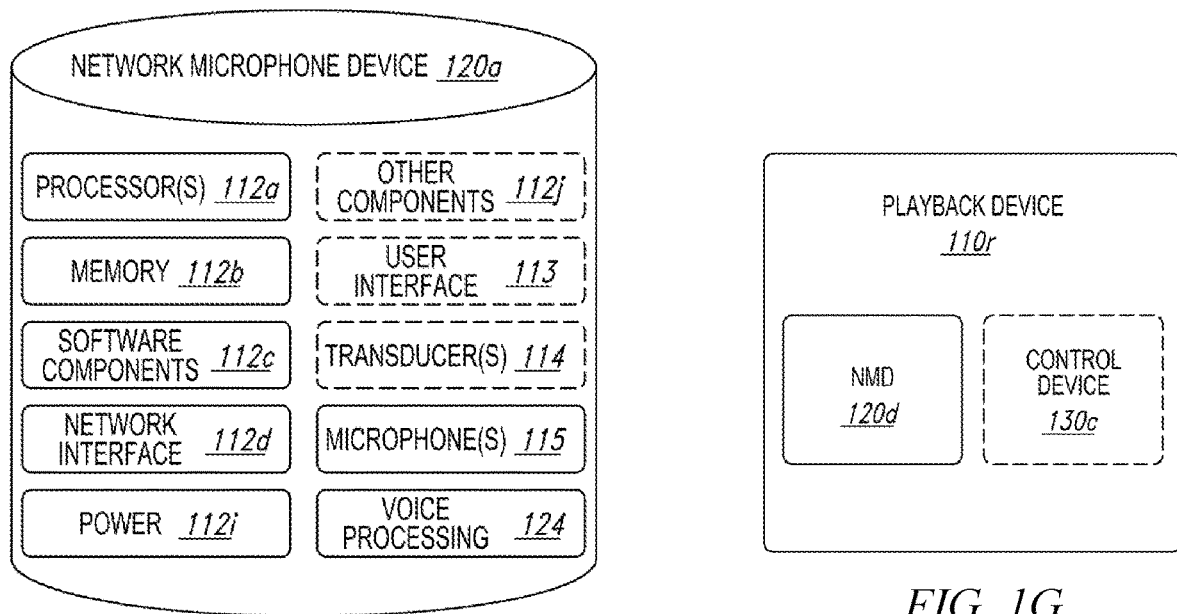
*FIG. 1F*
*FIG. 1G*
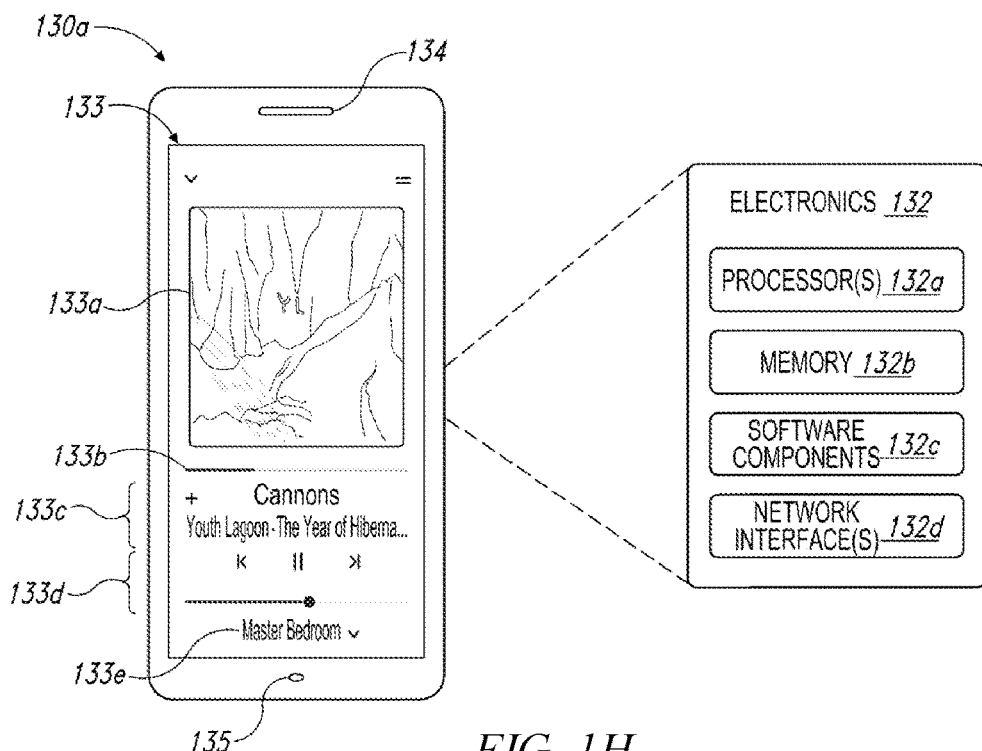
*FIG. 1H*

ROUTINES FOR PLAYBACK DEVICES

CROSS-REFERENCE TO RELATED APPLICATIONS

This application claims the benefit of and priority to U.S. Provisional Patent Application Ser. No. 63/261,823 filed on Sep. 29, 2021, and entitled "ROUTINES FOR PLAYBACK DEVICES," which application is expressly incorporated herein by reference in its entirety.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 1C is a block diagram of a playback device.

FIG. 1D is a block diagram of a playback device.

FIG. 1E is a block diagram of a network microphone device.

FIG. 1F is a block diagram of a network microphone device.

FIG. 1G is a block diagram of a playback device.

FIG. 1H is a partial schematic diagram of a control device.

Figure 1A:
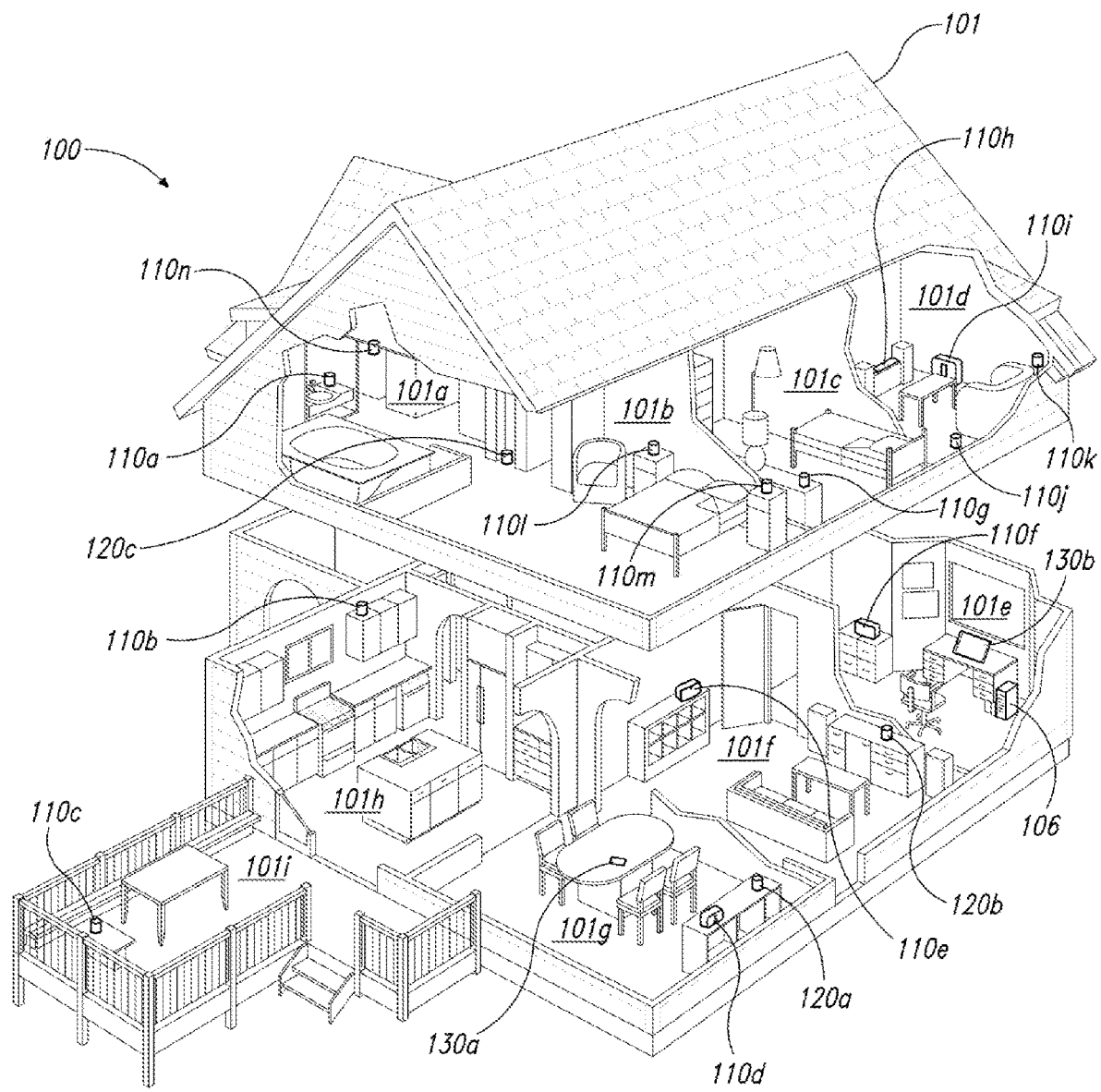
FIG. 1A is a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Embodiments described herein relate to the execution of routines for controlling one or more playback devices. A particular set of routines may be used to define an operating mode of the one or more playback devices. The operating mode may be associated with a trigger condition that when met causes the one or more playback devices to behave in a way that is defined by the particular set of routines.

The routines may be executed or encoded at a playback device, at a control device, at a server, at another device, or at any combination thereof. Further, the routines may be partially encoded prior to being sent to the one or more playback devices for final execution. The routines may cause one or more playback devices to collaboratively perform a function. When the routines utilize multiple playback devices, the multiple playback devices may perform the exact same functions or may perform different functions.

In some embodiments, for example, a playback device comprises a communication interface, at least one processor; and at least one non-transitory computer-readable medium comprising program instructions that are executable by the at least one processor such that the playback device is configured to perform one or more acts. For example, after receiving an operating mode indication, the program instructions cause the playback device to operate within a particular operating mode that is selected from a plurality of operating modes. Each operating mode within the plurality of operating modes causes the playback device to operate in a different configuration. The program instructions cause the playback device to access a particular set of routines that is associated with the particular operating mode. The particular set of routines comprise one or more routines that cause the playback device to play one or more audio files in a particular manner. Additionally, the particular set of routines comprise one or more user interface interactions configured to cause the playback device to advance between the one or more routines within the particular set of routines. Additionally, the program instructions cause the playback device to map the one or more user interface interactions to a user interface associated with the playback device. Further the program instructions cause the playback device to execute at least one routine selected from the one or more routines.

Additionally, in some embodiments a control device comprises a communication interface, at least one processor, and at least one non-transitory computer-readable medium comprising program instructions that are executable by the at least one processor such that the playback device is configured to perform one or more acts. For example, the program instructions cause the control device to receive through the configuration interface a user input associating a particular routine with a particular playback device. The particular routine comprises instructions that are configured to cause the particular playback device to play one or more audio files. Additionally, the particular routine comprises one or more audio variables that configure the particular playback device to play the one or more audio files in a particular manner. The program instructions also cause the control device to associate a particular trigger condition with the particular routine. The particular trigger condition comprises a condition that causes the particular routine to be executed. Further, the computer instructions cause the control device to transmit the particular routine to a server.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110a is first introduced and discussed with reference to FIG. 1A. Many of the details, dimensions, angles, and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110a-n), one or more network microphone devices 120 ("NMDs") (identified individually as NMDs 120a-c), and one or more control devices 130 (identified individually as control devices 130a and 130b).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term "NMD" (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 100a) in synchrony with a second playback device (e.g., the playback device 100b). Interactions between the playback devices 110, NMDs 120, and/or control devices 130 of the media playback system 100 configured in accordance with the various embodiments of the disclosure are described in greater detail below with respect to FIGS. 1B-6.

In the illustrated embodiment of FIG. 1A, the environment 101 comprises a household having several rooms, spaces, and/or playback zones, including (clockwise from upper left) a master bathroom 101a, a master bedroom 101b, a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed, to form, for example, the configuration shown in FIG. 1A. Each zone may be given a name according to a different room or space such as the office 101e, master bathroom 101a, master bedroom 101b, the second bedroom 101c, kitchen 101h, dining room 101g, living room 101f, and/or the balcony 101i. In some aspects, a single playback zone may include multiple rooms or spaces. In certain aspects, a single room or space may include multiple playback zones.

In the illustrated embodiment of FIG. 1A, the master bathroom 101a, the second bedroom 101c, the office 101e, the living room 101f, the dining room 101g, the kitchen 101h, and the outdoor patio 101i each include one playback device 110, and the master bedroom 101b and the den 101d include a plurality of playback devices 110. In the master bedroom 101b, the playback devices 110l and 110m may be configured, for example, to play back audio content in synchrony as individual ones of playback devices 110, as a bonded playback zone, as a consolidated playback device, and/or any combination thereof. Similarly, in the den 101d, the playback devices 110h-j can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B and 1E-1M.

In some aspects, one or more of the playback zones in the environment 101 may each be playing different audio content. For instance, a user may be grilling on the patio 101i and listening to hip hop music being played by the playback device 110c while another user is preparing food in the kitchen 101h and listening to classical music played by the playback device 110b. In another example, a playback zone may play the same audio content in synchrony with another playback zone. For instance, the user may be in the office 101e listening to the playback device 110f playing back the same hip-hop music being played back by playback device 110c on the patio 101i. In some aspects, the playback devices 110c and 110f play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
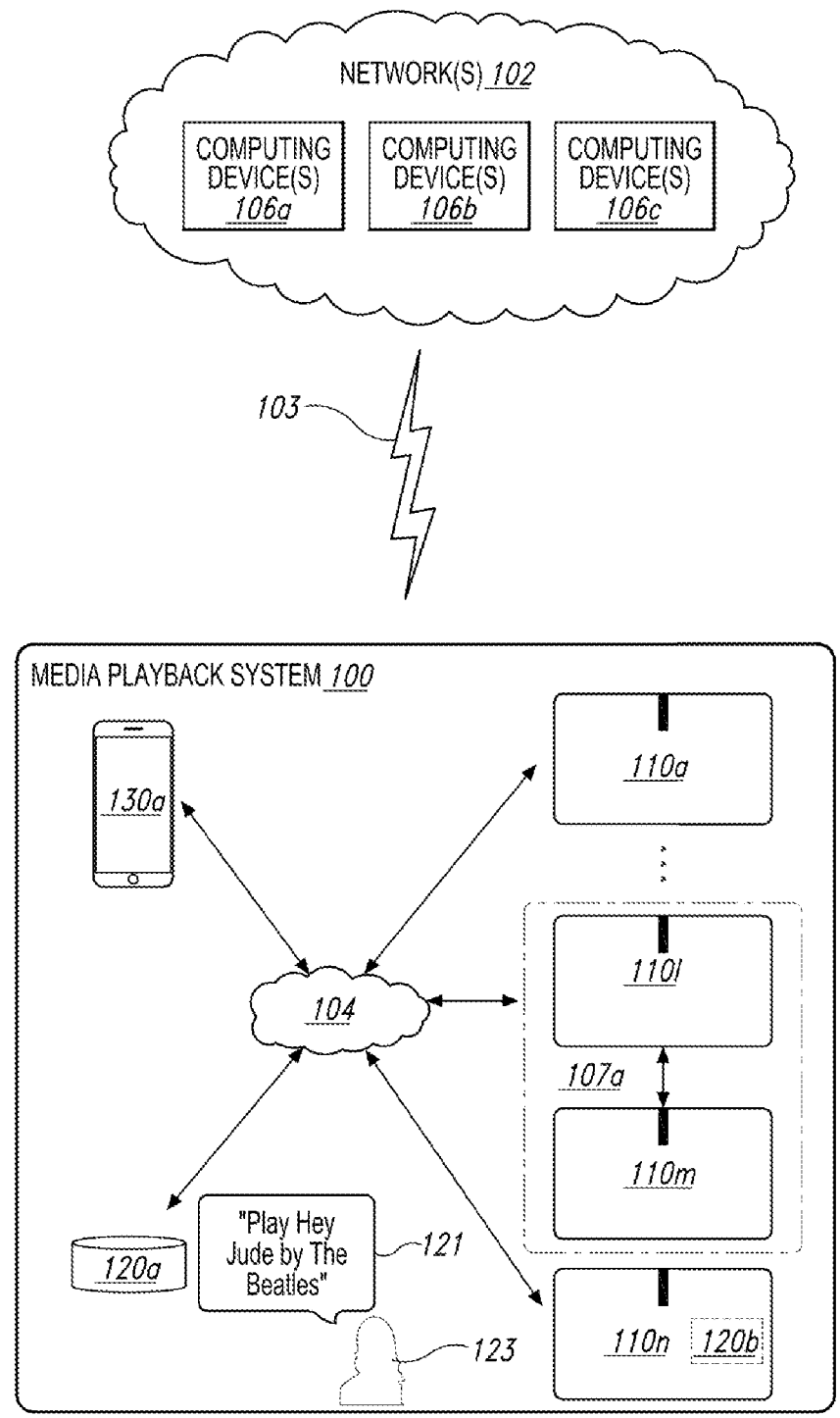
FIG. 1B is a schematic diagram of the media playback system of FIG. 1A and one or more networks.
Figure 1I:
FIGS. 1I through 1L are schematic diagrams of corresponding media playback system zones.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some embodiments, the cloud network 102 is further configured to receive data (e.g., voice input data) from the media playback system 100 and correspondingly transmit commands and/or media content to the media playback system 100.

The cloud network 102 comprises computing devices 106 (identified separately as a first computing device 106a, a second computing device 106b, and a third computing device 106c). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices. Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household communication network (e.g., a household WiFi network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct connections, PANs, telecommunication networks, and/or other suitable communication links. The network 104 may be referred to herein as a "local communication network" to differentiate the network 104 from the cloud network 102 that couples the media playback system 100 to remote devices, such as cloud services.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110 and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110l and 110m comprise a group 107a. The playback devices 110l and 110m can be positioned in different rooms in a household and be grouped together in the group 107a on a temporary or permanent basis based on user input received at the control device 130a and/or another control device 130 in the media playback system 100. When arranged in the group 107a, the playback devices 110l and 110m can be configured to play back the same or similar audio content in synchrony from one or more audio content sources. In certain embodiments, for example, the group 107a comprises a bonded zone in which the playback devices 110l and 110m comprise left audio and right audio channels, respectively, of multi-channel audio content, thereby producing or enhancing a stereo effect of the audio content. In some embodiments, the group 107a includes additional playback devices 110. In other embodiments, however, the media playback system 100 omits the group 107a and/or other grouped arrangements of the playback devices 110. Additional details regarding groups and other arrangements of playback devices are described in further detail below with respect to FIGS. 1-I through 1M.

The media playback system 100 includes the NMDs 120a and 120d, each comprising one or more microphones configured to receive voice utterances from a user. In the illustrated embodiment of FIG. 1B, the NMD 120a is a standalone device and the NMD 120d is integrated into the playback device 110n. The NMD 120a, for example, is configured to receive voice input 121 from a user 123. In some embodiments, the NMD 120a transmits data associated with the received voice input 121 to a voice assistant service (VAS) configured to (i) process the received voice input data and (ii) facilitate one or more operations on behalf of the media playback system 100.

In some aspects, for example, the computing device 106c comprises one or more modules and/or servers of a VAS (e.g., a VAS operated by one or more of SONOS®, AMAZON®, GOOGLE® APPLE®, MICROSOFT®). The computing device 106c can receive the voice input data from the NMD 120a via the network 104 and the links 103.

In response to receiving the voice input data, the computing device 106c processes the voice input data (i.e., "Play Hey Jude by The Beatles"), and determines that the processed voice input includes a command to play a song (e.g., "Hey Jude"). In some embodiments, after processing the voice input, the computing device 106c accordingly transmits commands to the media playback system 100 to play back "Hey Jude" by the Beatles from a suitable media service (e.g., via one or more of the computing devices 106) on one or more of the playback devices 110. In other embodiments, the computing device 106c may be configured to interface with media services on behalf of the media playback system 100. In such embodiments, after processing the voice input, instead of the computing device 106c transmitting commands to the media playback system 100 causing the media playback system 100 to retrieve the requested media from a suitable media service, the computing device 106c itself causes a suitable media service to provide the requested media to the media playback system 100 in accordance with the user's voice utterance.

b. Suitable Playback Devices

FIG. 1C is a block diagram of the playback device 110a comprising an input/output 111 (also referred to herein as a "communication interface"). The input/output 111 can include an analog I/O 111a (e.g., one or more wires, cables, and/or other suitable communication links configured to carry analog signals) and/or a digital I/O 111b (e.g., one or more wires, cables, or other suitable communication links configured to carry digital signals). In some embodiments, the analog I/O 111a is an audio line-in input connection comprising, for example, an auto-detecting 3.5 mm audio line-in connection. In some embodiments, the digital I/O 111b comprises a Sony/Philips Digital Interface Format (S/PDIF) communication interface and/or cable and/or a Toshiba Link (TOSLINK) cable. In some embodiments, the digital I/O 111b comprises a High-Definition Multimedia Interface (HDMI) interface and/or cable. In some embodiments, the digital I/O 111b includes one or more wireless communication links comprising, for example, a radio frequency (RF), infrared, WiFi, Bluetooth, or another suitable communication protocol. In certain embodiments, the analog I/O 111a and the digital 111b comprise interfaces (e.g., ports, plugs, jacks) configured to receive connectors of cables transmitting analog and digital signals, respectively, without necessarily including cables.

The playback device 110a, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110a does not include an input/output 111 and receives all audio content via the network 104.

The playback device 110a further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 are configured to receive audio from an audio source (e.g., the local audio source 105) via the input/output 111 or one or more of the computing devices 106a-c via the network 104 (FIG. 1B), amplify the received audio, and output the amplified audio for playback via one or more of the transducers 114. In some embodiments, the playback device 110a optionally includes one or more microphones 115 (e.g., a single microphone, a plurality of microphones, a microphone array) (hereinafter referred to as "the microphones 115"). In certain embodiments, for example, the playback device 110a having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112a (referred to hereinafter as "the processors 112a"), memory 112b, software components 112c, a network interface 112d, one or more audio processing components 112g (referred to hereinafter as "the audio components 112g"), one or more audio amplifiers 112h (referred to hereinafter as "the amplifiers 112h"), and power 112i (e.g., one or more power supplies, power cables, power receptacles, batteries, induction coils, Power-over Ethernet (POE) interfaces, and/or other suitable sources of electric power). In some embodiments, the electronics 112 optionally include one or more other components 112j (e.g., one or more sensors, video displays, touchscreens, battery charging bases).

The processors 112a can comprise clock-driven computing component(s) configured to process data, and the memory 112b can comprise a computer-readable medium (e.g., a tangible, non-transitory computer-readable medium loaded with one or more of the software components 112c) configured to store instructions for performing various operations and/or functions. The processors 112a are configured to execute the instructions stored on the memory 112b to perform one or more of the operations. The operations can include, for example, causing the playback device 110a to retrieve audio data from an audio source (e.g., one or more of the computing devices 106a-c (FIG. 1B)), and/or another one of the playback devices 110. In some embodiments, the operations further include causing the playback device 110a to send audio data to another one of the playback devices 110a and/or another device (e.g., one of the NMDs 120). Certain embodiments include operations causing the playback device 110a to pair with another of the one or more playback devices 110 to enable a multi-channel audio environment (e.g., a stereo pair, a bonded zone).

The processors 112a can be further configured to perform operations causing the playback device 110a to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110a and the other one or more other playback devices 110. Additional details regarding audio playback synchronization among playback devices can be found, for example, in U.S. Pat. No. 8,234,395, which was incorporated by reference above.

In some embodiments, the memory 112b is further configured to store data associated with the playback device 110a, such as one or more zones and/or zone groups of which the playback device 110a is a member, audio sources accessible to the playback device 110a, and/or a playback queue that the playback device 110a (and/or another of the one or more playback devices) can be associated with. The stored data can comprise one or more state variables that are periodically updated and used to describe a state of the playback device 110a. The memory 112b can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112d is configured to facilitate a transmission of data between the playback device 110a and one or more other devices on a data network such as, for example, the links 103 and/or the network 104 (FIG. 1B). The network interface 112d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112d can parse the digital packet data such that the electronics 112 properly receives and processes the data destined for the playback device 110a.

In the illustrated embodiment of FIG. 1C, the network interface 112d comprises one or more wireless interfaces 112e (referred to hereinafter as "the wireless interface 112e"). The wireless interface 112e (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some embodiments, the network interface 112d optionally includes a wired interface 112f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112d includes the wired interface 112f and excludes the wireless interface 112e. In some embodiments, the electronics 112 excludes the network interface 112d altogether and transmits and receives media content and/or other data via another communication path (e.g., the input/output 111).

The audio components 112g are configured to process and/or filter data comprising media content received by the electronics 112 (e.g., via the input/output 111 and/or the network interface 112d) to produce output audio signals. In some embodiments, the audio processing components 112g comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112g can comprise one or more subcomponents of the processors 112a. In some embodiments, the electronics 112 omits the audio processing components 112g. In some aspects, for example, the processors 112a execute instructions stored on the memory 112b to perform audio processing operations to produce the output audio signals.

The amplifiers 112h are configured to receive and amplify the audio output signals produced by the audio processing components 112g and/or the processors 112a. The amplifiers 112h can comprise electronic devices and/or components configured to amplify audio signals to levels sufficient for driving one or more of the transducers 114. In some embodiments, for example, the amplifiers 112h include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112h comprise a suitable combination of two or more of the foregoing types of power amplifiers. Moreover, in some embodiments, individual ones of the amplifiers 112h correspond to individual ones of the transducers 114. In other embodiments, however, the electronics 112 includes a single one of the amplifiers 112h configured to output amplified audio signals to a plurality of the transducers 114. In some other embodiments, the electronics 112 omits the amplifiers 112h.

The transducers 114 (e.g., one or more speakers and/or speaker drivers) receive the amplified audio signals from the amplifier 112h and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

By way of illustration, SONOS, Inc. presently offers (or has offered) for sale certain playback devices including, for example, a "SONOS ONE," "PLAY:1," "PLAY:3," "PLAY:5," "PLAYBAR," "PLAYBASE," "CONNECT:AMP," "CONNECT," and "SUB." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110p comprising the input/output 111 and electronics 112 without the user interface 113 or transducers 114.

FIG. 1E is a block diagram of a bonded playback device 110q comprising the playback device 110a (FIG. 1C) sonically bonded with the playback device 110i (e.g., a subwoofer) (FIG. 1A). In the illustrated embodiment, the playback devices 110a and 110i are separate ones of the playback devices 110 housed in separate enclosures. In some embodiments, however, the bonded playback device 110q comprises a single enclosure housing both the playback devices 110a and 110i. The bonded playback device 110q can be configured to process and reproduce sound differently than an unbonded playback device (e.g., the playback device 110a of FIG. 1C) and/or paired or bonded playback devices (e.g., the playback devices 110l and 110m of FIG. 1B). In some embodiments, for example, the playback device 110a is full-range playback device configured to render low frequency, mid-range frequency, and high frequency audio content, and the playback device 110i is a subwoofer configured to render low frequency audio content. In some aspects, the playback device 110a, when bonded with the first playback device, is configured to render only the mid-range and high frequency components of a particular audio content, while the playback device 110i renders the low frequency component of the particular audio content. In some embodiments, the bonded playback device 110q includes additional playback devices and/or another bonded playback device. Additional playback device embodiments are described in further detail below with respect to FIGS. 2A-3D.

c. Suitable Network Microphone Devices (NMDs)

FIG. 1F is a block diagram of the NMD 120a (FIGS. 1A and 1B). The NMD 120a includes one or more voice processing components 124 (hereinafter "the voice components 124") and several components described with respect to the playback device 110a (FIG. 1C) including the processors 112a, the memory 112b, and the microphones 115. The NMD 120a optionally comprises other components also included in the playback device 110a (FIG. 1C), such as the user interface 113 and/or the transducers 114. In some embodiments, the NMD 120a is configured as a media playback device (e.g., one or more of the playback devices 110), and further includes, for example, one or more of the audio components 112g (FIG. 1C), the amplifiers 114, and/or other playback device components. In certain embodiments, the NMD 120a comprises an Internet of Things (IoT) device such as, for example, a thermostat, alarm panel, fire and/or smoke detector, etc. In some embodiments, the NMD 120a comprises the microphones 115, the voice processing 124, and only a portion of the components of the electronics 112 described above with respect to FIG. 1B. In some aspects, for example, the NMD 120a includes the processor 112a and the memory 112b (FIG. 1B), while omitting one or more other components of the electronics 112. In some embodiments, the NMD 120a includes additional components (e.g., one or more sensors, cameras, thermometers, barometers, hygrometers).

In some embodiments, an NMD can be integrated into a playback device. FIG. 1G is a block diagram of a playback device 110r comprising an NMD 120d. The playback device 110r can comprise many or all of the components of the playback device 110a and further include the microphones 115 and voice processing 124 (FIG. 1F). The playback device 110r optionally includes an integrated control device 130c. The control device 130c can comprise, for example, a user interface (e.g., the user interface 113 of FIG. 1B) configured to receive user input (e.g., touch input, voice input) without a separate control device. In other embodiments, however, the playback device 110r receives commands from another control device (e.g., the control device 130a of FIG. 1B). Additional NMD embodiments are described in further detail below with respect to FIGS. 3A-3F.

Referring again to FIG. 1F, the microphones 115 are configured to acquire, capture, and/or receive sound from an environment (e.g., the environment 101 of FIG. 1A) and/or a room in which the NMD 120a is positioned. The received sound can include, for example, vocal utterances, audio played back by the NMD 120a and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home. Additional description regarding receiving and processing voice input data can be found in further detail below with respect to FIGS. 3A-3F.

d. Suitable Control Devices

FIG. 1H is a partial schematic diagram of the control device 130a (FIGS. 1A and 1B). As used herein, the term "control device" can be used interchangeably with "controller" or "control system." Among other features, the control device 130a is configured to receive user input related to the media playback system 100 and, in response, cause one or more devices in the media playback system 100 to perform an action(s) or operation(s) corresponding to the user input. In the illustrated embodiment, the control device 130a comprises a smartphone (e.g., an iPhone™, an Android phone) on which media playback system controller application software is installed. In some embodiments, the control device 130a comprises, for example, a tablet (e.g., an iPad™), a computer (e.g., a laptop computer, a desktop computer), and/or another suitable device (e.g., a television, an automobile audio head unit, an IoT device). In certain embodiments, the control device 130a comprises a dedicated controller for the media playback system 100. In other embodiments, as described above with respect to FIG. 1G, the control device 130a is integrated into another device in the media playback system 100 (e.g., one more of the playback devices 110, NMDs 120, and/or other suitable devices configured to communicate over a network).

The control device 130a includes electronics 132, a user interface 133, one or more speakers 134, and one or more microphones 135. The electronics 132 comprise one or more processors 132a (referred to hereinafter as "the processors 132a"), a memory 132b, software components 132c, and a network interface 132d. The processor 132a can be configured to perform functions relevant to facilitating user access, control, and configuration of the media playback system 100. The memory 132b can comprise data storage that can be loaded with one or more of the software components executable by the processor 302 to perform those functions. The software components 132c can comprise applications and/or other executable software configured to facilitate control of the media playback system 100. The memory 112b can be configured to store, for example, the software components 132c, media playback system controller application software, and/or other data associated with the media playback system 100 and the user.

The network interface 132d is configured to facilitate network communications between the control device 130a and one or more other devices in the media playback system 100, and/or one or more remote devices. In some embodiments, the network interface 132d is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132d can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132d can transmit a playback device control command (e.g., volume control, audio playback control, audio content selection) from the control device 304 to one or more of the playback devices 110. The network interface 132d can also transmit and/or receive configuration changes such as, for example, adding/removing one or more playback devices 110 to/from a zone, adding/removing one or more zones to/from a zone group, forming a bonded or consolidated player, separating one or more playback devices from a bonded or consolidated player, among others. Additional description of zones and groups can be found below with respect to FIGS. 1-I through 1M.

The user interface 133 is configured to receive user input and can facilitate control of the media playback system 100. The user interface 133 includes media content art 133a (e.g., album art, lyrics, videos), a playback status indicator 133b (e.g., an elapsed and/or remaining time indicator), media content information region 133c, a playback control region 133d, and a zone indicator 133e. The media content information region 133c can include a display of relevant information (e.g., title, artist, album, genre, release year) about media content currently playing and/or media content in a queue or playlist. The playback control region 133d can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133d may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130a. In some embodiments, the one or more speakers comprise individual transducers configured to correspondingly output low frequencies, mid-range frequencies, and/or high frequencies. In some aspects, for example, the control device 130a is configured as a playback device (e.g., one of the playback devices 110). Similarly, in some embodiments the control device 130a is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130a is configured to operate as playback device and an NMD. In other embodiments, however, the control device 130a omits the one or more speakers 134 and/or the one or more microphones 135. For instance, the control device 130a may comprise a device (e.g., a thermostat, an IoT device, a network device) comprising a portion of the electronics 132 and the user interface 133 (e.g., a touch screen) without any speakers or microphones. Additional control device embodiments are described in further detail below with respect to FIGS. 4A-4D and 5.

e. Suitable Playback Device Configurations

Figure 1J:
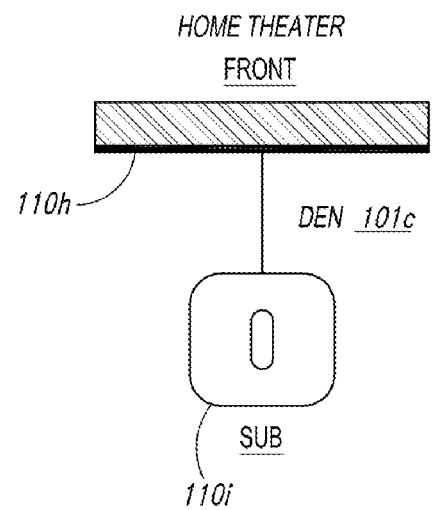
Figure 1K:
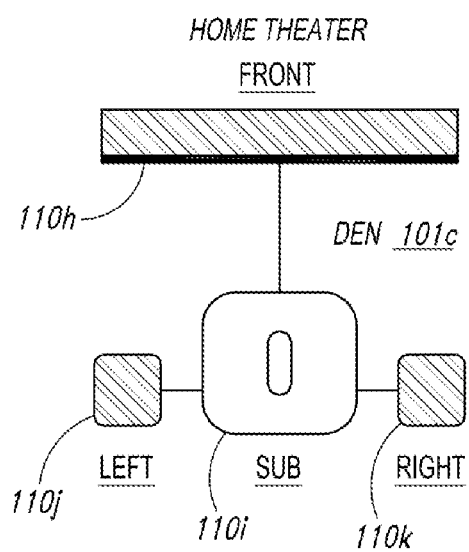
Figure 1L:
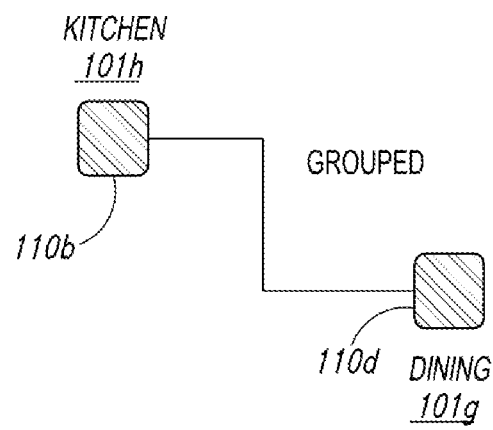
Figure 1M:
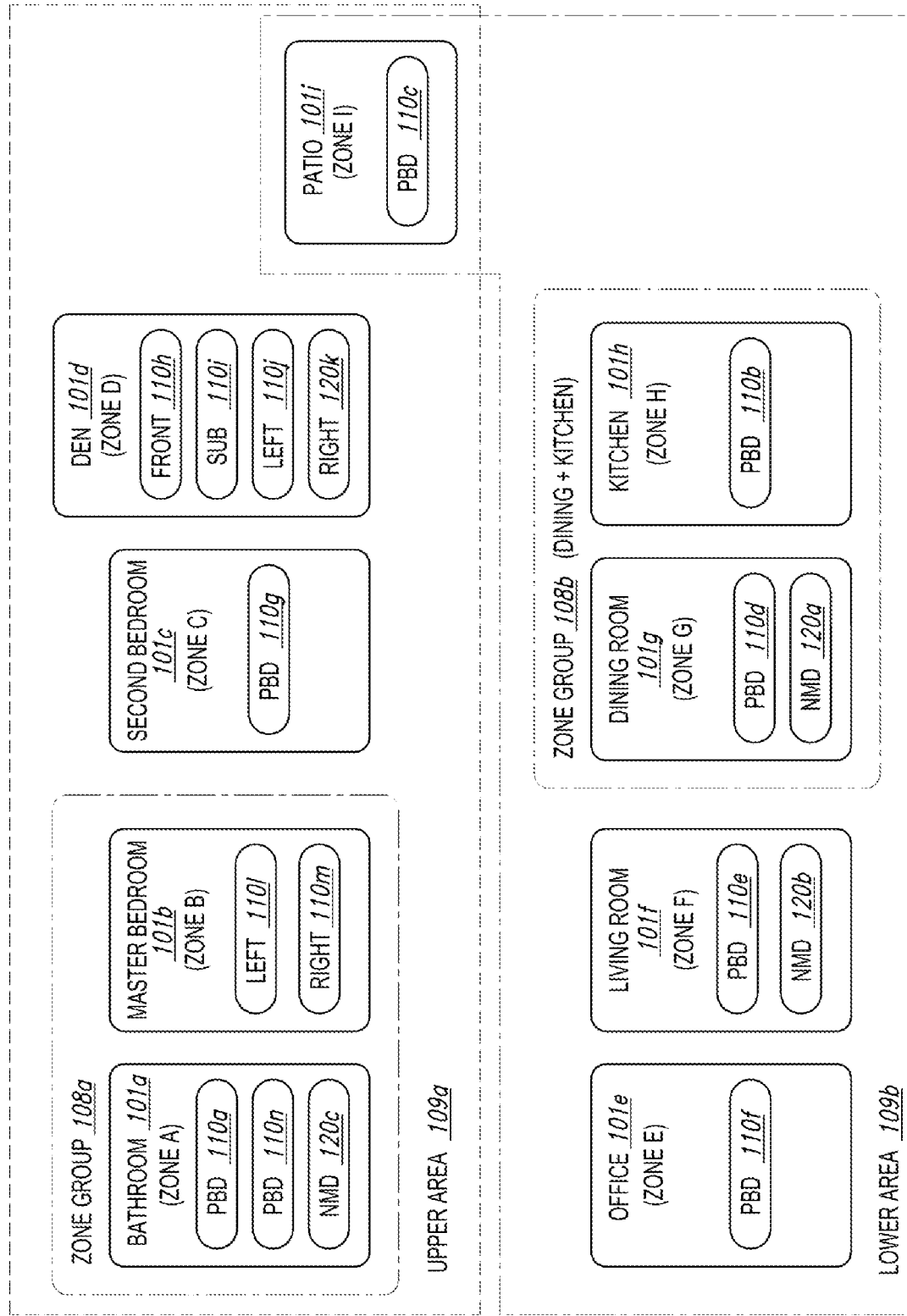
FIG. 1M is a schematic diagram of media playback system areas.

FIGS. 1I through 1M show example configurations of playback devices in zones and zone groups. Referring first to FIG. 1M, in one example, a single playback device may belong to a zone. For example, the playback device 110g in the second bedroom 101c (FIG. 1A) may belong to Zone C. In some implementations described below, multiple playback devices may be "bonded" to form a "bonded pair" which together form a single zone. For example, the playback device 110l (e.g., a left playback device) can be bonded to the playback device 110l (e.g., a left playback device) to form Zone A. Bonded playback devices may have different playback responsibilities (e.g., channel responsibilities). In another implementation described below, multiple playback devices may be merged to form a single zone. For example, the playback device 110h (e.g., a front playback device) may be merged with the playback device 110i (e.g., a subwoofer), and the playback devices 110j and 110k (e.g., left and right surround speakers, respectively) to form a single Zone D. In another example, the playback devices 110g and 110h can be merged to form a merged group or a zone group 108b. The merged playback devices 110g and 110h may not be specifically assigned different playback responsibilities. That is, the merged playback devices 110h and 110i may, aside from playing audio content in synchrony, each play audio content as they would if they were not merged.

Each zone in the media playback system 100 may be provided for control as a single user interface (UI) entity. For example, Zone A may be provided as a single entity named Master Bathroom. Zone B may be provided as a single entity named Master Bedroom. Zone C may be provided as a single entity named Second Bedroom.

Playback devices that are bonded may have different playback responsibilities, such as responsibilities for certain audio channels. For example, as shown in FIG. 1-I, the playback devices 110l and 110m may be bonded so as to produce or enhance a stereo effect of audio content. In this example, the playback device 110l may be configured to play a left channel audio component, while the playback device 110k may be configured to play a right channel audio component. In some implementations, such stereo bonding may be referred to as "pairing."

Additionally, bonded playback devices may have additional and/or different respective speaker drivers. As shown in FIG. 1J, the playback device 110h named Front may be bonded with the playback device 110i named SUB. The Front device 110h can be configured to render a range of mid to high frequencies and the SUB device 110i can be configured render low frequencies. When unbonded, however, the Front device 110h can be configured render a full range of frequencies. As another example, FIG. 1K shows the Front and SUB devices 110h and 110i further bonded with Left and Right playback devices 110j and 110k, respectively. In some implementations, the Right and Left devices 110j and 102k can be configured to form surround or "satellite" channels of a home theater system. The bonded playback devices 110h, 110i, 110j, and 110k may form a single Zone D (FIG. 1M).

Playback devices that are merged may not have assigned playback responsibilities and may each render the full range of audio content the respective playback device is capable of. Nevertheless, merged devices may be represented as a single UI entity (i.e., a zone, as discussed above). For instance, the playback devices 110a and 110n in the master bathroom have the single UI entity of Zone A. In one embodiment, the playback devices 110a and 110n may each output the full range of audio content each respective playback devices 110a and 110n are capable of, in synchrony.

In some embodiments, an NMD is bonded or merged with another device so as to form a zone. For example, the NMD 120b may be bonded with the playback device 110e, which together form Zone F, named Living Room. In other embodiments, a stand-alone network microphone device may be in a zone by itself. In other embodiments, however, a stand-alone network microphone device may not be associated with a zone. Additional details regarding associating network microphone devices and playback devices as designated or default devices may be found, for example, in previously referenced U.S. patent application Ser. No. 15/438,749.

Zones of individual, bonded, and/or merged devices may be grouped to form a zone group. For example, referring to FIG. 1M, Zone A may be grouped with Zone B to form a zone group 108a that includes the two zones. Similarly, Zone G may be grouped with Zone H to form the zone group 108b. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Playback devices may be dynamically grouped and ungrouped to form new or different groups that synchronously play back audio content.

In various implementations, the zones in an environment may be the default name of a zone within the group or a combination of the names of the zones within a zone group. For example, Zone Group 108b can be assigned a name such as "Dining+Kitchen", as shown in FIG. 1M. In some embodiments, a zone group may be given a unique name selected by a user.

Certain data may be stored in a memory of a playback device (e.g., the memory 112b of FIG. 1C) as one or more state variables that are periodically updated and used to describe the state of a playback zone, the playback device(s), and/or a zone group associated therewith. The memory may also include the data associated with the state of the other devices of the media system and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, identifiers associated with the second bedroom 101c may indicate that the playback device is the only playback device of the Zone C and not in a zone group. Identifiers associated with the Den may indicate that the Den is not grouped with other zones but includes bonded playback devices 110h-110k. Identifiers associated with the Dining Room may indicate that the Dining Room is part of the Dining+Kitchen zone group 108b and that devices 110b and 110d are grouped (FIG. 1L). Identifiers associated with the Kitchen may indicate the same or similar information by virtue of the Kitchen being part of the Dining+Kitchen zone group 108b. Other example zone variables and identifiers are described below.

In yet another example, the media playback system 100 may comprise variables or identifiers representing other associations of zones and zone groups, such as identifiers associated with Areas, as shown in FIG. 1M. An area may involve a cluster of zone groups and/or zones not within a zone group. For instance, FIG. 1M shows an Upper Area 109a including Zones A-D, and a Lower Area 109b including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. application Ser. No. 15/682,506 filed Aug. 21, 2017, and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the media playback system 100 may not implement Areas, in which case the system may not store variables associated with Areas.

III. Example Systems and Devices

Figure 2A:
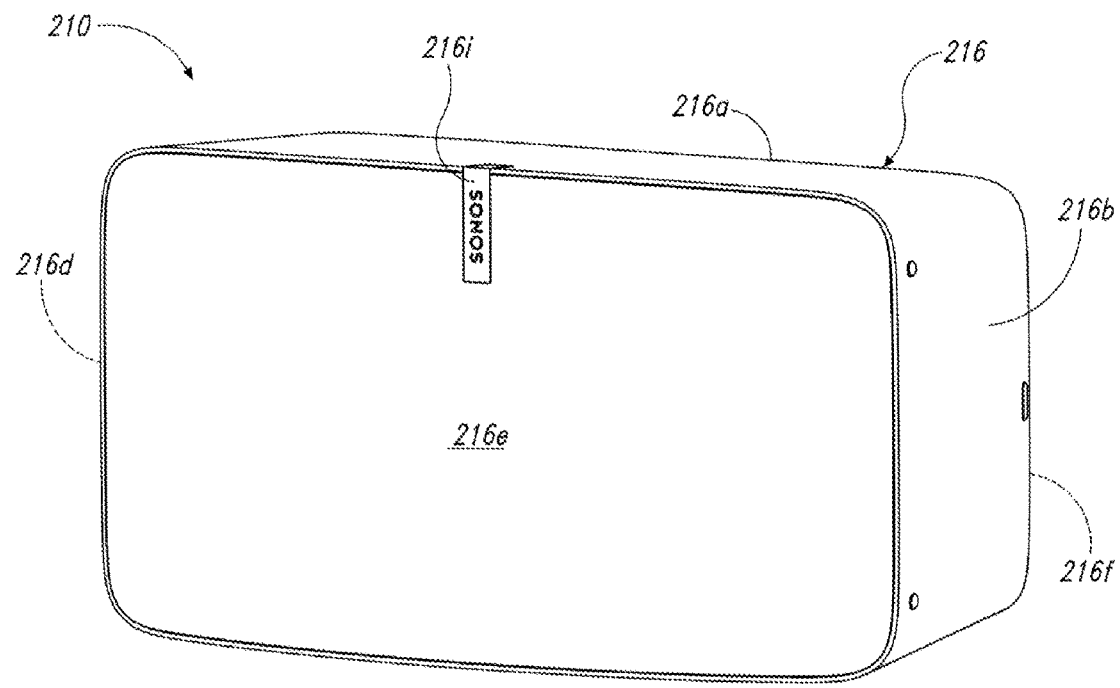
FIG. 2A is a front isometric view of a playback device configured in accordance with aspects of the disclosed technology.
Figure 2B:
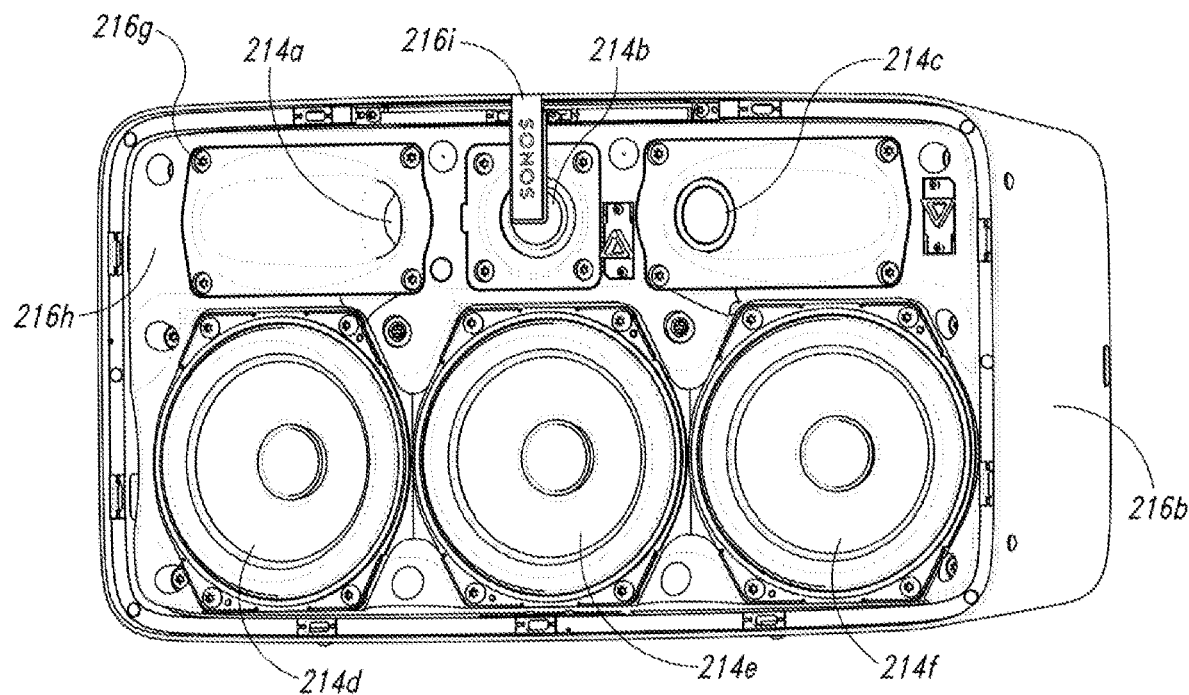
FIG. 2B is a front isometric view of the playback device of FIG. 3A without a grille.
Figure 2C:
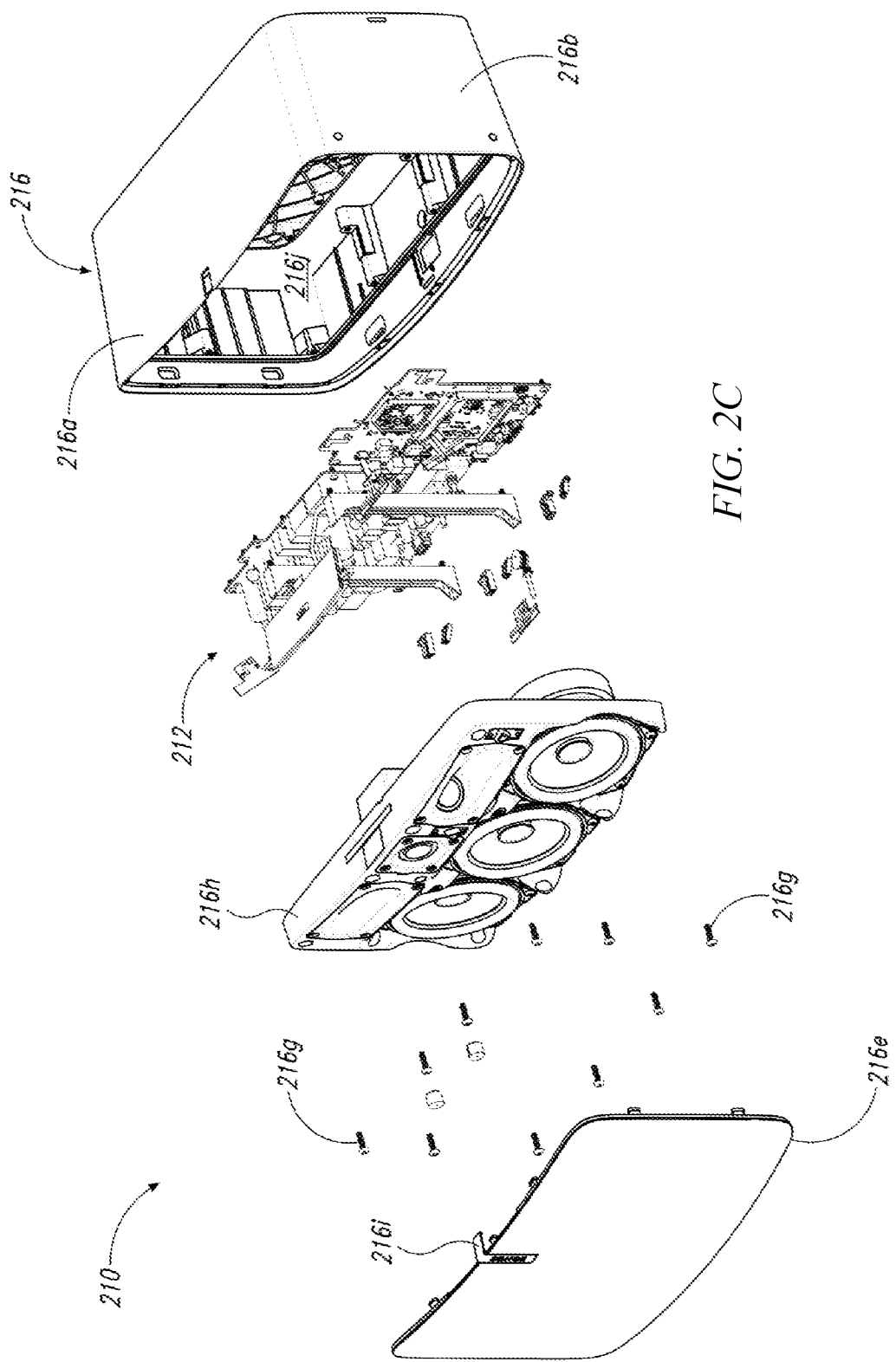
FIG. 2C is an exploded view of the playback device of FIG. 2A.

FIG. 2A is a front isometric view of a playback device 210 configured in accordance with aspects of the disclosed technology. FIG. 2B is a front isometric view of the playback device 210 without a grille 216e. FIG. 2C is an exploded view of the playback device 210. Referring to FIGS. 2A-2C together, the playback device 210 comprises a housing 216 that includes an upper portion 216a, a right or first side portion 216b, a lower portion 216c, a left or second side portion 216d, the grille 216e, and a rear portion 216f. A plurality of fasteners 216g (e.g., one or more screws, rivets, clips) attaches a frame 216h to the housing 216. A cavity 216j (FIG. 2C) in the housing 216 is configured to receive the frame 216h and electronics 212. The frame 216h is configured to carry a plurality of transducers 214 (identified individually in FIG. 2B as transducers 214a-f). The electronics 212 (e.g., the electronics 112 of FIG. 1C) is configured to receive audio content from an audio source and send electrical signals corresponding to the audio content to the transducers 214 for playback.

The transducers 214 are configured to receive the electrical signals from the electronics 112, and further configured to convert the received electrical signals into audible sound during playback. For instance, the transducers 214a-c (e.g., tweeters) can be configured to output high frequency sound (e.g., sound waves having a frequency greater than about 2 kHz). The transducers 214d-f (e.g., mid-woofers, woofers, midrange speakers) can be configured output sound at frequencies lower than the transducers 214a-c (e.g., sound waves having a frequency lower than about 2 kHz). In some embodiments, the playback device 210 includes a number of transducers different than those illustrated in FIGS. 2A-2C. For example, as described in further detail below with respect to FIGS. 3A-3C, the playback device 210 can include fewer than six transducers (e.g., one, two, three). In other embodiments, however, the playback device 210 includes more than six transducers (e.g., nine, ten). Moreover, in some embodiments, all or a portion of the transducers 214 are configured to operate as a phased array to desirably adjust (e.g., narrow or widen) a radiation pattern of the transducers 214, thereby altering a user's perception of the sound emitted from the playback device 210.

In the illustrated embodiment of FIGS. 2A-2C, a filter 216i is axially aligned with the transducer 214b. The filter 216i can be configured to desirably attenuate a predetermined range of frequencies that the transducer 214b outputs to improve sound quality and a perceived sound stage output collectively by the transducers 214. In some embodiments, however, the playback device 210 omits the filter 216i. In other embodiments, the playback device 210 includes one or more additional filters aligned with the transducers 214b and/or at least another of the transducers 214.

Figure 3A:
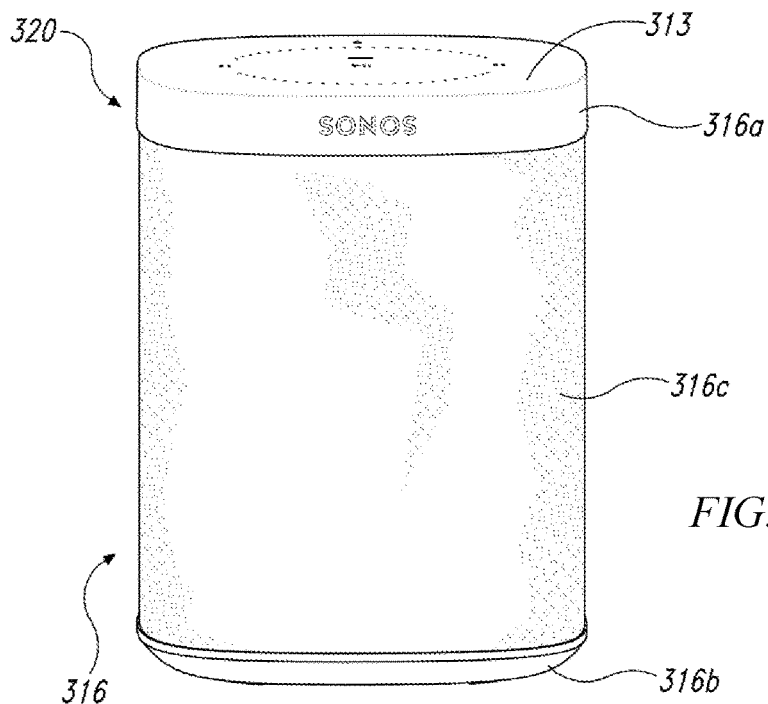
FIG. 3A is a front view of a network microphone device configured in accordance with aspects of the disclosed technology.
Figure 3B:
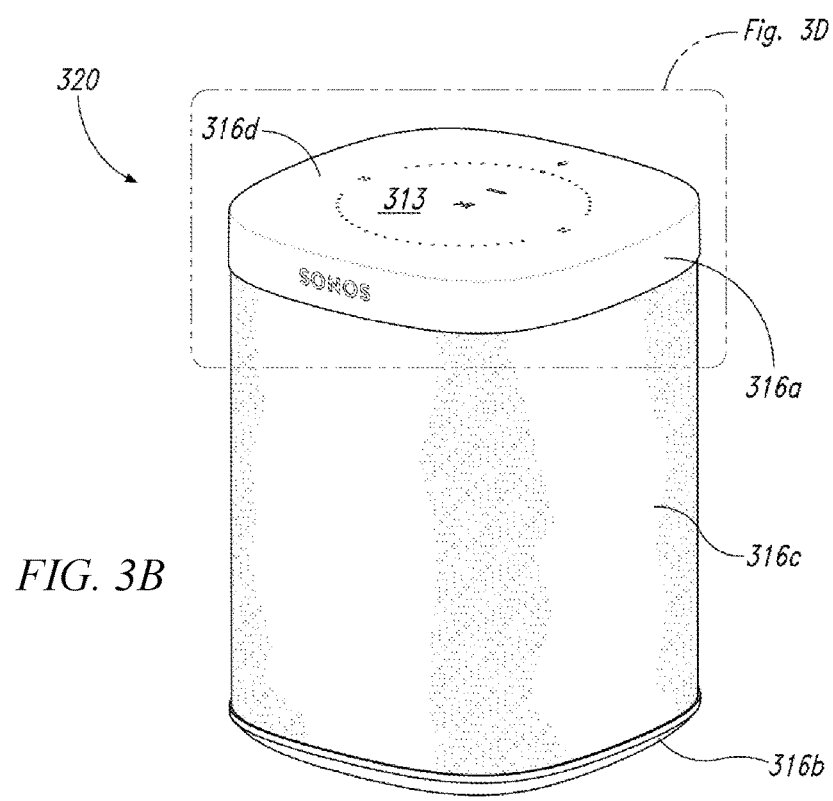
FIG. 3B is a side isometric view of the network microphone device of FIG. 3A.
Figure 3C:
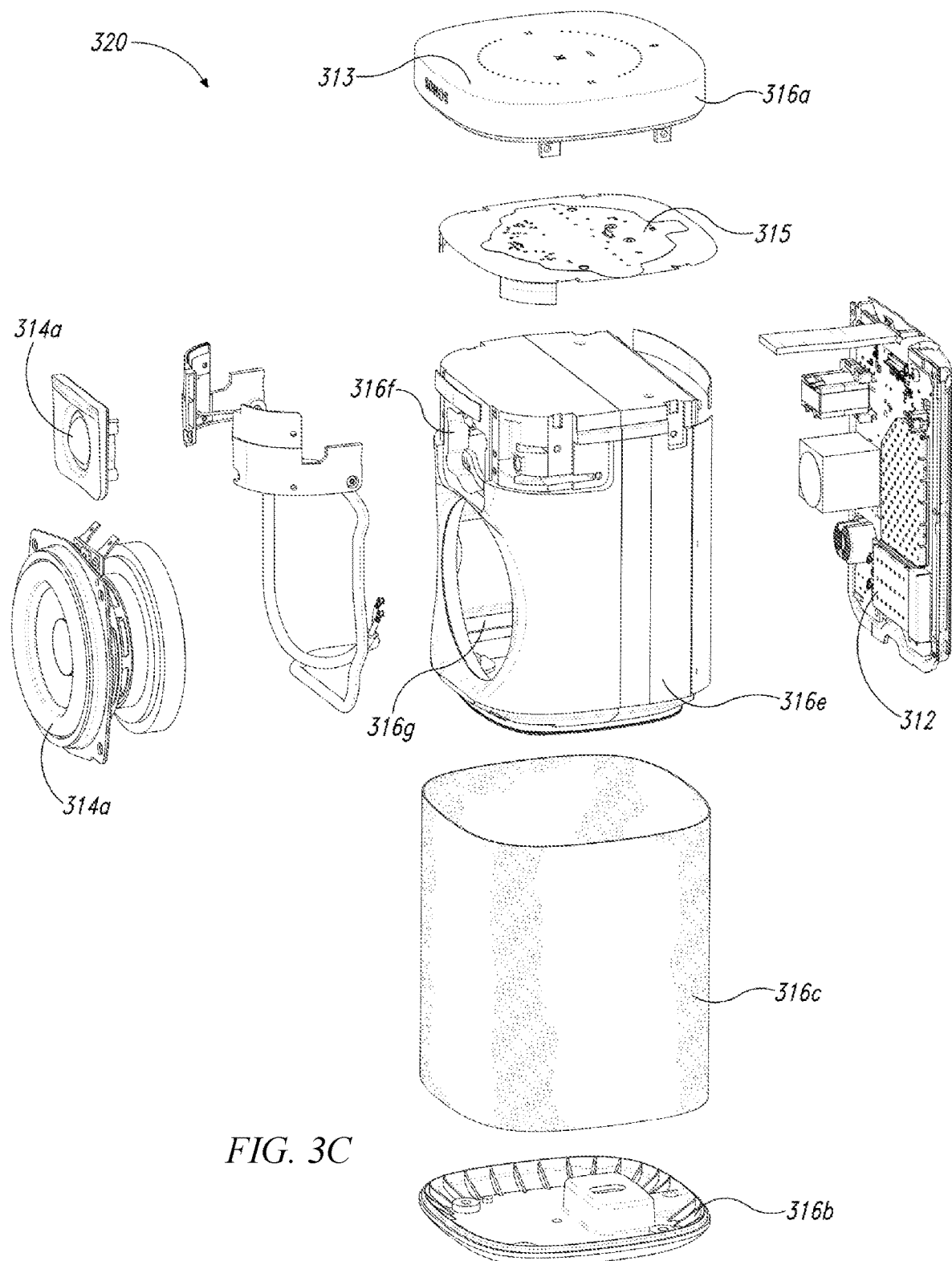
FIG. 3C is an exploded view of the network microphone device of FIGS. 3A and 3B.
Figure 3D:
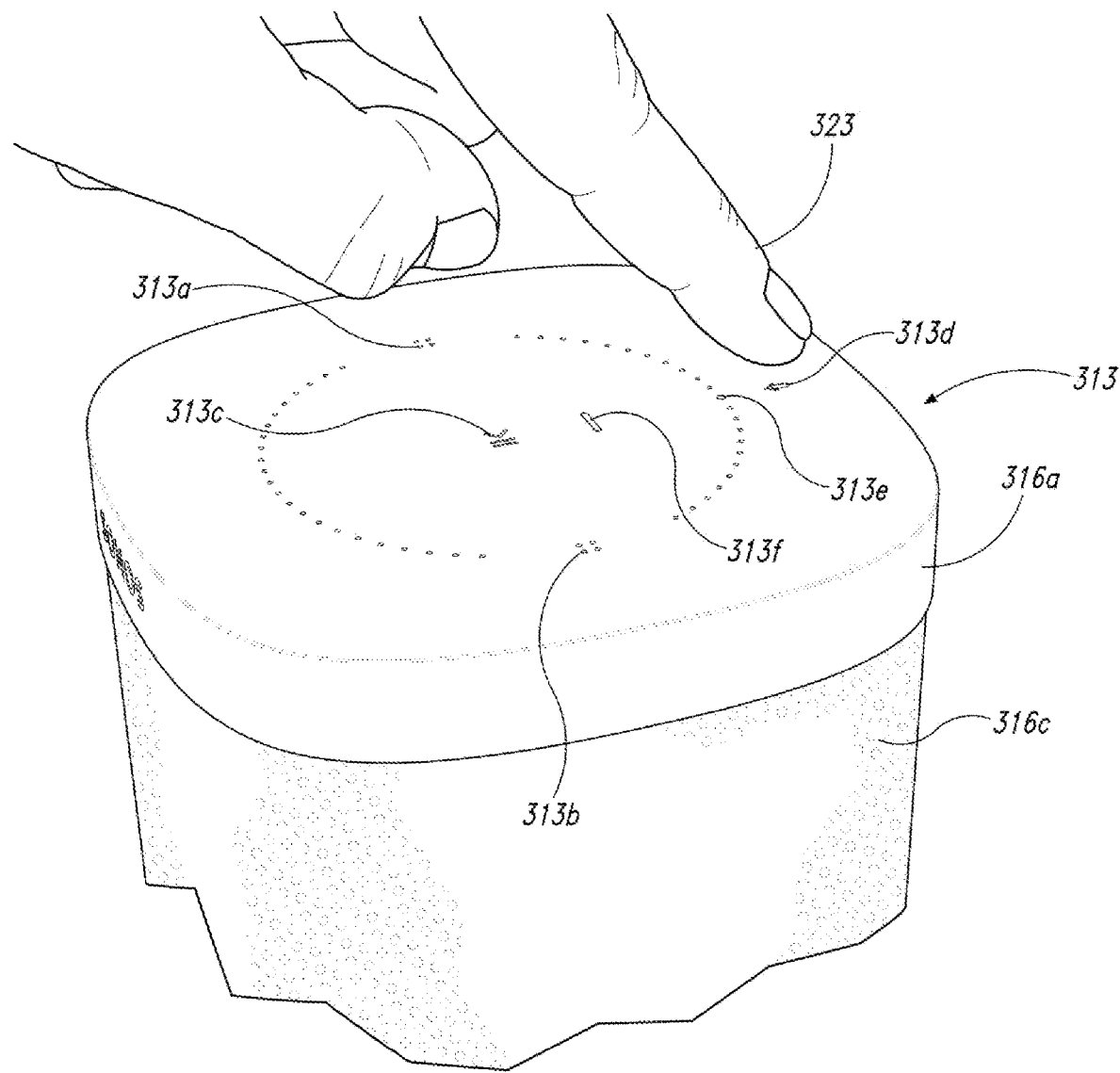
FIG. 3D is an enlarged view of a portion of FIG. 3B.

FIGS. 3A and 3B are front and right isometric side views, respectively, of an NMD 320 configured in accordance with embodiments of the disclosed technology. FIG. 3C is an exploded view of the NMD 320. FIG. 3D is an enlarged view of a portion of FIG. 3B including a user interface 313 of the NMD 320. Referring first to FIGS. 3A-3C, the NMD 320 includes a housing 316 comprising an upper portion 316a, a lower portion 316b and an intermediate portion 316c (e.g., a grille). A plurality of ports, holes, or apertures 316d in the upper portion 316a allow sound to pass through to one or more microphones 315 (FIG. 3C) positioned within the housing 316. The one or more microphones 316 are configured to received sound via the apertures 316d and produce electrical signals based on the received sound. In the illustrated embodiment, a frame 316e (FIG. 3C) of the housing 316 surrounds cavities 316f and 316g configured to house, respectively, a first transducer 314a (e.g., a tweeter) and a second transducer 314b (e.g., a mid-woofer, a midrange speaker, a woofer). In other embodiments, however, the NMD 320 includes a single transducer, or more than two (e.g., two, five, six) transducers. In certain embodiments, the NMD 320 omits the transducers 314a and 314b altogether.

Electronics 312 (FIG. 3C) includes components configured to drive the transducers 314a and 314b, and further configured to analyze audio data corresponding to the electrical signals produced by the one or more microphones 315. In some embodiments, for example, the electronics 312 comprises many or all of the components of the electronics 112 described above with respect to FIG. 1C. In certain embodiments, the electronics 312 includes components described above with respect to FIG. 1F such as, for example, the one or more processors 112a, the memory 112b, the software components 112c, the network interface 112d, etc. In some embodiments, the electronics 312 includes additional suitable components (e.g., proximity or other sensors).

Referring to FIG. 3D, the user interface 313 includes a plurality of control surfaces (e.g., buttons, knobs, capacitive surfaces) including a first control surface 313a (e.g., a previous control), a second control surface 313b (e.g., a next control), and a third control surface 313c (e.g., a play and/or pause control). A fourth control surface 313d is configured to receive touch input corresponding to activation and deactivation of the one or microphones 315. A first indicator 313e (e.g., one or more light emitting diodes (LEDs) or another suitable illuminator) can be configured to illuminate only when the one or more microphones 315 are activated. A second indicator 313f (e.g., one or more LEDs) can be configured to remain solid during normal operation and to blink or otherwise change from solid to indicate a detection of voice activity. In some embodiments, the user interface 313 includes additional or fewer control surfaces and illuminators. In one embodiment, for example, the user interface 313 includes the first indicator 313e, omitting the second indicator 313f. Moreover, in certain embodiments, the NMD 320 comprises a playback device and a control device, and the user interface 313 comprises the user interface of the control device.

Referring to FIGS. 3A-3D together, the NMD 320 is configured to receive voice commands from one or more adjacent users via the one or more microphones 315. As described above with respect to FIG. 1B, the one or more microphones 315 can acquire, capture, or record sound in a vicinity (e.g., a region within 10 m or less of the NMD 320) and transmit electrical signals corresponding to the recorded sound to the electronics 312. The electronics 312 can process the electrical signals and can analyze the resulting audio data to determine a presence of one or more voice commands (e.g., one or more activation words). In some embodiments, for example, after detection of one or more suitable voice commands, the NMD 320 is configured to transmit a portion of the recorded audio data to another device and/or a remote server (e.g., one or more of the computing devices 106 of FIG. 1B) for further analysis. The remote server can analyze the audio data, determine an appropriate action based on the voice command, and transmit a message to the NMD 320 to perform the appropriate action. For instance, a user may speak "Sonos, play Michael Jackson." The NMD 320 can, via the one or more microphones 315, record the user's voice utterance, determine the presence of a voice command, and transmit the audio data having the voice command to a remote server (e.g., one or more of the remote computing devices 106 of FIG. 1B, one or more servers of a VAS and/or another suitable service). The remote server can analyze the audio data and determine an action corresponding to the command. The remote server can then transmit a command to the NMD 320 to perform the determined action (e.g., play back audio content related to Michael Jackson). The NMD 320 can receive the command and play back the audio content related to Michael Jackson from a media content source. As described above with respect to FIG. 1B, suitable content sources can include a device or storage communicatively coupled to the NMD 320 via a LAN (e.g., the network 104 of FIG. 1B), a remote server (e.g., one or more of the remote computing devices 106 of FIG. 1B), etc. In certain embodiments, however, the NMD 320 determines and/or performs one or more actions corresponding to the one or more voice commands without intervention or involvement of an external device, computer, or server.

Figure 3E:
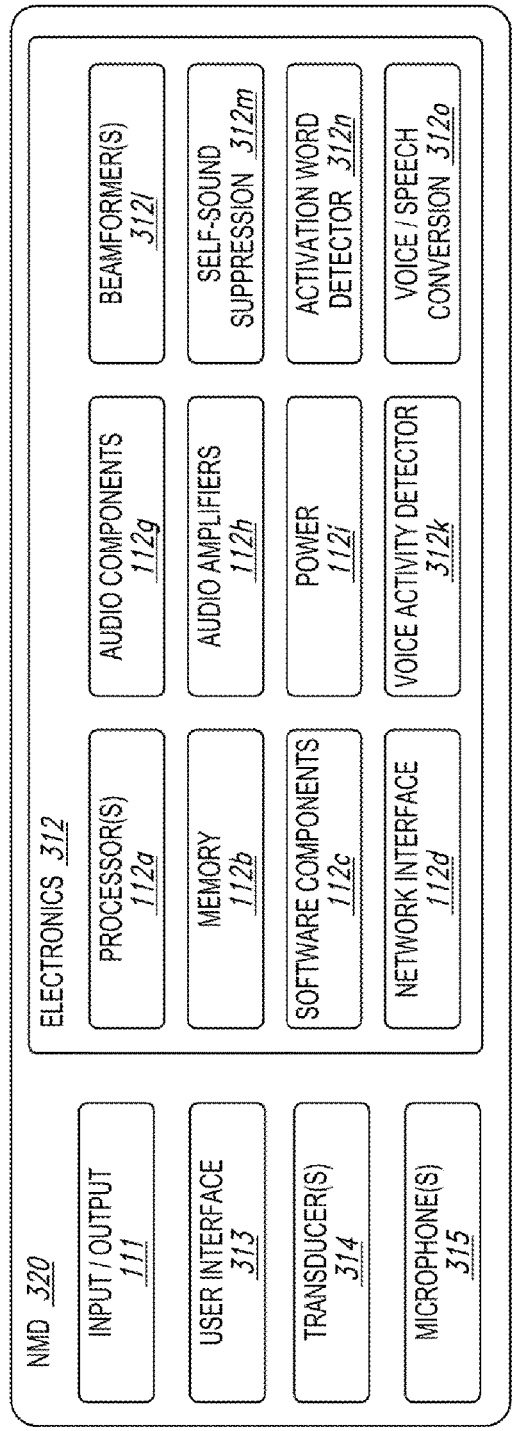
FIG. 3E is a block diagram of the network microphone device of FIGS. 3A-3D

FIG. 3E is a functional block diagram showing additional features of the NMD 320 in accordance with aspects of the disclosure. The NMD 320 includes components configured to facilitate voice command capture including voice activity detector component(s) 312k, beam former components 312l, acoustic echo cancellation (AEC) and/or self-sound suppression components 312m, activation word detector components 312n, and voice/speech conversion components 312o (e.g., voice-to-text and text-to-voice). In the illustrated embodiment of FIG. 3E, the foregoing components 312k-312o are shown as separate components. In some embodiments, however, one or more of the components 312k-312o are subcomponents of the processors 112a.

The beamforming and self-sound suppression components 312*l* and 312*m* are configured to detect an audio signal and determine aspects of voice input represented in the detected audio signal, such as the direction, amplitude, frequency spectrum, etc. The voice activity detector activity components 312*k* are operably coupled with the beamforming and AEC components 312*l* and 312*m* and are configured to determine a direction and/or directions from which voice activity is likely to have occurred in the detected audio signal. Potential speech directions can be identified by monitoring metrics which distinguish speech from other sounds. Such metrics can include, for example, energy within the speech band relative to background noise and entropy within the speech band, which is measure of spectral structure. As those of ordinary skill in the art will appreciate, speech typically has a lower entropy than most common background noise.

The activation word detector components 312*n* are configured to monitor and analyze received audio to determine if any activation words (e.g., wake words) are present in the received audio. The activation word detector components 312*n* may analyze the received audio using an activation word detection algorithm. If the activation word detector 312*n* detects an activation word, the NMD 320 may process voice input contained in the received audio. Example activation word detection algorithms accept audio as input and provide an indication of whether an activation word is present in the audio. Many first- and third-party activation word detection algorithms are known and commercially available. For instance, operators of a voice service may make their algorithm available for use in third-party devices. Alternatively, an algorithm may be trained to detect certain activation words. In some embodiments, the activation word detector 312*n* runs multiple activation word detection algorithms on the received audio simultaneously (or substantially simultaneously). As noted above, different voice services (e.g. AMAZON's ALEXA®, APPLE's SIRI®, or MICROSOFT's CORTANA®) can each use a different activation word for invoking their respective voice service. To support multiple services, the activation word detector 312*n* may run the received audio through the activation word detection algorithm for each supported voice service in parallel.

The speech/text conversion components 312*o* may facilitate processing by converting speech in the voice input to text. In some embodiments, the electronics 312 can include voice recognition software that is trained to a particular user or a particular set of users associated with a household. Such voice recognition software may implement voice-processing algorithms that are tuned to specific voice profile(s). Tuning to specific voice profiles may require less computationally intensive algorithms than traditional voice activity services, which typically sample from a broad base of users and diverse requests that are not targeted to media playback systems.

Figure 3F:
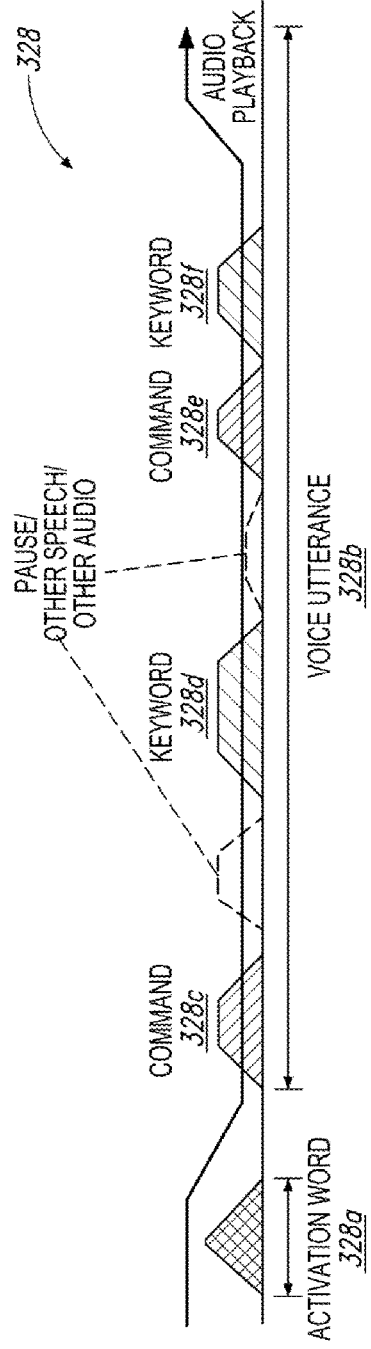
FIG. 3F is a schematic diagram of an example voice input.

FIG. 3F is a schematic diagram of an example voice input 328 captured by the NMD 320 in accordance with aspects of the disclosure. The voice input 328 can include an activation word portion 328*a* and a voice utterance portion 328*b*. In some embodiments, the activation word 557*a* can be a known activation word, such as "Alexa," which is associated with AMAZON's ALEXA®. In other embodiments, however, the voice input 328 may not include an activation word. In some embodiments, a network microphone device may output an audible and/or visible response upon detection of the activation word portion 328*a*. In addition or alternately, an NMB may output an audible and/or visible response after processing a voice input and/or a series of voice inputs.

The voice utterance portion 328*b* may include, for example, one or more spoken commands (identified individually as a first command 328*c* and a second command 328*e*) and one or more spoken keywords (identified individually as a first keyword 328*d* and a second keyword 328*f*). In one example, the first command 328*c* can be a command to play music, such as a specific song, album, playlist, etc. In this example, the keywords may be one or words identifying one or more zones in which the music is to be played, such as the Living Room and the Dining Room shown in FIG. 1A. In some examples, the voice utterance portion 328*b* can include other information, such as detected pauses (e.g., periods of non-speech) between words spoken by a user, as shown in FIG. 3F. The pauses may demarcate the locations of separate commands, keywords, or other information spoke by the user within the voice utterance portion 328*b*.

In some embodiments, the media playback system 100 is configured to temporarily reduce the volume of audio content that it is playing while detecting the activation word portion 557*a*. The media playback system 100 may restore the volume after processing the voice input 328, as shown in FIG. 3F. Such a process can be referred to as ducking, examples of which are disclosed in U.S. patent application Ser. No. 15/438,749, incorporated by reference herein in its entirety.

FIGS. 4A-4D are schematic diagrams of a control device 430 (e.g., the control device 130*a* of FIG. 1H, a smartphone, a tablet, a dedicated control device, an IoT device, and/or another suitable device) showing corresponding user interface displays in various states of operation. The control device comprises one or more processors, memory, software components, a network interface (also referred to herein as a "communication interface").

Figure 4A:
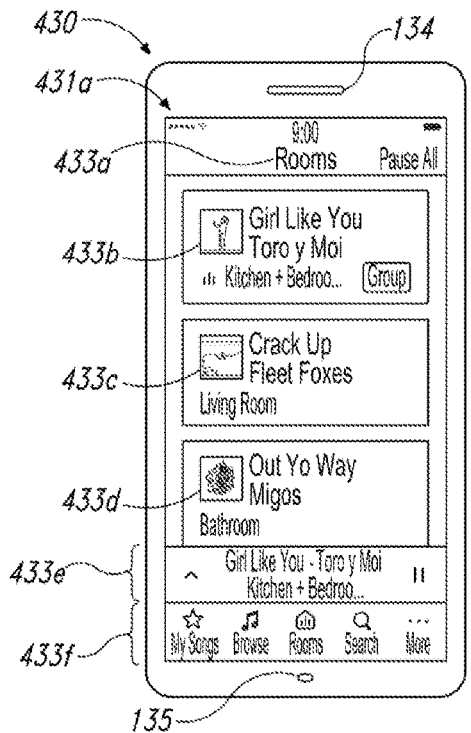
FIGS. 4A-4D are schematic diagrams of a control device in various stages of operation in accordance with aspects of the disclosed technology.
Figure 4B:
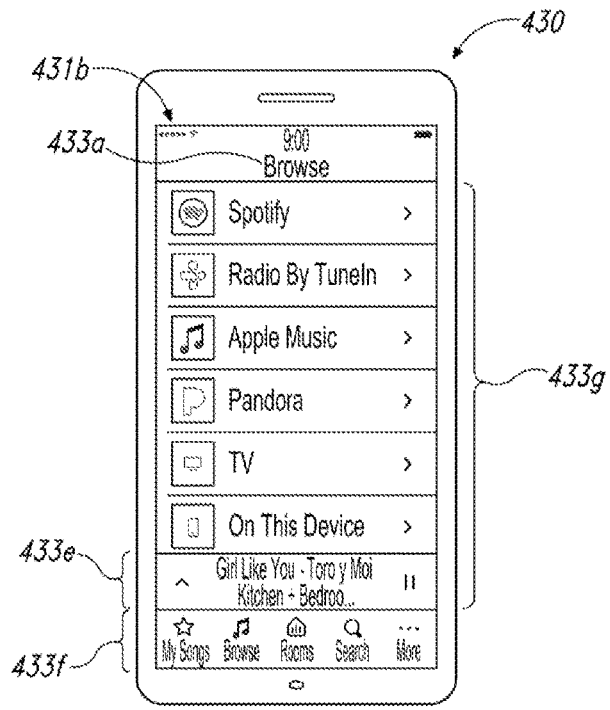
Figure 4C:
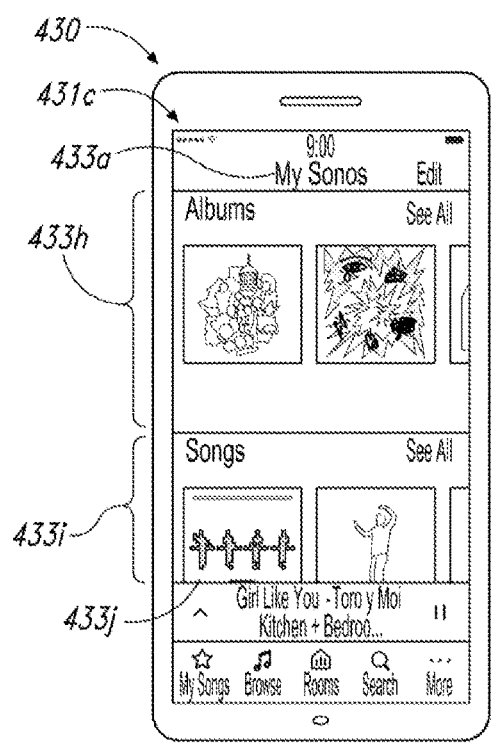
Figure 4D:
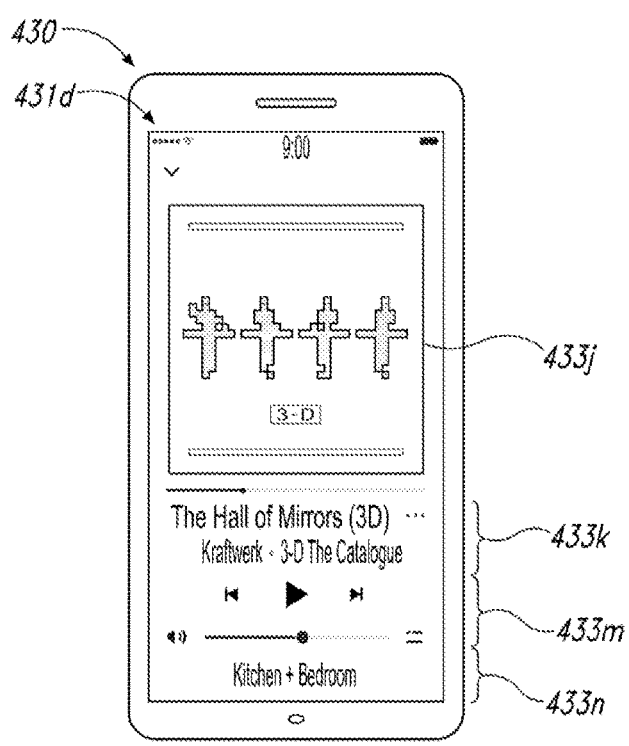

A first user interface display 431*a* (FIG. 4A) includes a display name 433*a* (i.e., "Rooms"). A selected group region 433*b* displays audio content information (e.g., artist name, track name, album art) of audio content played back in the selected group and/or zone. Group regions 433*c* and 433*d* display corresponding group and/or zone name, and audio content information audio content played back or next in a playback queue of the respective group or zone. An audio content region 433*e* includes information related to audio content in the selected group and/or zone (i.e., the group and/or zone indicated in the selected group region 433*b*). A lower display region 433*f* is configured to receive touch input to display one or more other user interface displays. For example, if a user selects "Browse" in the lower display region 433*f*, the control device 430 can be configured to output a second user interface display 431*b* (FIG. 4B) comprising a plurality of music services 433*g* (e.g., Spotify, Radio by Tunein, Apple Music, Pandora, Amazon, TV, local music, line-in) through which the user can browse and from which the user can select media content for play back via one or more playback devices (e.g., one of the playback devices 110 of FIG. 1A). Alternatively, if the user selects "My Sonos" in the lower display region 433*f*, the control device 430 can be configured to output a third user interface display 431*c* (FIG. 4C). A first media content region 433*h* can include graphical representations (e.g., album art) corresponding to individual albums, stations, or playlists. A second media content region 433*i* can include graphical representations (e.g., album art) corresponding to individual songs, tracks, or other media content. If the user selects a graphical representation 433*j* (FIG. 4C), the control device 430 can be configured to begin play back of audio content corresponding to the graphical representation 433*j* and output a fourth user interface display 431*d* fourth user interface display 431*d* includes an enlarged version of the graphical representation 433*j*, media content information 433*k* (e.g., track name, artist, album), transport controls 433*m* (e.g., play, previous, next, pause, volume), and indication 433*n* of the currently selected group and/or zone name.

Figure 5:
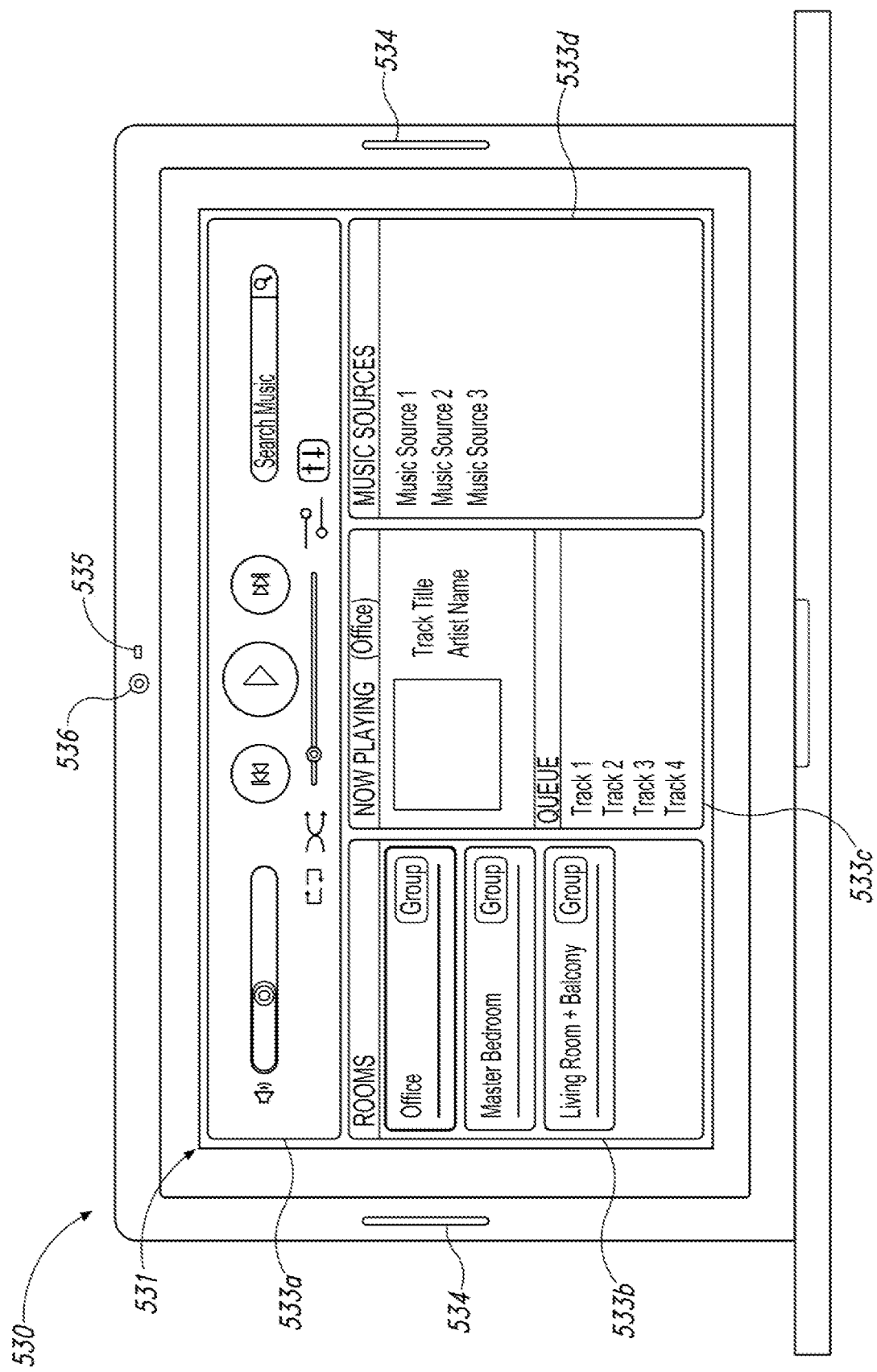
FIG. 5 is front view of a control device.

FIG. 5 is a schematic diagram of a control device 530 (e.g., a laptop computer, a desktop computer). The control device 530 includes transducers 534, a microphone 535, and a camera 536. A user interface 531 includes a transport control region 533*a*, a playback status region 533*b*, a playback zone region 533*c*, a playback queue region 533*d*, and a media content source region 533*e*. The transport control region comprises one or more controls for controlling media playback including, for example, volume, previous, play/pause, next, repeat, shuffle, track position, crossfade, equalization, etc. The audio content source region 533*e* includes a listing of one or more media content sources from which a user can select media items for play back and/or adding to a playback queue.

The playback zone region 533*b* can include representations of playback zones within the media playback system 100 (FIGS. 1A and 1B). In some embodiments, the graphical representations of playback zones may be selectable to bring up additional selectable icons to manage or configure the playback zones in the media playback system, such as a creation of bonded zones, creation of zone groups, separation of zone groups, renaming of zone groups, etc. In the illustrated embodiment, a "group" icon is provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone can be configured to play audio content in synchrony with the playback device(s) in the particular zone. Analogously, a "group" icon may be provided within a graphical representation of a zone group. In the illustrated embodiment, the "group" icon may be selectable to bring up options to deselect one or more zones in the zone group to be removed from the zone group. In some embodiments, the control device 530 includes other interactions and implementations for grouping and ungrouping zones via the user interface 531. In certain embodiments, the representations of playback zones in the playback zone region 533*b* can be dynamically updated as playback zone or zone group configurations are modified.

The playback status region 533*c* includes graphical representations of audio content that is presently being played, previously played, or scheduled to play next in the selected playback zone or zone group. The selected playback zone or zone group may be visually distinguished on the user interface, such as within the playback zone region 533*b* and/or the playback queue region 533*d*. The graphical representations may include track title, artist name, album name, album year, track length, and other relevant information that may be useful for the user to know when controlling the media playback system 100 via the user interface 531.

The playback queue region 533*d* includes graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device. In some embodiments, for example, a playlist can be added to a playback queue, in which information corresponding to each audio item in the playlist may be added to the playback queue. In some embodiments, audio items in a playback queue may be saved as a playlist. In certain embodiments, a playback queue may be empty, or populated but "not in use" when the playback zone or zone group is playing continuously streaming audio content, such as Internet radio that may continue to play until otherwise stopped, rather than discrete audio items that have playback durations. In some embodiments, a playback queue can include Internet radio and/or other streaming audio content items and be "in use" when the playback zone or zone group is playing those items.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped.

Figure 6:
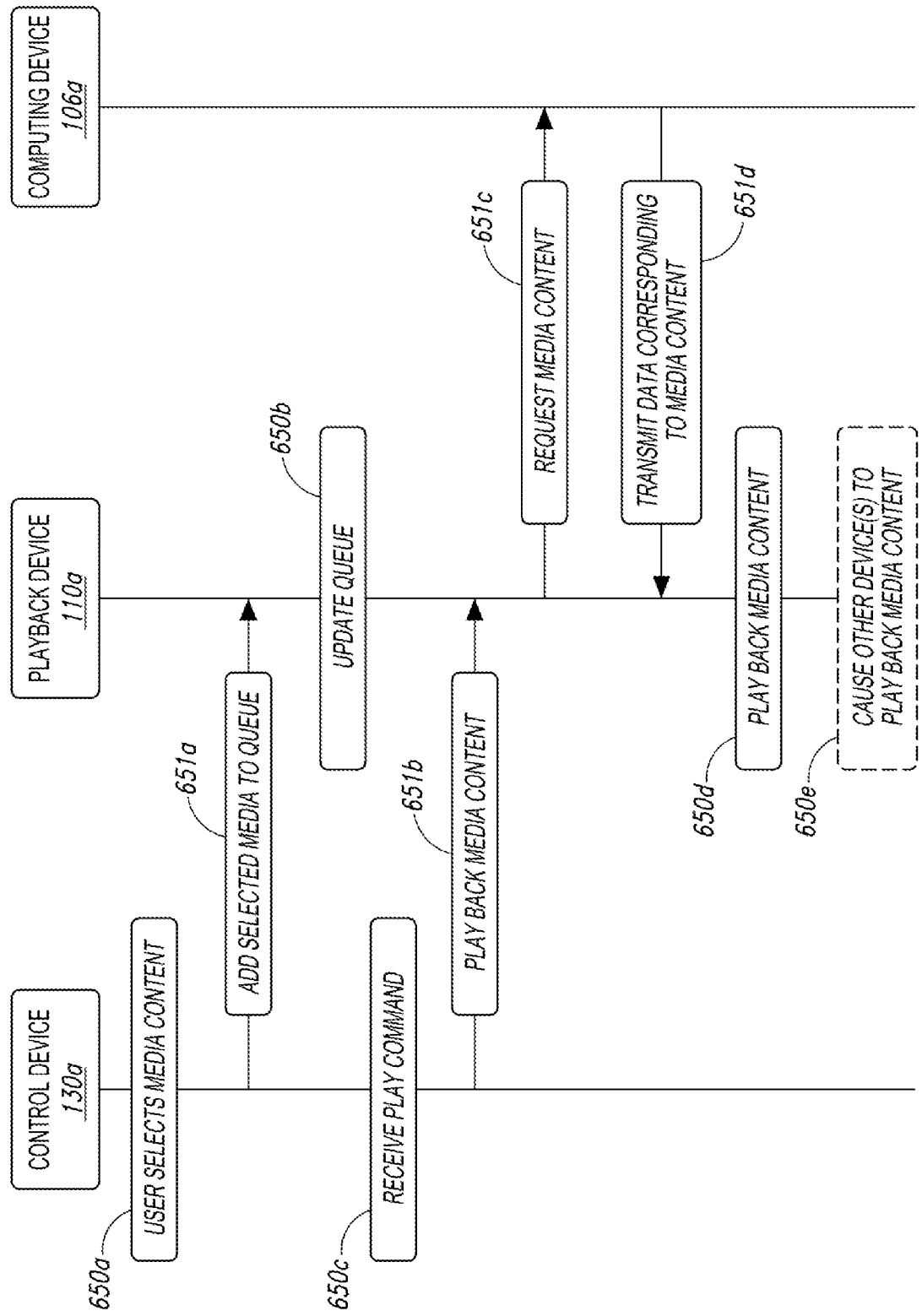
FIG. 6 is a message flow diagram of a media playback system.

FIG. 6 is a message flow diagram illustrating data exchanges between devices of the media playback system 100 (FIGS. 1A-1M).

At step 650*a*, the media playback system 100 receives an indication of selected media content (e.g., one or more songs, albums, playlists, podcasts, videos, stations) via the control device 130*a*. The selected media content can comprise, for example, media items stored locally on or more devices (e.g., the audio source 105 of FIG. 1C) connected to the media playback system and/or media items stored on one or more media service servers (one or more of the remote computing devices 106 of FIG. 1B). In response to receiving the indication of the selected media content, the control device 130*a* transmits a message 651*a* to the playback device 110*a* (FIGS. 1A-1C) to add the selected media content to a playback queue on the playback device 110*a*.

At step 650*b*, the playback device 110*a* receives the message 651*a* and adds the selected media content to the playback queue for play back.

At step 650c, the control device 130a receives input corresponding to a command to play back the selected media content. In response to receiving the input corresponding to the command to play back the selected media content, the control device 130a transmits a message 651b to the playback device 110a causing the playback device 110a to play back the selected media content. In response to receiving the message 651b, the playback device 110a transmits a message 651c to the computing device 106a requesting the selected media content. The computing device 106a, in response to receiving the message 651c, transmits a message 651d comprising data (e.g., audio data, video data, a URL, a URI) corresponding to the requested media content.

At step 650d, the playback device 110a receives the message 651d with the data corresponding to the requested media content and plays back the associated media content.

At step 650e, the playback device 110a optionally causes one or more other devices to play back the selected media content. In one example, the playback device 110a is one of a bonded zone of two or more players (FIG. 1M). The playback device 110a can receive the selected media content and transmit all or a portion of the media content to other devices in the bonded zone. In another example, the playback device 110a is a coordinator of a group and is configured to transmit and receive timing information from one or more other devices in the group. The other one or more devices in the group can receive the selected media content from the computing device 106a and begin playback of the selected media content in response to a message from the playback device 110a such that all of the devices in the group play back the selected media content in synchrony.

IV. Methods and Systems for Implementing Routines and Operating Modes at Playback Devices In some embodiments, routines (also referred to as "scenes") can be used to customize and/or modify the behavior of playback devices 110. A user can select or create a set of routines, or scenes, that cause a playback device 110a to play back media content in a user-defined manner. For example, the user may select a routine that causes the playback device 110a to play back the sound of ocean waves. Further, the user may indicate a particular user-defined acoustic parameter in which the ocean waves should be played back, such as by selecting a particular user-defined volume. Further, in some embodiments, a routine can continue execution through the play back of media content. For instance, a routine may be configured to ramp up the volume associated with media content over a five-minute period. Similarly, a routine may be configured to dynamically raise the volume associated with media content in response to ambient noise around one or more playback devices 110.

Additionally, sets of routines may be utilized to customize and/or modify the behavior of playback devices 110. For example, a particular ordered set of routines may be associated with a particular playback device 110 such that the routines are executed in sequential order. For instance, each routine within the particular ordered set of routines may be associated with different media content (e.g., song, tracks, radio station, playlist, podcast, audiobook). As the playback device finishes one of the current routine, the next routine may execute and cause the playback device 110a to play the media content associated with the next routine. Alternatively or additionally, a user may also cause the playback device 110a to advance to the next routine by initiating a trigger condition, such as by selecting a button.

In some embodiments, a set of routines are used to define, at least in part, a playback mode. As described herein, a playback mode comprises one or more routines that define a particular set of behaviors associated with a playback device 110a that is operating in the playback mode. Further, in some embodiments, the one or more routines configure the user interface 113 of the playback device 110a to activate or modify different aspects of the one or more routines. For example, the one or more routines may configure a portion of the user interface 113 that is used to advance between songs to instead advance between the one or more routines. As such, when touching the "skip button" the one or more routines may cause the playback device 110a to advance to the next routine within the one or more routines.

In some embodiments, the playback device 110a is configured to execute transport commands (e.g., play, previous, next, pause, volume) differently in different modes. The transport commands may be initiated on a user interface 313 associated with a playback device 110a or at a user interface 133 associated with a control device 130. For example when operating in a daytime playback mode (also referred to herein as a "default playback mode"), pressing a skip button, or otherwise issuing a "skip" command, causes the playback device 110a to move between individual tracks in the playback queue. In contrast, in a routine-based playback mode (e.g., a sleep playback mode), pressing the skip button, or otherwise issuing a "skip" command, causes the playback device 110a to move between routines within a set of one or more routines. Similarly, in a daytime playback mode (or default playback mode), pressing a "play" button, or otherwise issuing a play command, causes the playback device 110a to start playing a track within a playback queue. In contrast, in a routine-based playback mode (e.g., a sleep playback mode), pressing the play button, or otherwise issuing a "play" command, causes the playback device 110a to start a routine within a set of one or more routines.

In some embodiments, individual playback modes can customize the actions associated with different transport commands (e.g., play, previous, next, pause, volume). The customizations may be defined by one or more routines that are associated with the individual playback modes. For instance, a particular playback mode may cause the skip command to speed up an aspect of a routine. For example, pressing the skip command may cause media content to play at a faster speed. As an additional example, a particular playback mode may cause the stop command to emit an alarm sound. For example, a particular playback mode may be associated with a game and pushing a stop button on a playback device may cause an alarm to sound as part of the game. One will appreciate that different playback modes may cause any number of different actions to be associated with the transport commands. Further, one will appreciate that different playback modes may customize the actions caused by interactions with the user interfaces 313 (such as buttons, knobs, capacitive surfaces, etc.) on playback devices. Accordingly, buttons that have specific functions (e.g., play, stop, skip, pause, volume, etc.) within a default playback mode can be repurposed to perform custom actions as directed by the particular playback mode.

In some embodiments, multiple different playback modes may be available for a user to choose between. For example, the multiple different playback modes may comprise a sleep mode, a business playback mode, a fitness playback mode, a cooking playback mode, a cleaning playback mode, or a holiday playback mode. As a further example, the fitness playback mode may comprise routines that are created to complement a high-intensity interval training workout. For instance, the routines may cause upbeat music to play until a user presses a button on one or more playback devices 110. In response to the user pressing the button, a cooldown timer may initiate and audibly count down for a user-specified amount time. The timer arriving at zero may comprise a trigger condition that causes the next routine to begin playing the upbeat music. As such, a user can work out to their desired music, press a button to enter a timed cooldown period, and then begin to work out again when the music automatically begins playing. In view of this disclosure, one will appreciate that a user may be able to edit playback modes or create custom playback modes that are associated with pre-made and/or custom routines.

Figure 7:
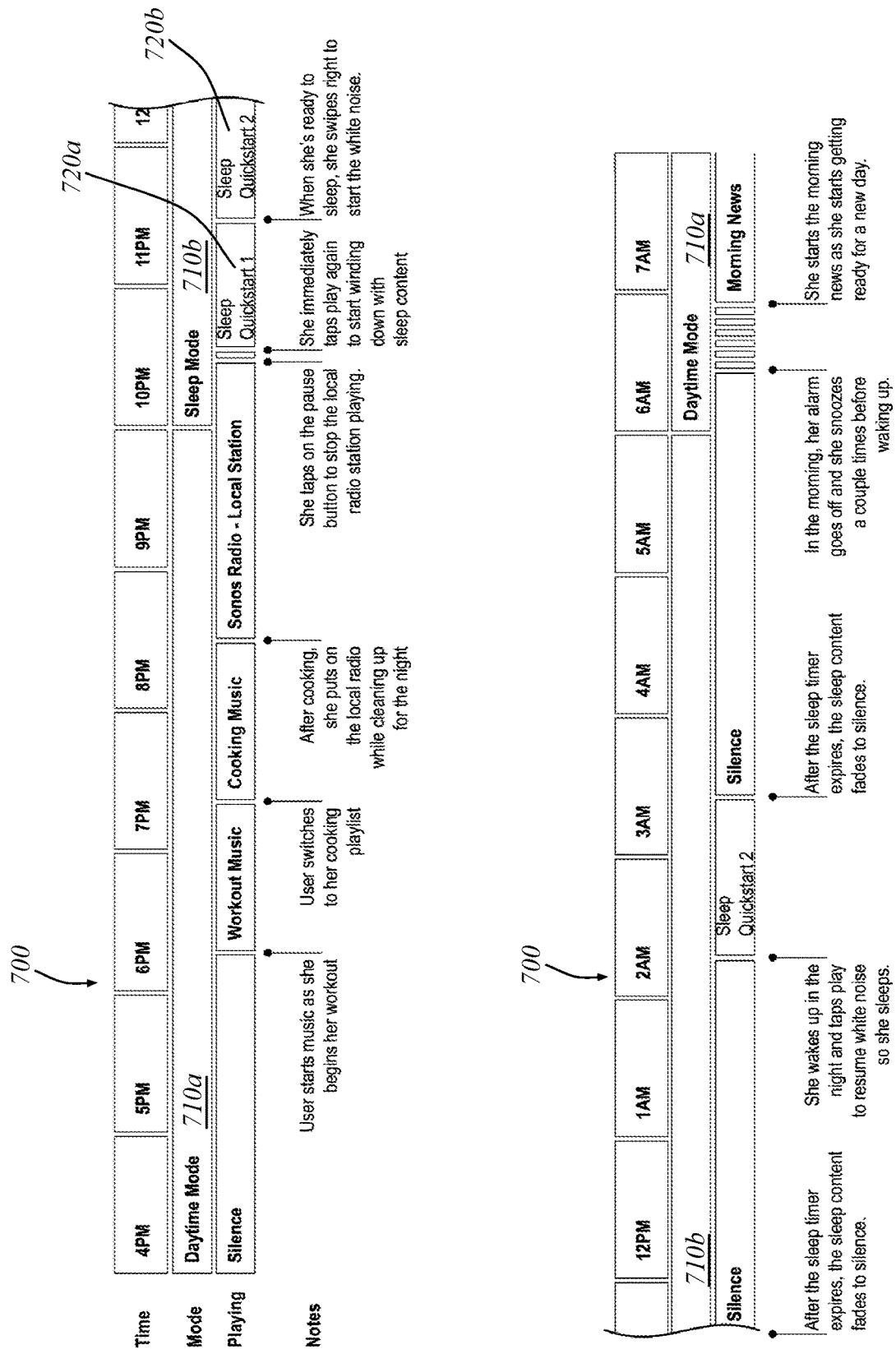
FIG. 7 is a schematic of a timeline associated with a playback device in accordance with aspects of the disclosed technology.

FIG. 7 is a schematic of a timeline 700 associated with one or more playback devices 110 that are shown as operating within two different playback modes 710. Specifically, the timeline 700 shows that the associated playback devices 110 operating within a daytime playback mode 710a and a sleep playback mode 710b. In some embodiments, the daytime playback mode 710a is considered a default mode of the one or more playback devices 110. For example, in the "default mode" a button normally associated with "play" will cause media content to be played. In contrast, when operating within a playback mode, the play button may be repurposed to perform another function—such as skipping to the next routine, which may not be media content. In some embodiments, the daytime playback mode 710a is not associated with any routines or scenes.

As described above, the daytime playback mode 710a may be considered a default playback mode such that any time period that is not associated with a particular playback mode is automatically associated with the default playback mode (also referred to as the daytime playback mode 710a). For example, one or more playback devices 110 may be associated with a wake-up playback mode from 6 AM until 8 AM and then again with a sleep playback mode 710b from 10 PM until 6 AM. In such a configuration, the time period from 8 AM until 10 PM may automatically be associated with the daytime playback mode 710a.

One will appreciate the depicted timeline 700 is only exemplary of many different possible configurations of playback modes 710. In the depicted embodiment, the timeline 700 depicts the daytime playback mode 710a as extending from 6 AM until 10 PM. During the daytime playback mode 710a the user's alarm sounds between 6 AM and 7 PM. The user silences that alarm before completely waking up. Once awake, the user starts to listen to the morning news on one or more playback devices 110. The user may initiate the morning news through any number of different means such as, but not limited to: a vocal command to "play news," a physical user interface integrated into the one or more playback devices 110, a command entered into a control device (such as a mobile phone), a routine that automatically causes the morning news to play at a particular time of day, or any number of ways described herein.

At some point after listening to the news, the user silences the one or more playback devices 110. After 6 PM, the user starts to listen to workout music. As described above with respect to the morning news, there are a number of different ways that the user can start her workout music. After working out, the user may switch to her cooking music while she prepares her evening meal. Once she has finished eating, the user may cause the one or more playback devices 110 to play a local radio station while she cleans up.

At 10 PM, the one or more playback devices 110 receive a playback mode indication. As used herein, a playback mode indication comprises a command that causes the one or more playback devices 110 to enter into a playback mode 710. The playback mode indication may be received from a user, a remote server, a control device, the one or more playback devices, or be generated by a trigger condition. For example, the playback mode indication depicted with respect to the timeline 700 comprises a trigger condition in the form of a time-based trigger that causes the one or more playback devices 110 to enter the sleep playback mode 710b at 10 PM. In some embodiments, one or more of the playback devices 110, a control device, or a remote server may be configured to determine that a trigger condition has occurred. For example, trigger conditions may comprise a particular time, a geolocation of a user, a button press, a vocal command, a signal from an IoT device, a signal from a cloud service, or any other detectable condition or signal.

After receiving the playback mode indication, the one or more playback devices 110 operate within the indicated playback mode 710—in this example the sleep playback mode 710b. After initiating operation of the sleep playback mode 710b, the one or more playback devices 110 access a particular set of routines that is associated with the sleep playback mode 710b. In various different embodiments, the one or more playback devices 110 access the particular set of routines from local memory, from a local network device, from a control device, or from a cloud network 102.

The sleep playback mode 710b depicted in FIG. 7 is associated with one or more routines that cause the one or more playback devices to play back media content with a user-defined acoustic parameter. Specifically, the sleep playback mode 710b is associated with a sleep quickstart 1 routine 720a and a sleep quickstart 2 routine 720b. As used herein a "quickstart routine" or "quickstart" is a type of routine that is set to trigger by some action, such as a button press or control API command. A quickstart routine provides easy, fast access to specific media content. In some embodiments, there may be a limited number of quickstart routines that can be set. Additionally, a user-defined acoustic parameter may comprise a volume level, a mix level, a balance level, or a media content-specific variable. A media content-specific variable allows a user to specify acoustic attributes that are unique to the particular media content. For example, the particular media content may comprise one or more component tracks within the media content that can be independently adjusted (e.g., track speed, track sound, track channel, track balance, and other related attributes). For example, one track may comprise the sound of ocean waves. As such, a user can increase the rhythm of the waves, while the other tracks (e.g., the sound of seagulls and wind) continue to play at the original speed. The one or more routines also comprise one or more user interface interactions that are configured to cause the one or more playback devices 110 to advance between the one or more routines within the particular set of routines.

In some embodiments, as soon the particular playback mode is initiated, the one or more playback devices 110 will automatically begin to execute the first routine in the particular set of routines. In contrast, in some embodiments, the one or more playback devices 110 will continue to play back the media content that the one or more playback devices 110 were playing prior to the start of the particular playback mode. For example, as depicted in FIG. 7, the local radio station continues to play past the start of the sleep playback mode 710b until the user taps pause on a user interface 113 associated with the one or more playback devices 110. Once the user taps "play" the first routine of the sleep playback mode is executed.

Figure 8A:
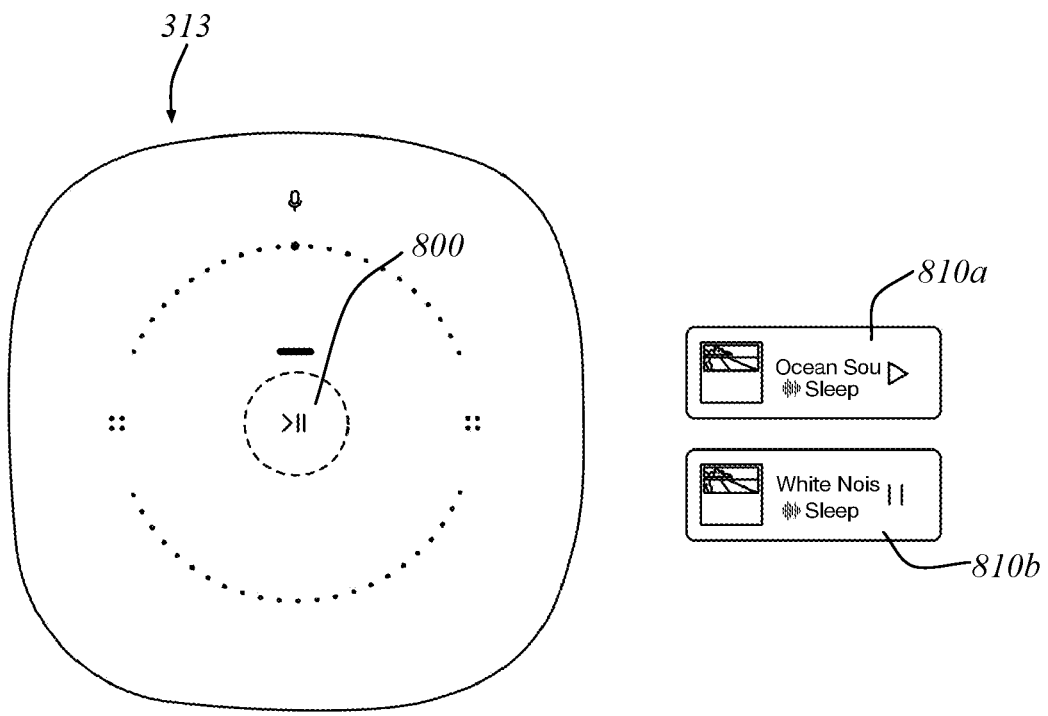
FIGS. 8A and 8B are schematic diagrams of a user interface of a playback device configured in accordance with aspects of the disclosed technology.
Figure 8B:
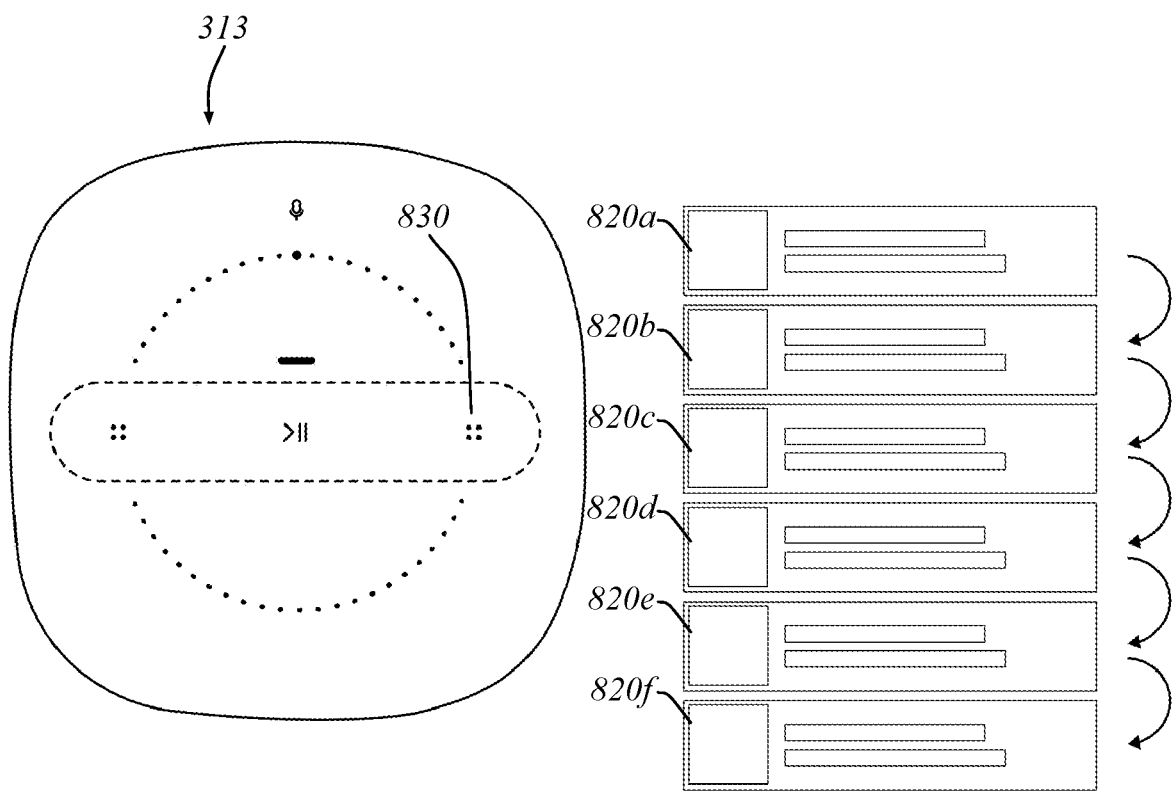

FIGS. 8A and 8B are schematic diagrams of a user interface 313 (also referred to as user interface 113) of a playback device 110a configured to receive one or more user interface interactions. In some embodiments, the user interface 313 comprises one or more buttons integrated into a control surface of the playback device 110. One will appreciate, however, that in additional or alternative embodiments the user interface may comprise a voice user interface (e.g., a VAS), physical knobs, a camera, touch screen or surface, or any other means for input. As depicted in FIG. 8A, pressing the play button 800 causes the one or more playback devices 110 to execute at least one routine from the set of routines. For example, once the user taps a "play" button, sleep quickstart 1 routine 720a is executed when the playback device 110a is in sleep mode. In this example, sleep quickstart 1 routine 720a may comprise soothing ocean sounds that help the user fall asleep.

User interface elements 810a, 810b depict exemplary visual elements that may be presented on a control device 130 when the one or more playback devices 110 are operating in sleep playback mode. These visual elements may be displayed on a screen on or associated with the playback device 110 or on a controller of the playback device 110. As depicted, pressing the play button within user interface element 810a causes the playback device 110 to play ocean sounds. When the user activates a skip or next function, the control device 130 causes the one or more playback devices 110 to advance to the sleep quickstart 2 routine 720b, which in turn causes the one or more playback devices 110 to play white noise.

FIG. 8B depicts the user interface with an ordered set of routines 820(a-f). In this depicted example, after receiving an indication of a user interface interaction 830, such as a swipe across, or a selection of, at least one of the one or more buttons, the playback device 110 advances to a particular routine of the one or more routines. In particular, in the depicted example, each time a user swipes the buttons the one or more playback devices 110 advance to the next routine within the ordered set of routines 820(a-f). As such, in some embodiments, the one or more routines associated with a particular playback mode are ordered within a set, such that the routines are executed in a particular order. One will appreciate that the one or more routines may define any number of different user interface interactions that can be used to execute, stop, pause, advance, or otherwise interact with the routines. Further, the ordered set of routines 820 (a-f) may comprise any number of different types of media content or types of actions performed by the one or more playback devices 110. For instance, one or more routines may comprise a dynamic weather report, a game (e.g., a quiz), an interaction with an IoT device (e.g., dimming a light), or any number of other programmable actions.

Figure 9A:
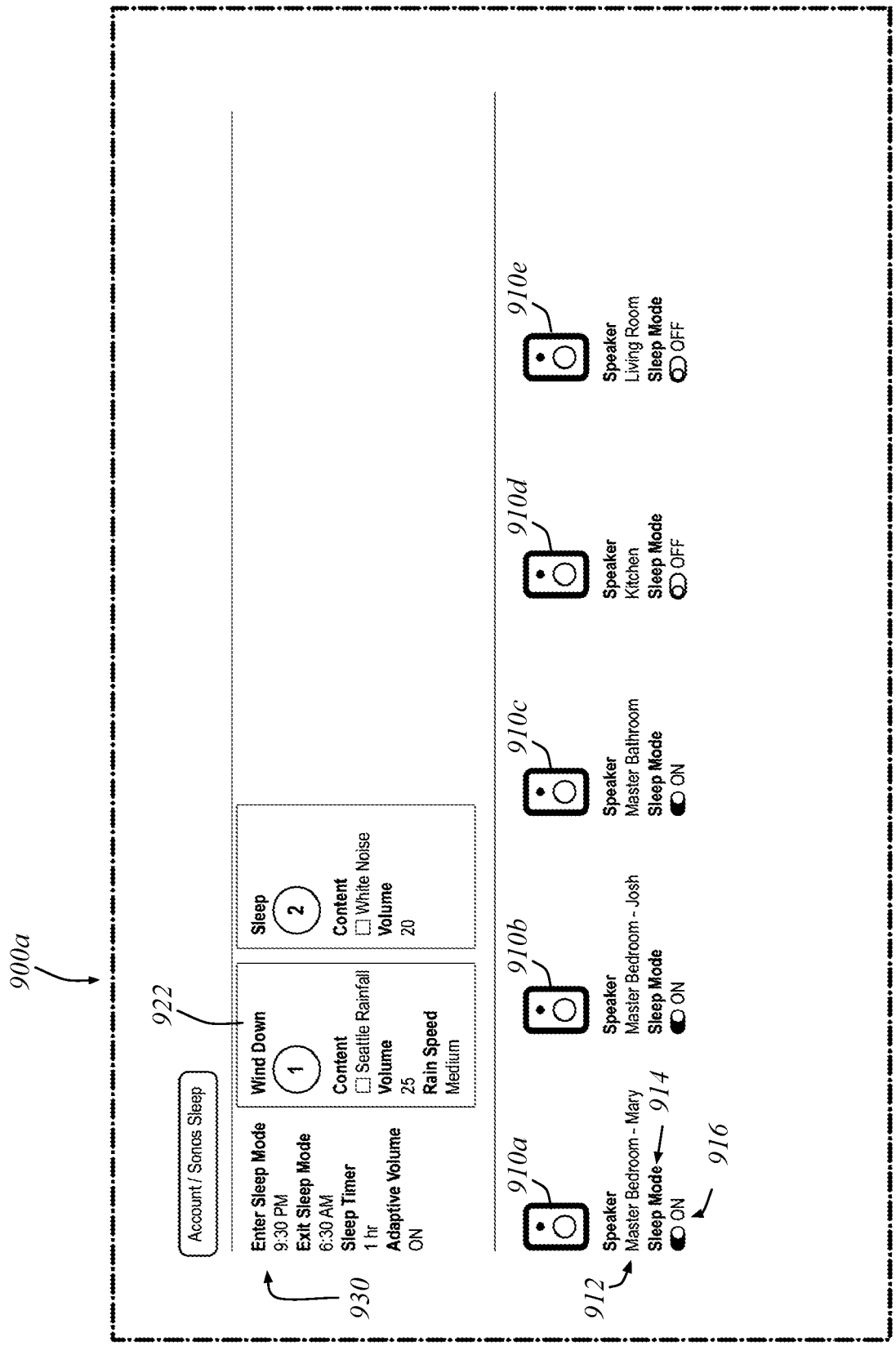
FIGS. 9A and 9B are schematic diagrams of a user interface of a control device configured in accordance with aspects of the disclosed technology.

FIGS. 9A-15B depict various different embodiments of playback mode interfaces. In some embodiments, the playback mode interfaces comprise configuration interfaces that are used to configure and/or launch different playback modes or routines. In some embodiments, the playback mode interfaces comprise dashboard interfaces that are used to show a status of playback devices 110 within a household. The playback mode interfaces depicted herein are provided for sake of example and explanation, and do not limit potential additional or alternative embodiments of interfaces to any particular form or device. Turning now to specific interfaces, FIGS. 9A and 9B are schematic diagrams of related playback mode interfaces 900a, 900b (also referred to herein interchangeably as "configuration interfaces" or "dashboard interfaces"). The playback mode interfaces 900a, 990b may be displayed on a control device 130 for use in creating or modify routines and playback modes or a dashboard device for use in viewing and monitoring the status of playback devices 110 within a household. The depicted playback mode interfaces 900a and 900b are exemplary and can be presented on any device with a viewable display (e.g., control device 530). Additionally, the visual aspects of the playback mode interfaces 900a and 900b are also exemplary and in some embodiments routines can be modified and/or created using voice commands without the presence of a viewable display. As such, the playback mode interfaces may comprise at least one microphone configured to receive voice commands or a user interface configured to receive physical inputs from a user.

The control device 130 can receive, via a playback mode interface 900a and 900b, one or more first user inputs associating a particular routine (also referred to as a particular "scene") with a particular playback mode and associating the particular playback mode with one or more playback devices. For example, configuration interface 900a depicts multiple playback device icons 910(a-e) that each represent a different playback device 110 (in e.g., speakers) within a particular media playback system 100. The depicted playback device icons 910(a-e) are each associated with a playback device name 912, a playback device mode 914, and a playback device mode status 916. Playback mode interface 900b depicts two different rendered views 940a, 940b within the playback mode interface 900b. Rendered view 940a displays to a user various sleep quickstarts 950a, 950b. If a user selects the "Sleep Quickstarts" option 960, the playback mode interface 900b displays the second rendered view 940b. Within the second rendered view 940b, a user it able to further customize the sleep quickstarts 950a, 950b by selecting the quickstarts individually. A user may also be able to launch a sleep quickstart 950a, 950b from either playback mode interfaces 900a or playback mode interface 900b. One will appreciate, however, that additional or alternative embodiments may display different information associated with each playback device 110.

The playback mode interface 900a also depicts various user-defined acoustic parameters that can be associated with media content. Similar options may also be available to the user through playback mode interface 900b. For example, a first routine 922 is associated with instructions that cause a playback setting of one or more playback devices 110 to be associated with particular media content, in this case media content, or nature sounds, referred to as "Seattle Rainfall." The user-defined acoustic parameters include a user defined volume of "25" and a media content-specific settings relating to the rain speed, in this case "medium." Additionally, in some embodiments, the user-defined acoustic parameters also include the individual playback devices 110 that are associated with the first routine 922. For example, in the depicted embodiment, the user has turned on the playback devices mode status 916 of the playback devices 110 associated with playback device icons 910a, 910b, and 910c. As such, the first routine 922 is configured to cause the audio content "Seattle Rainfall" to play on the selected playback devices 110.

The playback mode interface 900a, 900b also provides the user with the ability to associate a particular trigger condition with a particular routine. For example, in FIG. 9A the user indicated set a trigger condition field 930 for the playback devices 110 to enter sleep mode at 9:30 PM. Additionally, the user sets a conditional trigger for the playback devices 110 to exit sleep mode at 6:30 AM. The trigger conditions define conditions that causes the particular routine to be executed or exited. Accordingly, at 9:30 PM a sleep playback mode would be executed at the "Master Bedroom-Mary" playback device, "Master Bedroom-Josh," playback device, and the "Master Bathroom" playback device. At 6:30 AM the playback devices 110 would exit the sleep playback mode.

Many different options may be provided to a user relating to trigger conditions. For example, trigger conditions may comprise a particular time, a geolocation of a user, a button press, a vocal command, a signal from an IoT device, a signal from a cloud network 102, or any other detectable condition or signal. In some embodiments, a trigger condition is identified at a server that is remote to the playback device 420 (e.g., computing device 106), at the one or more playback devices 110, or at a control device 130. In some embodiments, a user is able to select and revise one or more trigger conditions associated with a playback mode or routine. Alternatively, in some embodiments trigger conditions are built into particular playback modes or routines and are not user adjustable.

For example, a user may desire for one or more playback devices to enter a welcome home playback mode whenever the user's geolocation is detected as returning to her home. The user may have a mobile phone that is associated with a user account stored in the cloud network 102. The user's mobile phone may communicate with the cloud network 102 to indicate the user's current geolocation. When the cloud network 102 detects that the user, who was previously not at home, is not traveling home, the cloud network 102 communicates an instruction that causes the one or more playback devices to enter the welcome home playback mode. The instruction communicated by the cloud network 102 may comprise a current geolocation of the user or may comprise a command to enter the welcome home playback mode.

As such, in some embodiments, the media playback system 100 may process the geolocation information locally and determine whether to enter the welcome home playback mode, or the cloud network 102 may process the geolocation information and directly issue a command that causes the media playback system 100 to enter the welcome home playback mode. Similarly, other trigger conditions can be processed locally within the media playback system 100, remotely in the cloud network 102, or in some combination of the two. In some embodiments, once the user creates or modifies a routine or playback mode in the playback mode interface 900a, 900b, the control device 130 transmits, via a communication interface, the particular routine to a server (e.g., computing device 106) remote from the control device 130.

Additionally, in some embodiments, the trigger condition field 930 may provide for options for third-party services or third-party devices to provide a trigger condition. For instance, a third-party robotic vacuum may be configured to send an indication of a trigger condition whenever the robotic vacuum begins vacuuming. In response to receiving the indication of the trigger condition, a routine may cause the one or more playback devices 110 to increase their volume to a specified level in order to drown out the sounds of the robotic vacuum. Further discussion of the process for receiving indications of trigger conditions from third parties is provided with respect to FIGS. 16-18.

Additionally, in some embodiments, the control device 130 can receive through the playback mode interface 900a, 900b user input associating a particular routine (e.g., routine 922) with multiple playback devices (e.g., playback device icons 910(a-c) each represent a different playback device 110). The routines may configure the playback devices 110 associated with the playback device icons 910(a-c) to play one or more media content files—in the depicted case, "Seattle Rainfall" and "White Noise." Additionally, one or more media content settings may configure the multiple playback devices to play the one or more media content with a user-defined acoustic parameter. For example, in accordance with routine 922a, the playback devices are configured to play back "Seattle Rainfall" with a rain speed of "medium."

Further, in some embodiments, the one or more playback devices 110 may be "bonded" or "merged" to form specified groups, or zones, as described with respect to FIGS. 1L through 1M. As described above, bonded playback devices may have different playback responsibilities (e.g., channel responsibilities). Further, with respect to the configuration interfaces 900(a-e), a bonded or merged pair of playback devices or a zone of playback devices may be represented by a single UI entity (i.e., a playback device icon 910). Accordingly, after receiving a playback mode indication, the control device 130 can cause one or more playback devices within a predefined group, or zone, to operate within the particular playback mode. In some embodiments, the particular playback mode may be selected from a set of multiple playback modes.

In some embodiments, the one or more playback devices 110 may be assigned different playback roles in a group such as background, foreground, or ambient. For example, a group of multiple playback devices 110 may be configured to play beach sounds. A routine associated with the beach sounds may further configure a first subset of the group of multiple playback devices 110 to play wave sounds and a second subset of the group of multiple playback devices 110 to play the sounds of birds and wind. In some embodiments, a playback mode interface 900a, 900b may provide a user with the ability to configure the associated routine such that the playback devices within the different subsets are selected by the user. For instance, the user may select playback devices at the front of a room to play the wave sounds and playback devices at the back of the room to play the bird and wind sounds. The user may also be able to customize volume levels, speed levels, and other user-defined acoustic parameters on a subset-level basis. For example, the user may configure the speed of the waves to ramp up over time and the speed of the birds and the wind to ramp down over time.

Accordingly, one or more media content settings associated with routines or scenes may configure at least one playback device selected from a group of multiple playback devices to play the media content in a different manner than at least one other playback device selected from the multiple playback devices. For example, one of the playback devices may play a different audio channel than the other playback devices. In some embodiments, a user may be able to further specify different playback devices behaviors. For example, a user may specify that a particular playback device play back media content at a louder volume than the other playback devices associated with a particular routine. Additionally, a user may specify that a particular playback device go to sleep at a different time than the other playback devices associated with a particular routine. For instance, a user may desire that a playback device immediately adjacent her bed sleep after an hour, while other playback devices associated with the same routine or scene continue to playback the media content.

In some embodiments, the playback mode interface 900a, 900b may provide a user with an option to set group or room specific trigger conditions. For example, a user may have one or more speakers within the room of a young child. The user may desire that the child be able to turn the music off but not that the child be able to advance through the routines. Accordingly, the playback mode interface 900a, 900b may allow a user to set particular user interface inputs as trigger conditions on some playback devices 110, while turning those trigger conditions off or setting different trigger conditions for other playback devices 110.

Figure 9B:
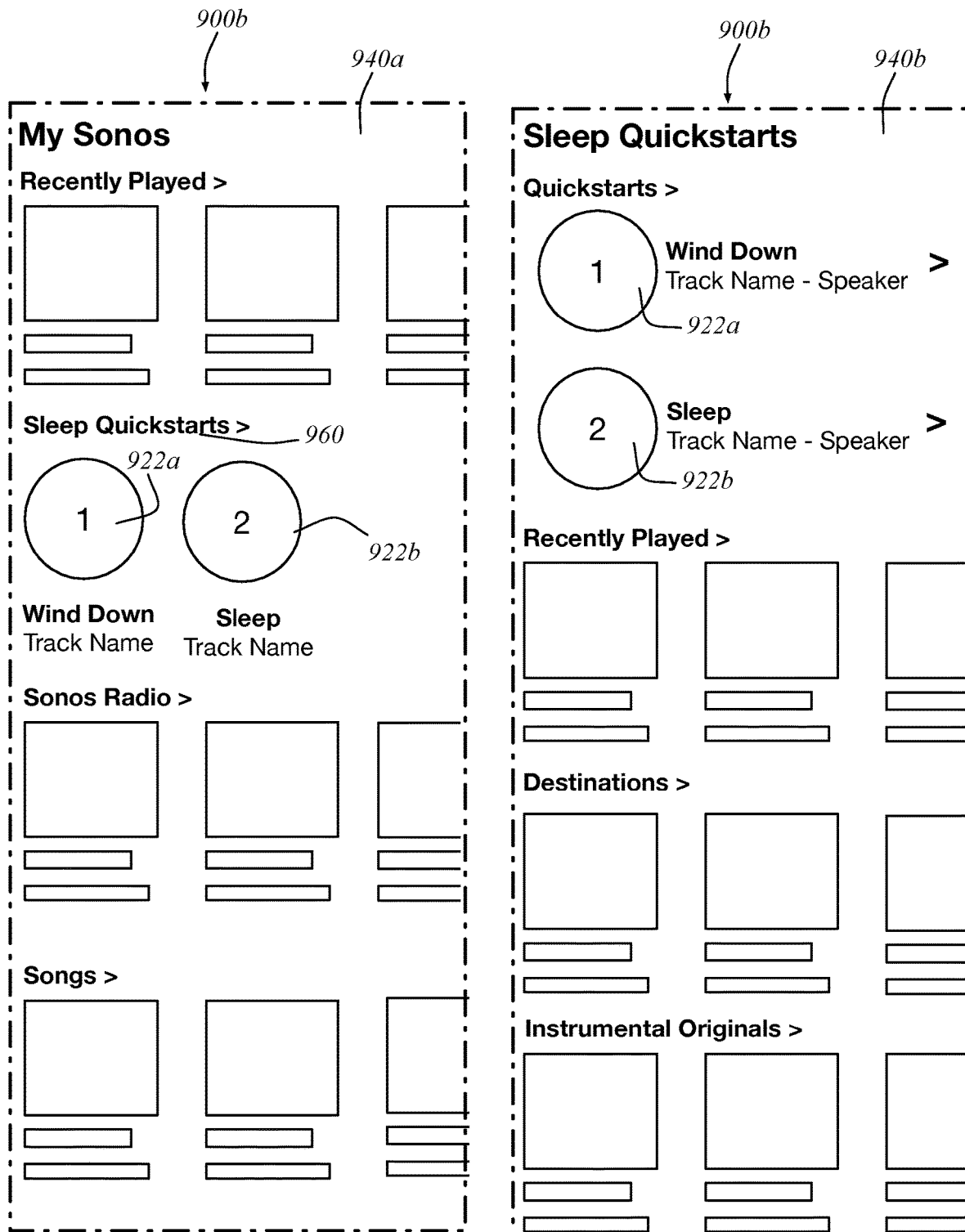

Returning to the playback mode interfaces 900a,b of FIGS. 9A and 9B, the different exemplary configuration interfaces 900a, 900b depict various examples of playback modes and routines being associated with one or more playback devices 110. The functionality and description associated with the playback mode interfaces 900a and 900b can also be extended to the playback mode interfaces disclosed and described in FIGS. 10A-15B. The depicted playback mode interfaces 900a, 900b are configured to allow a user to create a playback modes (e.g., a sleep playback mode) by adjusting various trigger conditions, routines, and user-defined acoustic parameters. Once a playback mode is started, the one or more playback devices 110 will react to the defined trigger conditions and respond to the defined routines.

Figure 10A:
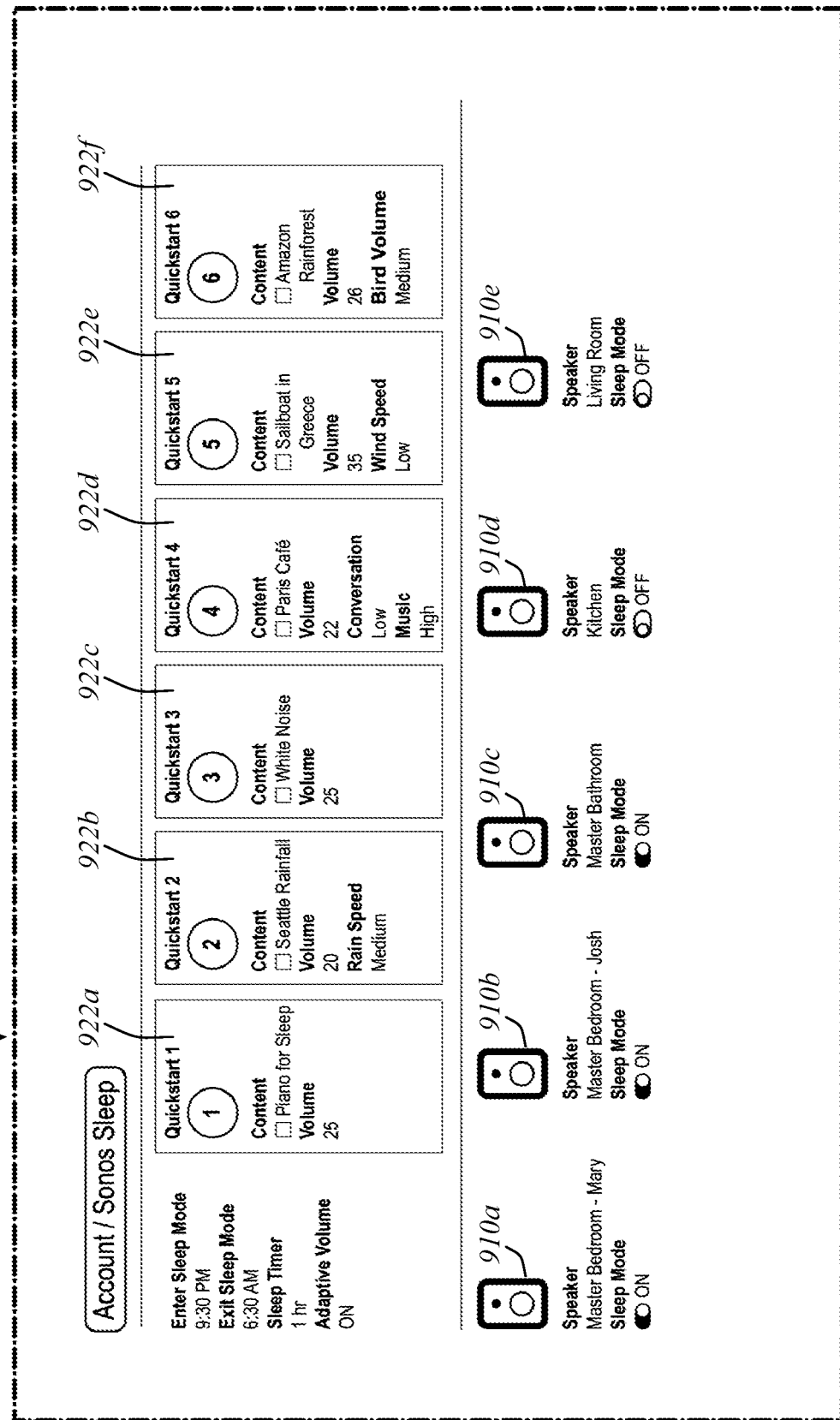
FIGS. 10A and 10B are schematic diagrams of a user interface of a control device configured in accordance with aspects of the disclosed technology.
Figure 10B:
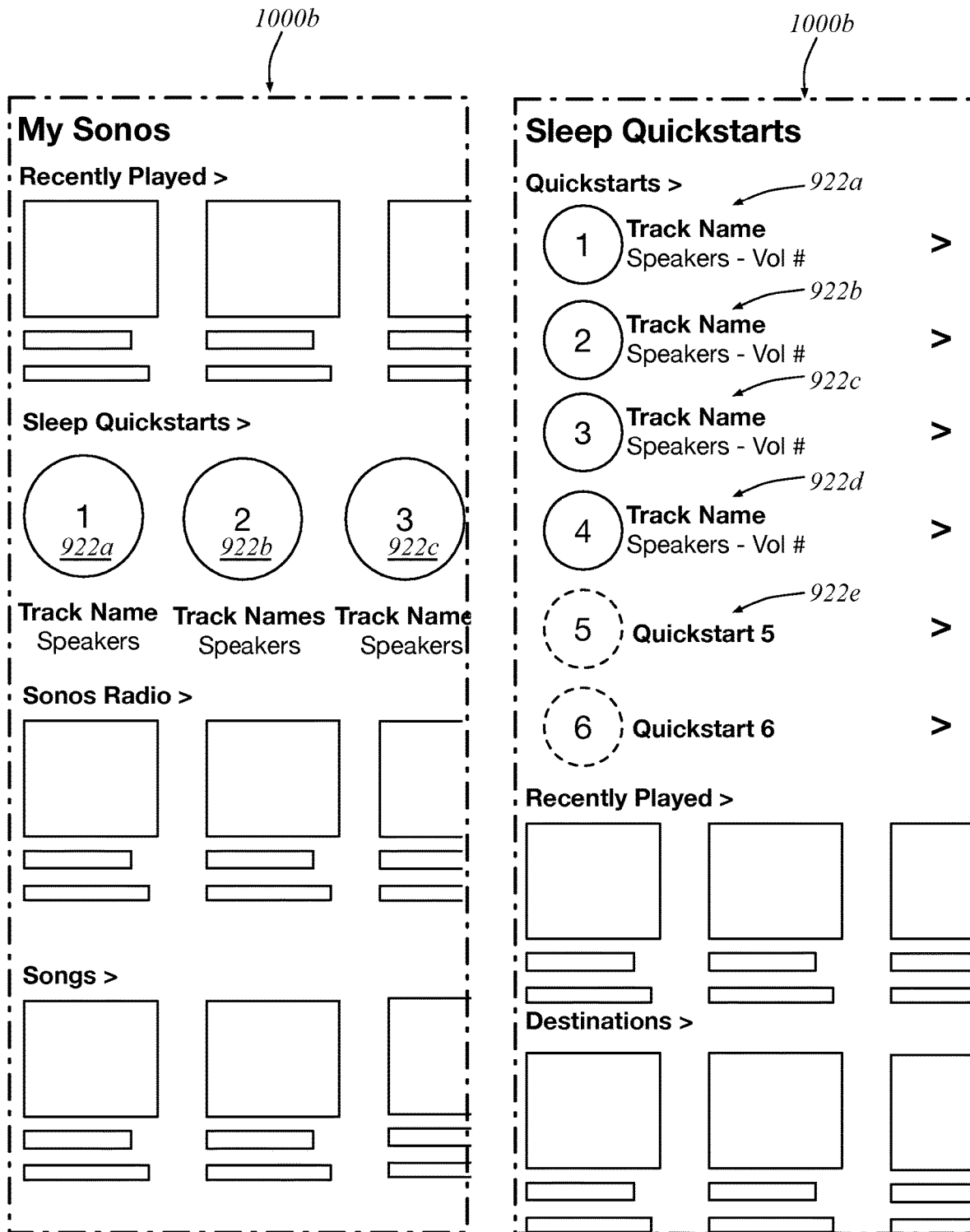

The playback mode interfaces 1000a, 1000b of FIGS. 10A and 10B provides a user with greater flexibility in associating quickstart routines with the sleep playback mode. For example, the user has defined quickstart 1 routine 922a, quickstart 2 routine 922b, quickstart 3 routine 922c, quickstart 4 routine 922d, quickstart 5 routine 922e, and quickstart 6 routine 922f in relation to the sleep playback mode. In the depicted embodiment, each quickstart is associated with different media content and different user-defined acoustic parameters (e.g., volume, "rain speed," "conversation," "music," "wind speed," and "bird volume.") Further, a user is able to indicate which playback devices 110 should be associated with the one or more quick start routines 922(a-f) by selecting the appropriate playback device icons 910(a-e). Additionally, the playback mode interfaces 1000a, 1000b allows a user to arrange the quickstart routines 922(a-c) into a desired sequential order.

Figure 11A:
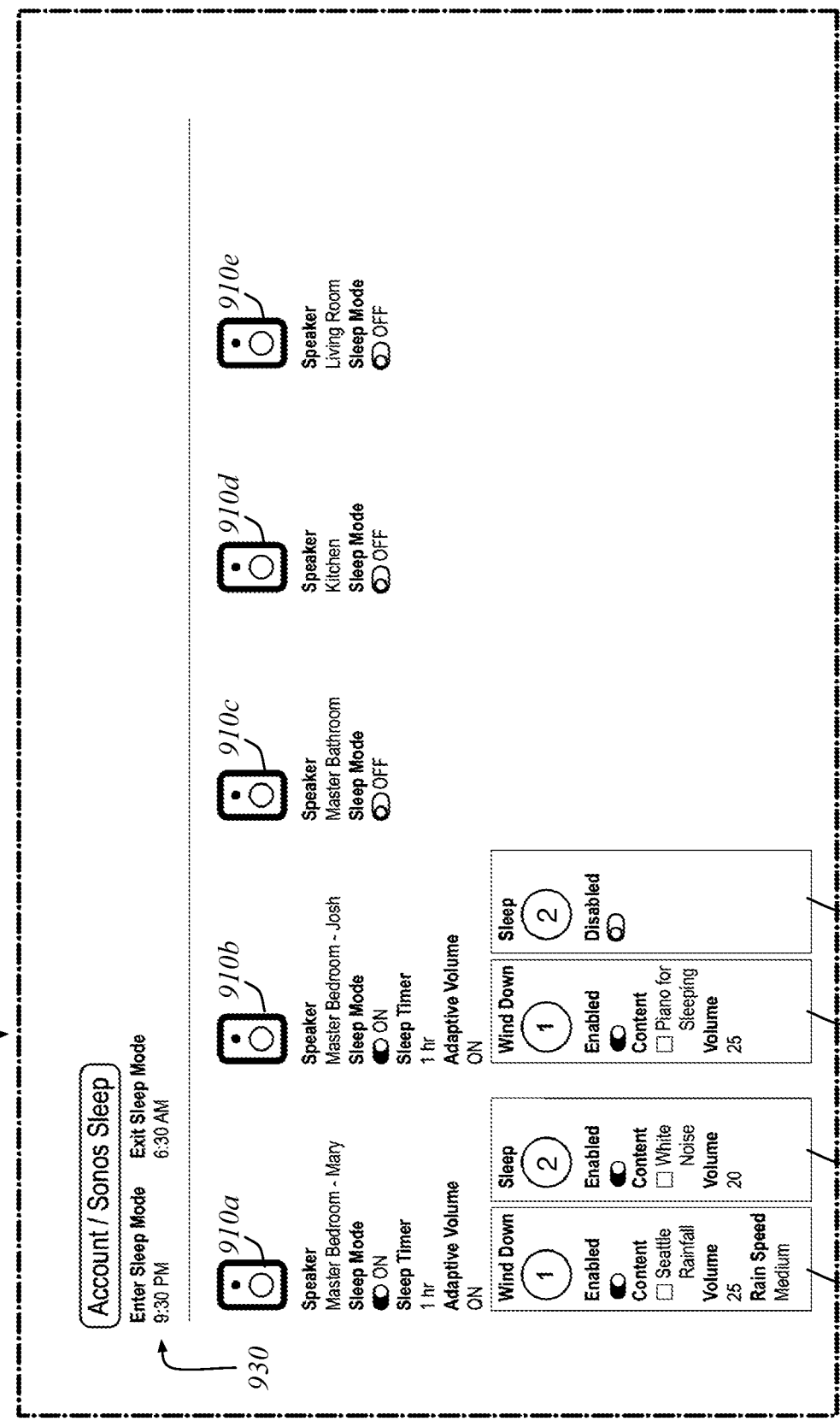
FIGS. 11A and 11B are schematic diagrams of a user interface of a control device configured in accordance with aspects of the disclosed technology.
Figure 11B:
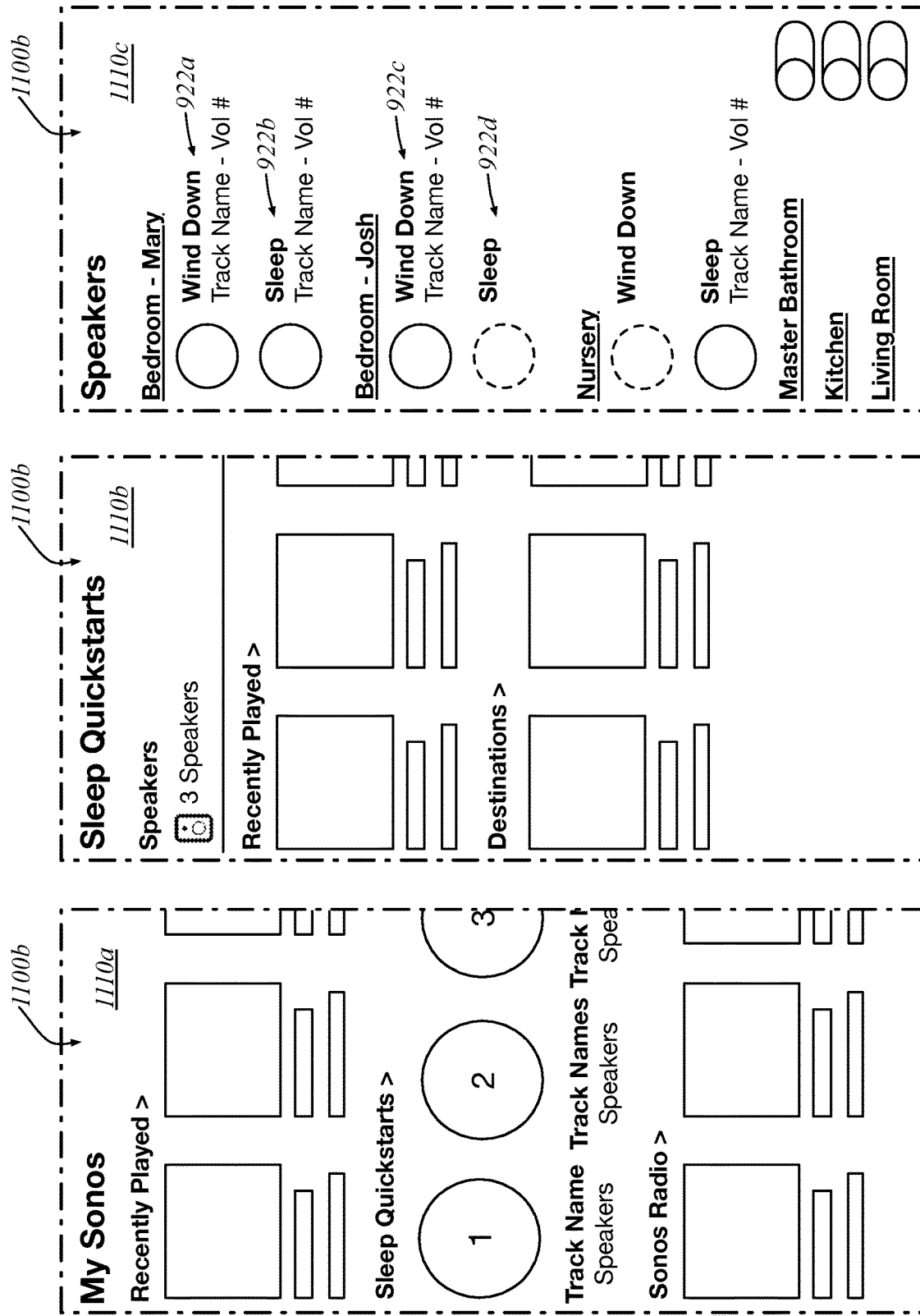

The playback mode interfaces 1100a and 1100b of FIGS. 11A and 11B allows a user to set a trigger condition field 930 for the sleep playback mode. The user is also able to indicate which playback devices should be associated with the sleep playback mode by selecting the appropriate playback device icons 910(a-e). In this embodiment, the user is also able to associate quickstart routines 922(a-d) with specific playback devices 110. For example, as shown on rendered view 1110c of playback mode interface 1100b, a user is able to individually activate different playback devices 110 with a toggle switch and to associate specific quickstart routines 922(a-d) with individual playback devices 110. As depicted, in some embodiments, an inactive quickstart routine 922d may be associated with a toggle switch set to off (as shown in playback mode interface 1100a) or may appear grayed-out (as shown in playback mode interface 1100c). One will appreciate, however, that a number of different user interface elements may be utilized to control and configure the respective playback devices and quickstart routines 922(a-d). For example, a user may be able to associate a particular quickstart routine with playback device by dragging the quickstart routine 922a to an area of the screen associated with a particular playback devices 110a (e.g., the Bedroom–Mary playback device). Further, the user is able to set playback device-specific variables such as a "sleep timer" and whether "adaptive volume" should be active.

Using these playback mode interfaces 1100a and 1100b a user is able to customize how different subsets of playback devices 110 will behave. For instance, a married couple may each have a speaker on their own side of their shared bedroom. Using the playback mode interfaces 1100a and 1100b, each partner may be able to customize how their respective playback device 110 operates within the sleep mode. This allows one or more users the ability to individually control playback devices with respect to the one or more routines 922(a-d). For instance, one partner may wish to have a speaker that is next to their bed sleep sooner than the other partner's speaker that is across the room. As such playback mode interfaces 1100a and 1100b, display a setting for the one or more user-defined acoustic parameters that causes at least one playback device (represented by playback device icon 910a) within the group of the one or more playback devices (represented by playback device icons 910a-910e) to play back the particular media content in a different manner than another playback device of the group of the one or more playback devices. One will appreciate that additional or alternative embodiments may display configurations for the volume, balance, fade, and other acoustic parameters of each speaker.

Playback mode interfaces 1100a and 1100b also provide a user with the ability to enable or disable individual routines 922(a-d) within the sleep playback mode. For example, in playback mode interfaces 1100a and 1100b routine 922d has been disabled. In some embodiments, the routines 922(a-d) are executed as an ordered set. As such, the first routine 922a will be executed, followed by the second routine 922b, and then followed by the third routine 922c. Because the fourth routine 922d has been disabled, the one or more playback devices 110 will stop executing the one or more routines after the third routine 922c completes execution or the ordered set of routines will start over with the first routine 922a.

Figure 12A:
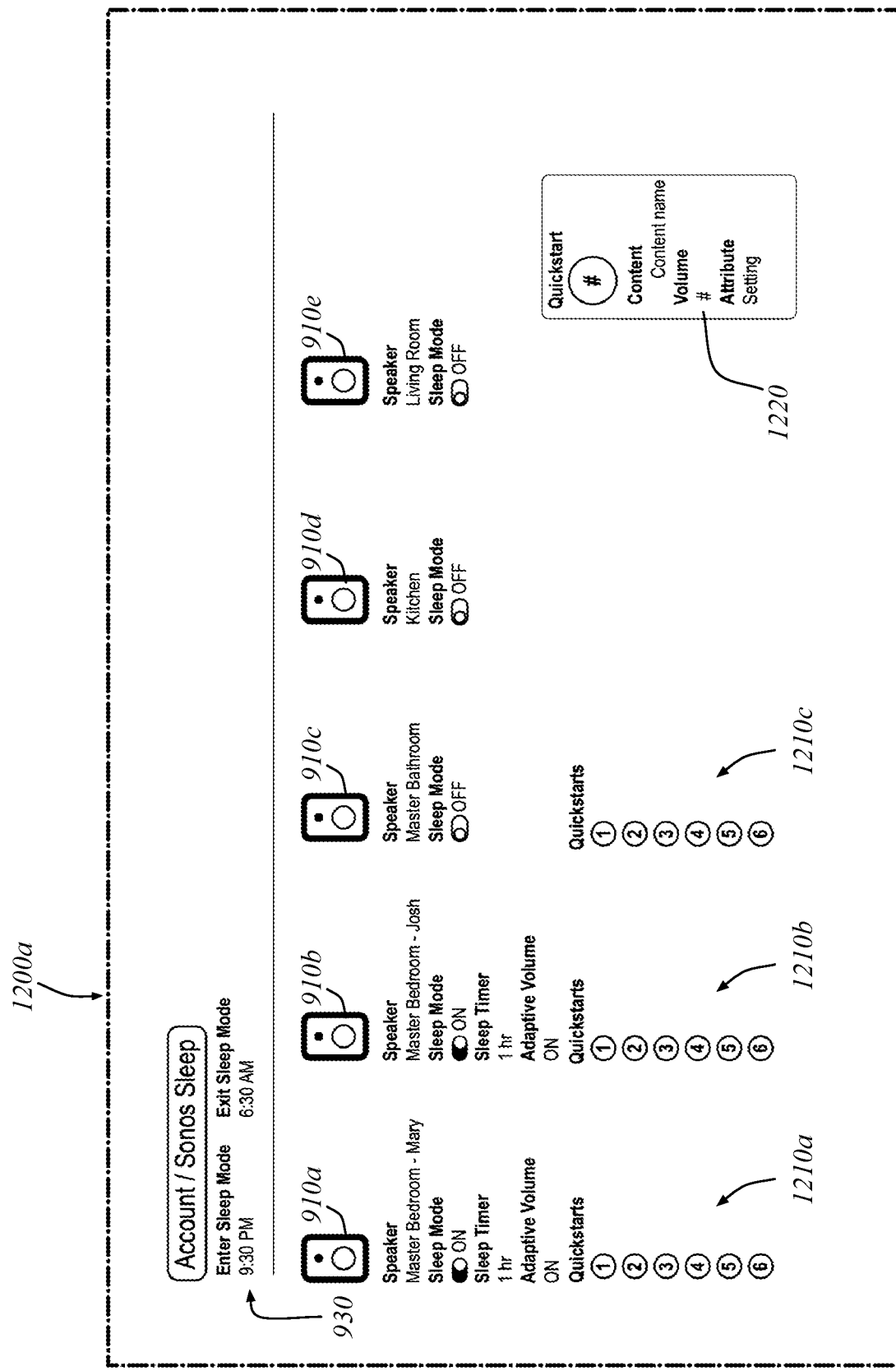
FIGS. 12A and 12B are schematic diagrams of a user interface of a control device configured in accordance with aspects of the disclosed technology.
Figure 12B:
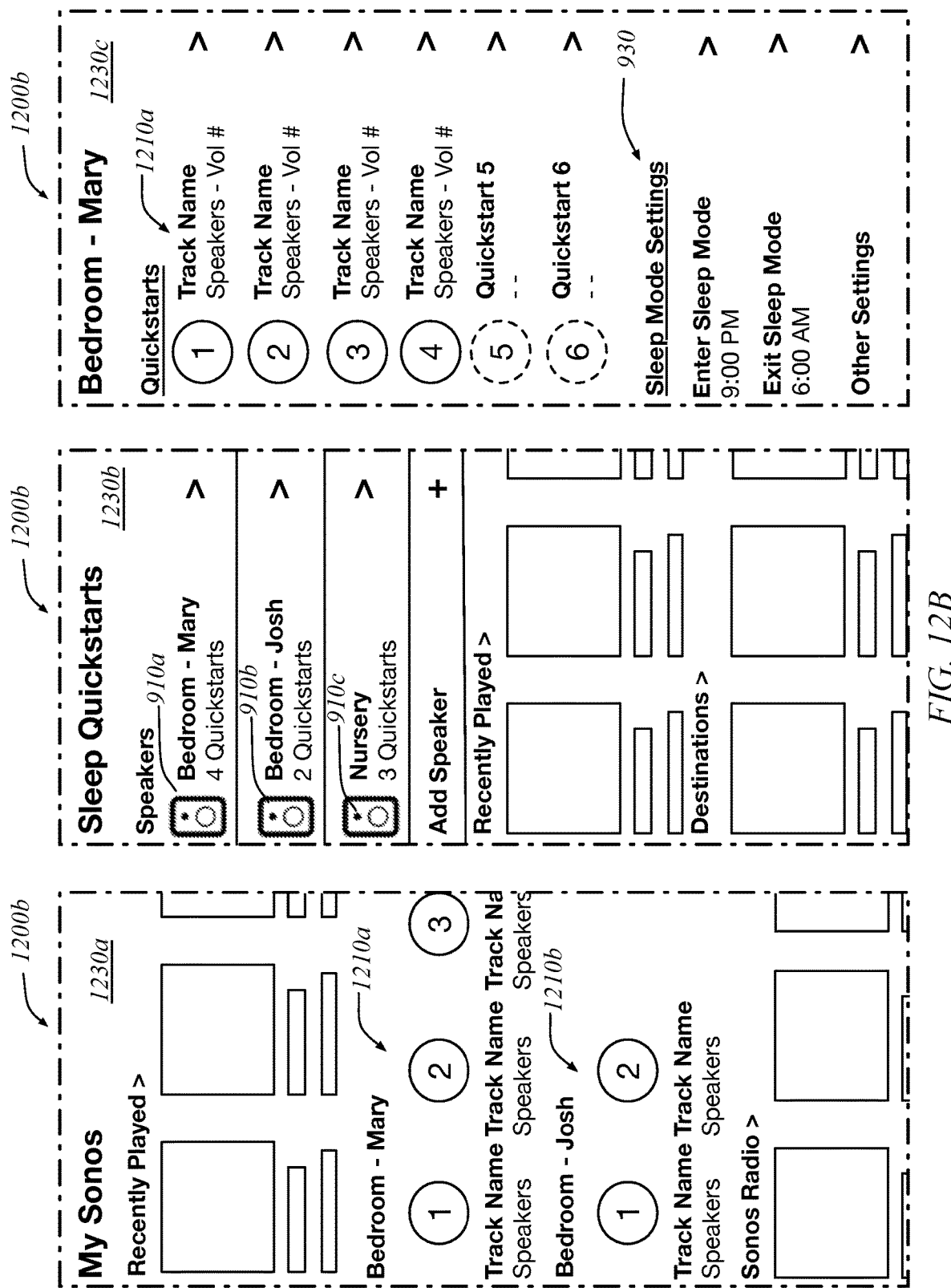

The playback mode interfaces 1200a and 1200b of FIG. 12A and FIG. 12B also allows a user to set a trigger condition field 930 for the sleep playback mode. The user is also able to associate sets of individual quickstart routines 1210(a-c) with individual playback devices. In this exemplary playback mode interface 1200a, a user is able to modify or create a quickstart routine within a routine editing space 1220 of the interface. When a user selects a particular routine from the sets of quickstart routines 1210(a-c), the routine editing space 1220 is populated with information from the selected routine. The user can then modify or create a routine for association with the particular playback device 110. These playback mode interfaces 1200a and 1200b allow a user to associate specific routines, and in turn behaviors, with individual playback devices 110 when the playback devices 110 are in sleep playback mode.

In some embodiments, playback mode interface 1200b comprises three different rendered views 1230(a-c). Rendered view 1230a provides a user with options for executing and accessing the different sets of quickstart routines 1210a and 1210b. Rendered view 1230b displays icons associated with individual playback device 910(a-c). The rendered view 1200b also indicates a number of quickstart routines that are associated with each playback device. If a user selects the icon associated with individual playback device 910a (i.e., "Bedroom–Mary"), the third rendered view 1230c is displayed.

Rendered view 1230c displays the set of quickstart routines 1210a associated with the playback device, "Bedroom–Mary." A user is provided with the ability to select each individual quickstart routine and change the media content, volume level, and various other settings associated with the quickstart routine. Additionally, the rendered view 1230c provides a user with the ability to interact with a trigger condition field 930. In the depicted embodiment, the trigger condition field 930 provides the user with the ability to set a time when the associate playback mode is entered and when it is exited. Other settings may provide a user with the ability to configure trigger conditions that are not related to time.

Figure 13A:
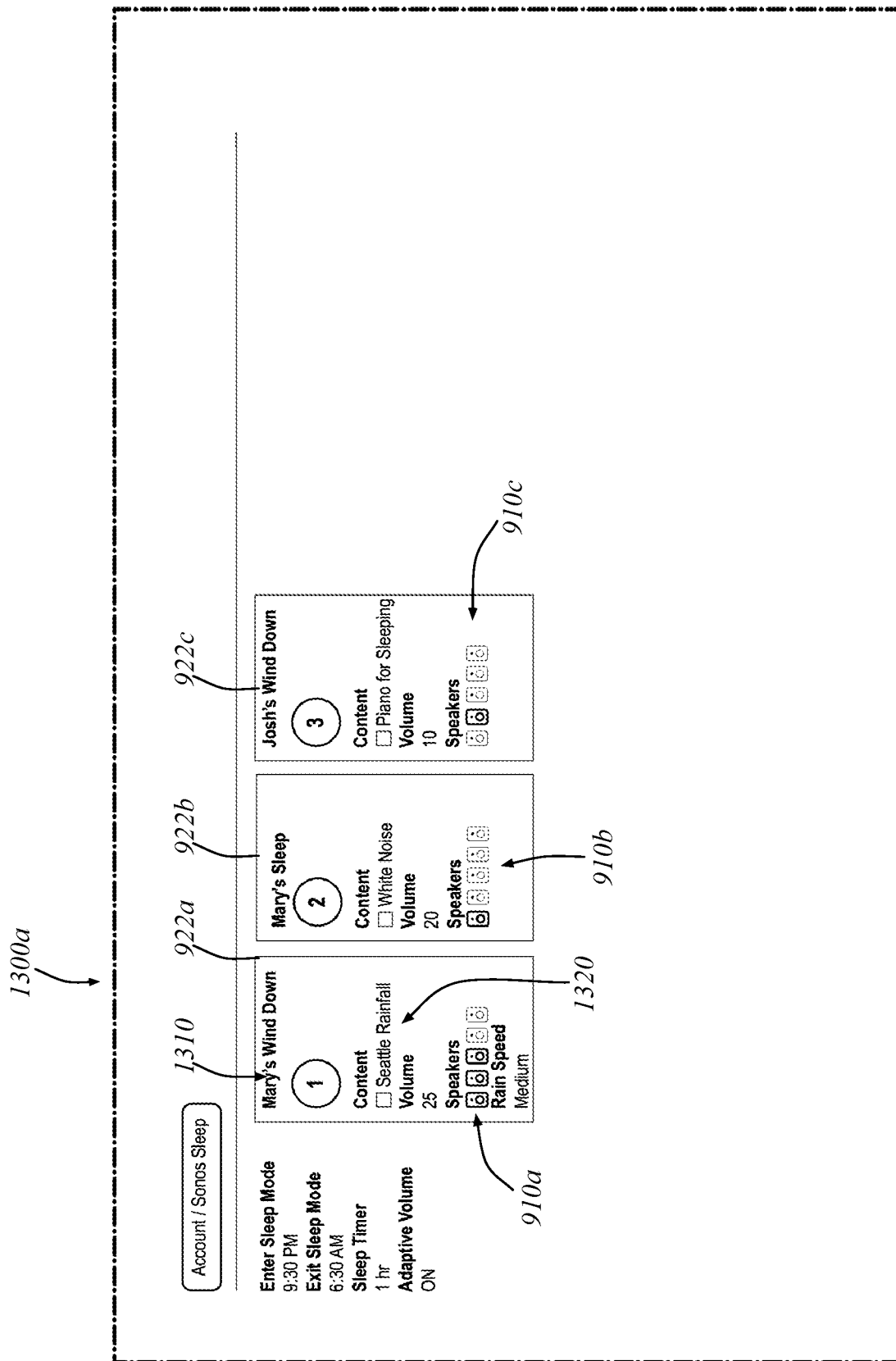
FIGS. 13A and 13B are schematic diagrams of a user interface of a control device configured in accordance with aspects of the disclosed technology.
Figure 13B:
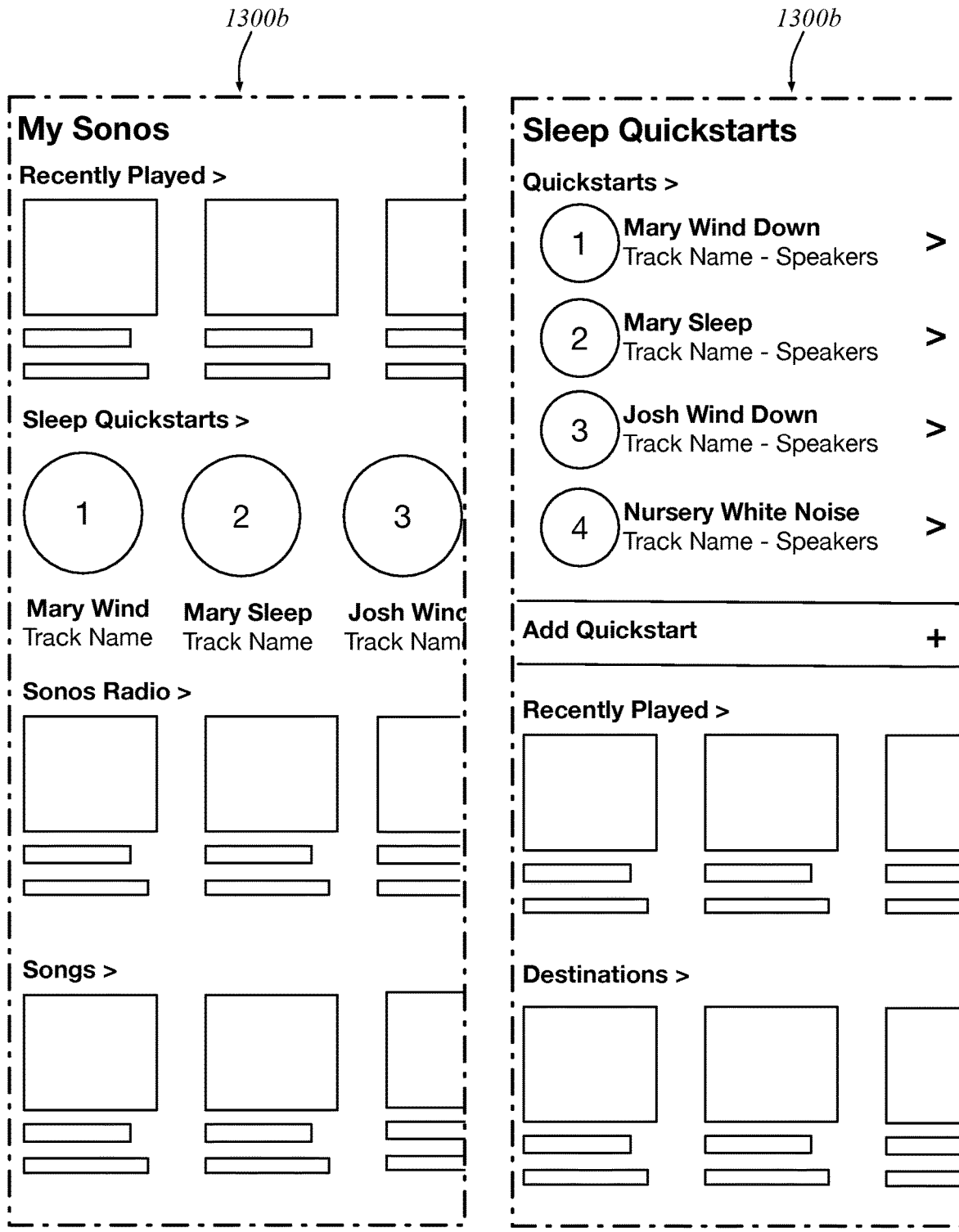

The playback mode interfaces 1300a and 1300b of FIGS. 13A and 13B allow a user to set personalized quickstart routines 922(a-c) that can be executed within the sleep playback mode. In playback mode interfaces 1300a and 1300b, each quickstart routine 922(a-c) is associated with the specific playback devices that it will be executed on (as shown by the playback icons 910(a-c)). As the control device 130 or playback device 110 received user interactions the routines advance sequentially through the routines 922a, 922b, and 922c.

For example, playback mode interfaces 1300a and 1300b can display a representation of a first playback mode (i.e., the sleep playback mode) and a set of routines 922(a-c) associated with the first playback mode. The playback mode interfaces 1300a and 1300b can then receive a selection of the first routine 922a, and in response, display playback settings associated with the first routine 922a. The playback settings may comprise a name 1310 of the first routine 922a and particular media content 1320 associated with the first routine 922a.

The playback mode interfaces 1300a and 1300b may then receive a first user input changing the particular media content from a first media content to a second media content. For example, a user may change from "Seattle Rainfall" to "Ocean Sounds." After receiving the first user input changing the particular media content, the control device 130 transmits, via a communication interface, a first message to update the playback settings associated with the first routine. The first message may be transmitted to one or more playback devices and/or a cloud network 102.

After transmitting the first message, the control device 130 receives one or more user inputs to select a playback device 110 and/or to initiate the first routine. In response to receiving the one or more user inputs, the control device 130 transmits, via the communication interface, a second message to initiate the first routine on the first playback device 110. The corresponding one or more playback devices 110 would then play back the media content "Ocean Sounds." Once a user has finished modifying or creating the routines, or scenes, the control device 130 may communicate the routines to a remote server for storage and/or further processing.

For example, a user may press a skip button on the one or more playback devices 110. The skip button press may constitution a trigger condition. In response to the skip button press, the playback device may execute the "skip" command locally, communicate a "skip" universal plug and play ("uPNP") command through the local network, through an API directly to the control device 130 via a network, or through an API to a cloud network 102 or to the control device 130. After receiving the indication of the trigger condition, the control device 130 may communicate the executable instructions to the playback device 110 for final execution or may communicate through an API to the playback device 110 and cause the playback device to act in a manner defined by the executable instructions.

A control device 130 may then receive one or more second user inputs to activate the particular routine. For example, the control device 130 may receive an indication that a user has pressed a start button that is associated with a first routine within a particular playback mode. After receiving the one or more second user inputs, the control device 130 may transmit a message that causes the appropriate playback devices 110 to playback the particular media content that is defined by the one or more routines in accordance with the one or more media content settings.

Figure 14:
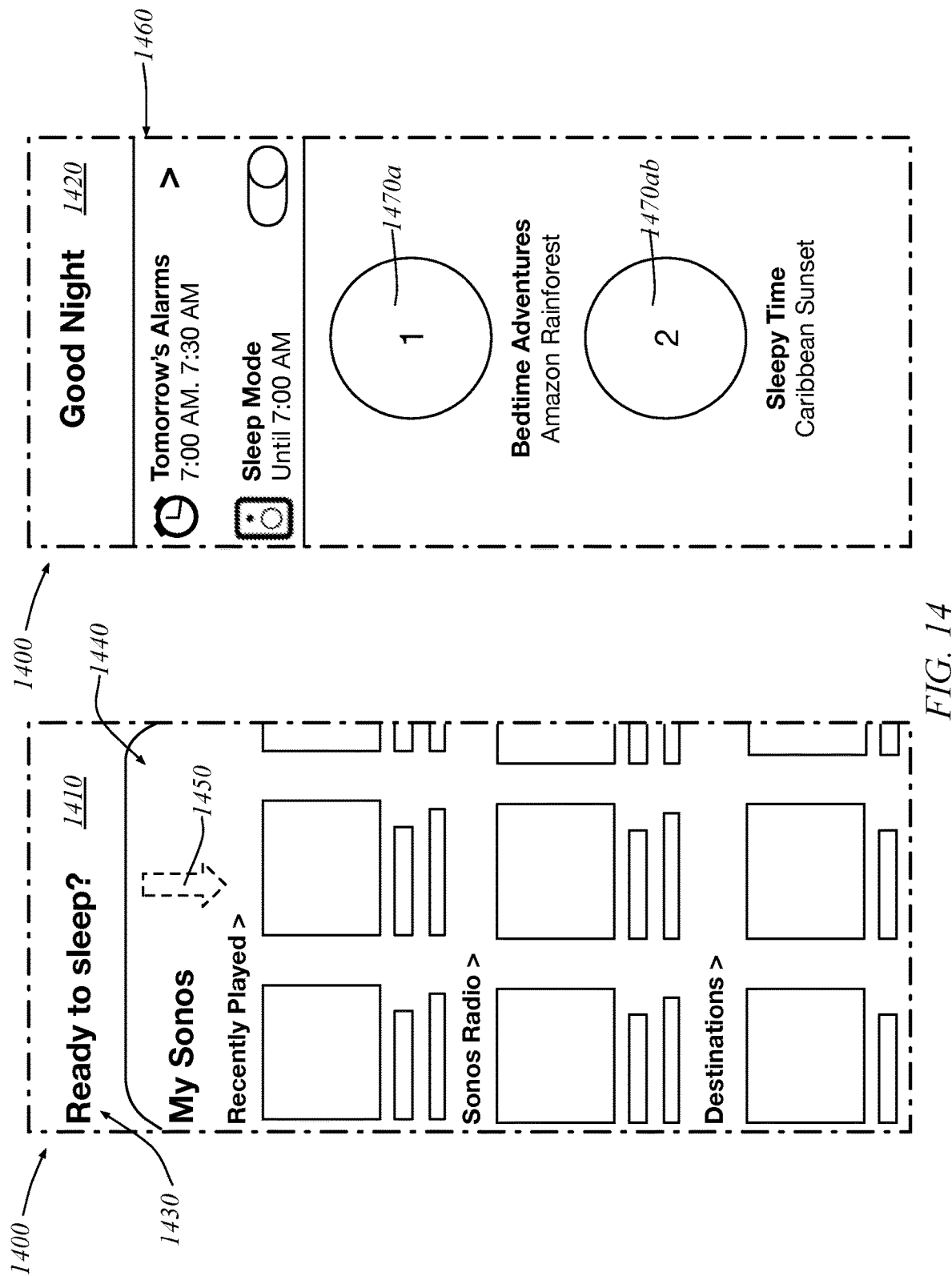
FIG. 14 is a schematic diagram of a user interface of a control device configured in accordance with aspects of the disclosed technology.

FIG. 14 shows a schematic diagram of another playback mode user interface 1400. In some embodiments, the playback mode user interface 1400 may be rendered on a control device 130, such as a smartphone. Rendered view 1410 comprises a prompt 1430 to a user to enter a sleep playback mode. The prompt 1400 may be generated based upon an occurrence of a trigger condition. For example, the user may have previously indicated that the sleep playback mode should begin at 10 PM. The control device 130 may determine that the time is 10 PM and in response display prompt 1430 to the user to enter the sleep playback mode. In some embodiments, the prompt 1430 is only displayed if a user is interacting with a control device 130 during the occurrence of the trigger condition. Otherwise, the playback mode may automatically activate based upon the occurrence of the trigger condition.

In response to seeing the prompt, a user may activate the sleep playback mode by tapping the prompt 1400. Additionally or alternatively, the user may activate the sleep playback mode by swiping down (as indicated by arrow 1450) on the "My Sonos" page 1440. In contrast, the user may dismiss the prompt and avoid activating the sleep playback mode by swiping up in a direction opposite of arrow 1450. One will appreciate that the user interface interactions described above are provided for the sake of example and explanation. Additional or alternative interactions may be used to activate a playback mode.

Rendered view 1420 depicts a playback mode user interface 1400 that displays configuration information about a playback mode. Rendered view 1420 may be displayed in response to a user activating the sleep playback mode in rendered view 1410. Rendered view 1420 includes a settings portion 1460 that allows a user to adjust trigger conditions associated with the sleep playback mode and a toggle to activate or deactivate the sleep playback mode. Rendered view 1420 also displays icons associated with each quickstart routine 1470a, 1470b within the sleep playback mode. In some embodiments, a user can individually activate a particular quickstart routine 1470a, 1470b by selecting the quickstart routine in rendered view 1420. Additionally or alternatively, a user may be able to configure a quickstart routine 1470a, 1470b by selecting the quickstart routine in rendered view 1420.

Figure 15A:
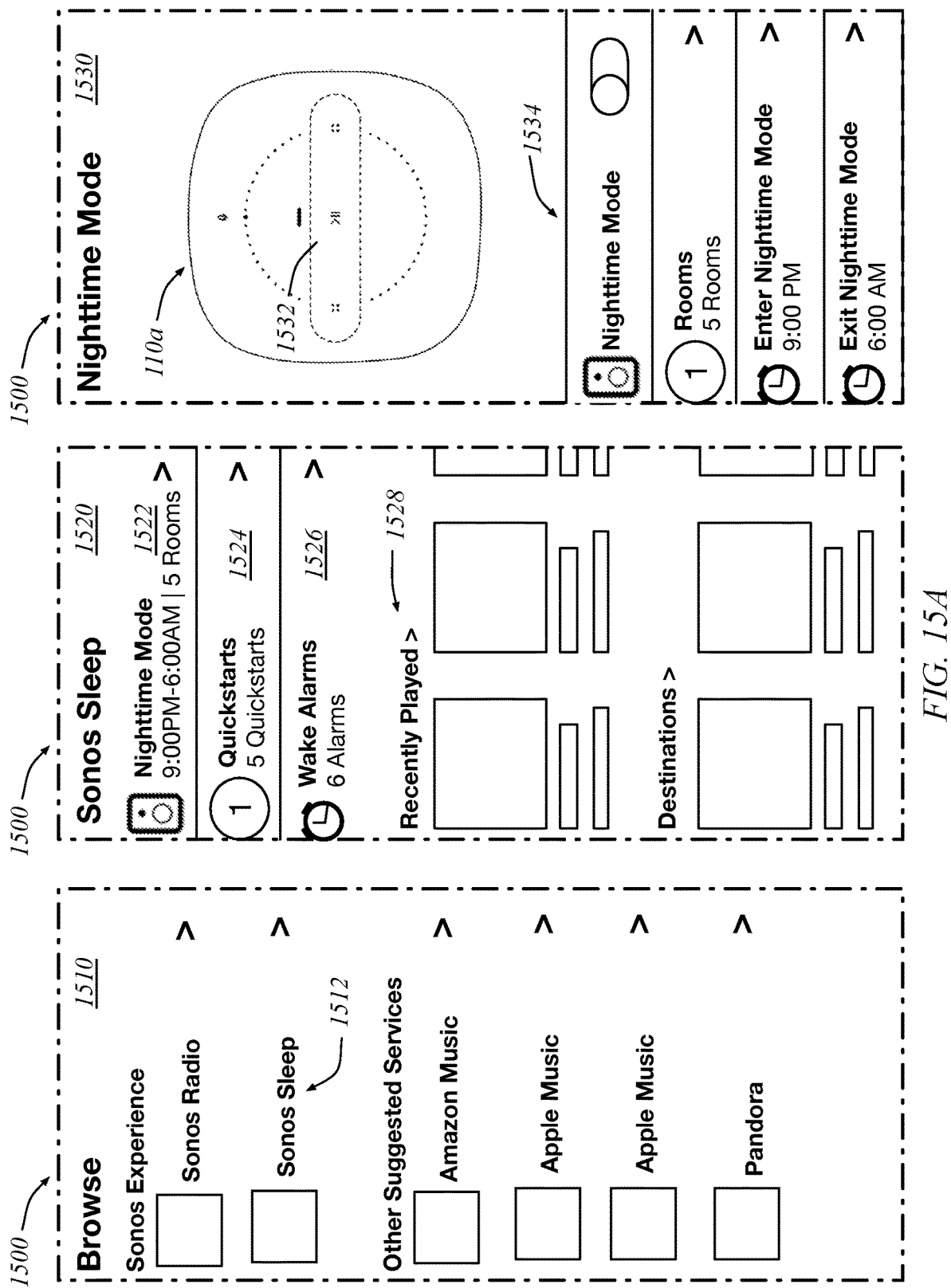
FIGS. 15A and 15B are schematic diagrams of a user interface of a control device configured in accordance with aspects of the disclosed technology.
Figure 15B:
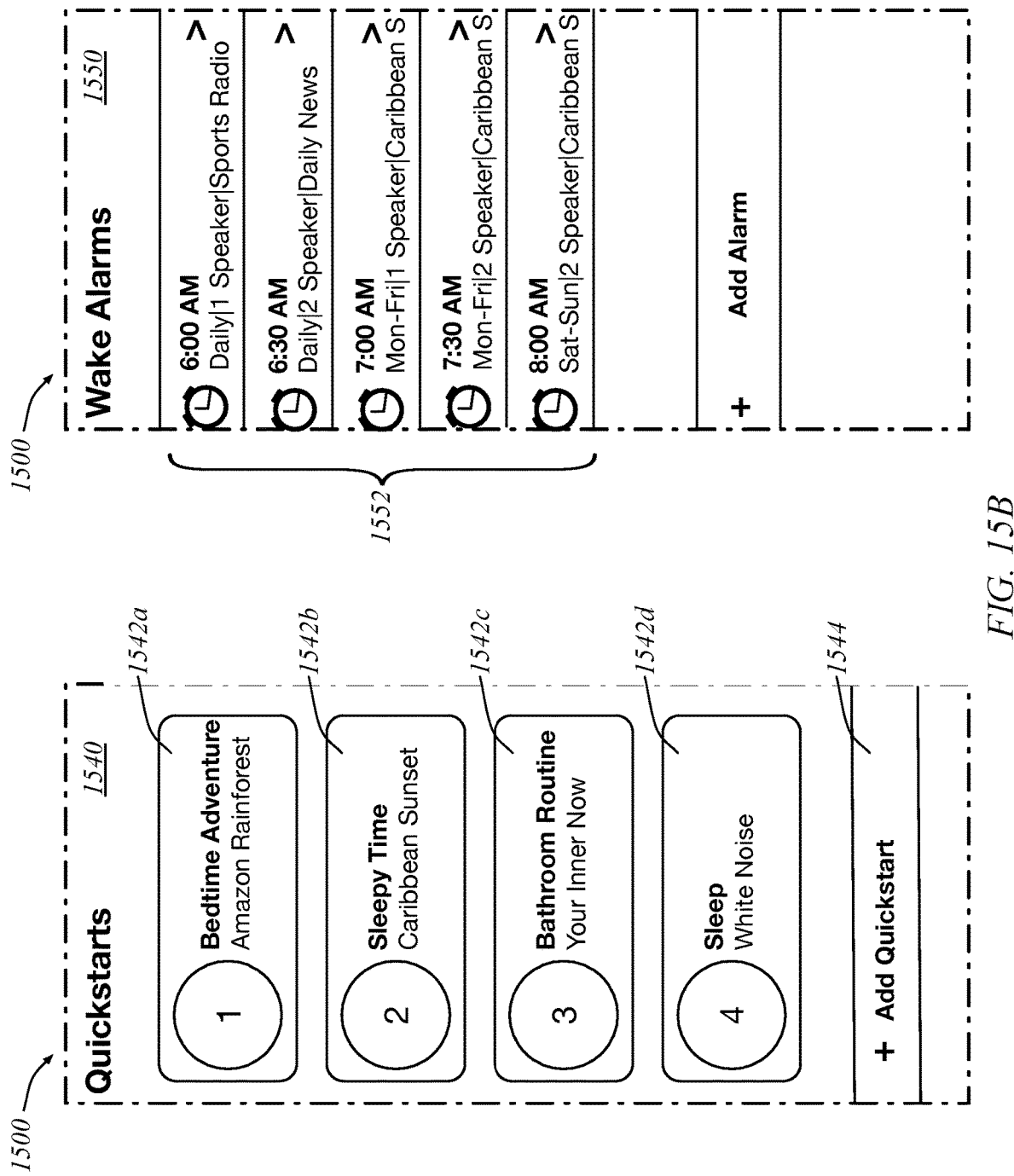

FIG. 15A and FIG. 15B show a schematic diagram of another playback mode user interface 1500. Rendered view 1510 comprises a browse page that allows a user to select between a number of different services and playback device experiences. One of the listed experiences, comprises a "Sonos Sleep" experience 1512 which is associated with a sleep playback mode.

Upon selecting the "Sonos Sleep" experience 1512, rendered view 1520 is displayed to the user. Rendered view 1520 comprises a "Nighttime Mode" portion 1522, a "Quickstarts" portion 1524, and a "Wake Alarms" portion 1526. In the depicted embodiment, rendered view 1520 also includes various media content options 1528 for a user to access. The depicted Nighttime Mode" portion 1522 displays information about the trigger conditions associated with the sleep playback mode (i.e., "9:00 PM-6:00 AM")

and information about the rooms that are affected by the sleep playback mode (i.e., "5 Rooms"). The "Quickstarts" portion 1524 displays information about the quickstart routines associated with the sleep playback mode (i.e., "5 Quickstarts"). The "Wake Alarms" portion 1526 displays information about the alarms associated with the sleep playback mode (i.e., "6 Alarms").

If a user selects the "Nighttime Mode" portion 1522, rendered view 1530 is displayed. Rendered page 1530 displays a visual depiction of a playback device 110*a* and a visual depiction of a user interaction 1532 on the playback device 110*a*. The user interaction 1532 may be displayed to indicate to a user that performing the displayed user interaction 1532 on a playback device 110*a* causes the sleep playback mode to advance between quickstart routines (e.g., a swipe across the top of the playback device). In some embodiments, the visual depiction of the playback device 110*a* is adjusted to match a particular playback device 110 that the user owns, has most recently interacted with, is most commonly interacted with within the sleep playback mode, or is otherwise associated with the user's current actions.

Rendered view 1530 provides a settings portion 1534 that allows a user to toggle on or off the "Nighttime Mode" (also referred to herein as a "sleep playback mode"), adjust the rooms that are associated with the sleep playback mode, and/or adjust the trigger conditions associated with the sleep playback mode (e.g., in this case the enter time of 9:00 PM and the exit time of 6:00 AM). Using these settings, a user can customize the playback devices that are associated with a playback mode (in the depicted embodiment, on a per-room basis) and the trigger conditions that affect the playback mode.

Returning to rendered view 1520, if a user selects the "Quickstarts" portion 1524, rendered view 1540 of FIG. 15B is displayed. Rendered view 1540 displays a list of quickstart routines 1542(*a-d*) that are associated with the sleep playback mode. Rendered view 1540 also displays an option for adding quickstarts 1544. In some embodiments, selecting a particular quickstart routine from the list of quickstart routines 1542(*a-d*) causes the quickstart routine to be executed. In some embodiments, selecting a particular quickstart routine from the list of quickstart routines 1542(*a-d*) causes a user interface to display settings and options associated with the quickstart routine. In some embodiments, a first type of interaction with a particular quickstart routine causes the particular quickstart routine to be executed, while a second type of interaction with a particular quickstart routine causes a user interface to display settings and options associated with the quickstart routine. For example, the first type of interaction may comprise a tap on a touch interface while the second type of interaction may comprise a long press.

Returning again to rendered view 1530, if a user selects the "Wake Alarms" portion 1526, rendered view 1550 of FIG. 15B is displayed. Rendered view 1540 displays various trigger conditions 1552 in the form of alarms that are associated with the sleep playback mode. Each of the depicted trigger conditions also displays information relating to the frequency of the trigger condition, the speaker(s) associated with each individual trigger condition, and the media content associated with each trigger condition. As depicted, in some embodiments, a single playback mode can be associated with multiple different trigger conditions that cause different subsets of playback devices to behave independently and differently from each other. For example, in the depicted playback mode every day at 6:00 AM one speaker will playback "Sports Radio" media content, and then at 6:30 AM two speakers will playback "Daily News" media content. In some embodiments, selecting a particular trigger condition within rendered view 1530 allows a user to change the settings associated with the trigger condition.

Figure 16:
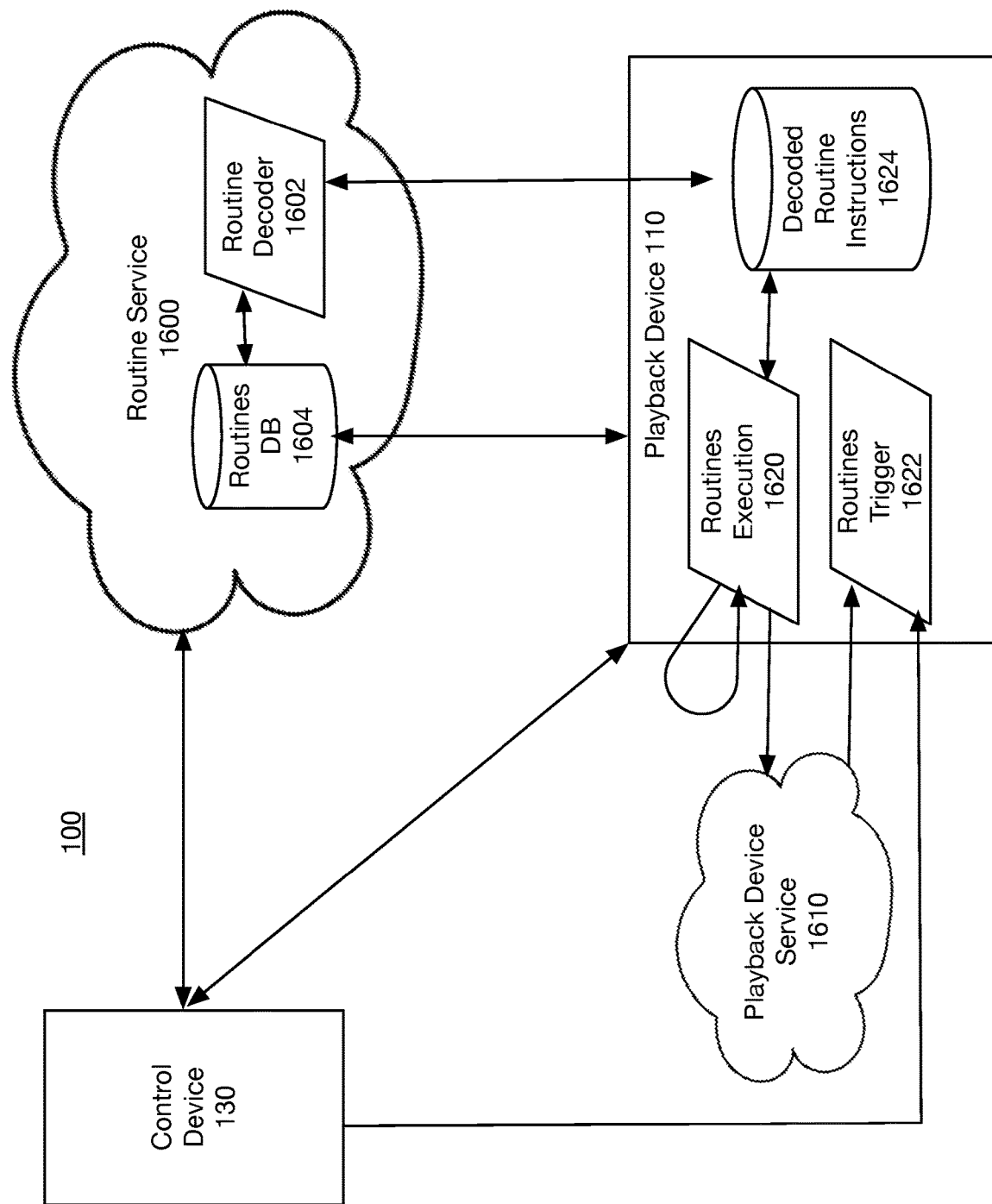
FIG. 16 is schematic diagram of media playback system in communication with cloud services.

FIG. 16 is schematic diagram of media playback system 100 in communication with cloud services 1600, 1614. In some embodiments, cloud network 102 comprises cloud services 1600, 1614. The depicted embodiment comprises a control device 130, a playback device 110, a routine service 1600, and a playback device service 1614. The control device 130 may be within the same local area network as the playback device 110 or remote to the playback device 110.

The playback device service 1614 provides network services for playback devices 110 and control devices 130 within a media playback system 100. The playback device service 1614 may be executed on a remote server and/or executed by local devices, such as control devices 130 and playback devices 110. For example, in some embodiments, a particular playback device 110*a* within a group of playback devices 110 may be designated as a "group coordinator." The group coordinator is tasked with receiving commands directed towards the group of playback devices 110 and communicating commands to group members. For example, the group coordinator may receive a command that is configured to cause a subset of playback devices within the group of playback devices 110 to playback particular media content. After receiving the command, the group coordinator sends out the commands to the subset of playback devices over the local area network. As an additional example, a user may tap a volume up button on a particular group member of the group of playback devices 110. The particular group member sends the volume up command instruction to the group coordinator over the local area network. In response, the group coordinator increases volume up for itself and sends out an instruction, over the local area network, to all group members to increase volume. In some embodiments, playback devices and control devices may belong to common group, and either a playback device or a control device can function as a group coordinator.

In some embodiments the playback device service 1614 comprises local network services such as uPNP or other local network APIs. The playback device service 1614 may communicate commands and information between playback devices 110 and control devices 130. For instance, a particular trigger condition may comprise user interaction with a control surface on a playback device 110*a*. The playback device 110*a* may be bonded to other playback devices and/or a member of a zone, or group. In response to the user interaction, the playback device 110*a* communicates with the playback device service 1614 which communicates to any other bonded playback devices or playback devices 110 within the same zone or group.

In some embodiment, routines are decoded by a routine decoder 1602 running at the routine service 1600. The routine decoder 1602 may comprise purpose-built hardware and/or executable software that is configured to translate the routines from a first form to a second form. For example, the routine decoder 1602 may translate inputs provided by a user in a configuration interface 900 into a routine that is at least partially executable. In some embodiment, variables are inserted into the partially decoded routine at the time of translation or at some other time after the routine is partially decoded. The routine decoder 1602 may generate instructions that are executable at a control device 130, at a routine service 1600, at a playback device 110, at a playback device service 1614 or at some other device within a media playback system 100. In some embodiments, the decoding is stateless and utilizes the routines database 1604 for base definitions and a hardcoded mapping to the commands that are executable at the one or more playback devices 110. As used herein, unless specified otherwise, a "routine" refers to routines that have not been encoded, routines that have been encoded, and routines that have been partially encoded.

In the embodiment depicted in FIG. 16, the one or more routines are executed 1620 by one or more processors at the playback device 110. The playback device 110 may receive a routine trigger 1622 from a control device 130, from the playback device service 1614, through direct interaction with the playback device 110 itself, or from the routine service 1600. One or more playback devices 110 may also comprise a database of decoded routine instructions 1624.

In some embodiments, each playback device 110 within a media playback system 100 comprise the database of decoded routine instructions 1624. In contrast, in some embodiments only a portion of the playback devices 110 within the media playback system 100 comprise the database of decoded routine instructions 1624. For example, in some embodiments, one or more playback devices 110 function as caches for other playback devices 110 within the media playback system 100. For example, 'RHTTPCache' may be utilized for edge-cache management. In such a configuration the playback device service 1614 functions to communicate routines between the playback devices 110 that do not comprise the database of decoded routine instructions 1624. Further, in some embodiments, the routines are executed by the one or more playback devices 110 that comprise the database of decoded routine instructions 1624. Those playback devices 110 then communicate commands through the playback device service 1614 directly to the other playback devices 110 to cause them to perform the commands from the routines.

In some embodiments, the routine definitions are stored in the routine services 1600 cloud network. In this embodiment, the routines are not executed directly by the routine services 1600 cloud network, nor are the routines accessed directly by the playback devices 110. Instead, the routines are decoded by the routine decoder 1602 into an intermediate routine comprising an executable instruction or a pointer to an executable instruction stored at the playback device 110 and a data structure, such as a JSON data structure, representing the executable instruction's parameters. This routine decoder 1602 may then communicate the decoded routine (i.e., the intermediate routine) to one playback device 110*a*. The playback device 110*a* may then store the decoded routine within the database of decoded routine instructions 1624 and communicate, through the playback device service 1614, the decoded routine to other playback devices 110 within the media playback system 100.

In some embodiments, the routine service 1600 serves as the source of truth for the routines within a media playback system 100. As such in some embodiments, the playback devices 110 and/or the control devices 130 communicate with the routine service 1600 to verify that they have the most up-to-date routines. In response, the routine service 1600 may communicate a single hash of all the decoded routines that are associated with a given media playback system to the requesting device. For instance, the routine service 1600 may generate a new hash of all of the decoded routines stored within its routines database 1604 for a given media playback system 100. When a device associated with that media playback system 100 queries the routine service 1600, the routine service 1600 communicates the hash to the device. The device then compares the received hash to a hash that the device generated for the routines stored within the database of decoded routine instructions 1624. If the hashes do not match, the device requests updated routines from the routine service 1600.

In contrast, in some embodiments, the routine service 1600 generates a unique hash for each decoded routine that it sends to a media playback system 100. The unique hashes are stored in the routines database 1604 with the routines. The routine service 1600 may communicate these hashes to a device (e.g., playback device) within a media playback system 100. The device can then compare hashes of routines that are stored within the database of decoded routines instructions 1624 with the received hashes. If any hashes do not match, the playback devices 110 request the routines associated with the mismatched hashes.

In some embodiments, the playback devices 110 and/or control devices 130 are configured to periodically query the routine service 1600 to verify the status of their routines. Additionally or alternatively, in some embodiments, the routine services 1600 is configured to send a notification to the playback devices 110 and/or control devices 130 when an update occurs within the routines database 1604.

Additionally, in some embodiments, prior to executing a routine, playback devices 110 are configured to first verify the status of the routines stored within the database of decoded routines instructions 1624. If the playback devices 110 are not able to connect to the routine service 1600, the playback devices 110 may query other devices within the media playback system 100. The other devices may communicate one or more hashes associated with the routines that they have respectively stored. If the hashes match, the playback devices 110 may proceed with executing the routine. Additionally or alternatively, if the playback devices 110 are not able to contact the routine services 1600, the playback devices 110 may communicate a message to a user that the routines are not available.

As discussed above, in some embodiments, one or more playback devices 110 implement local-area network cache for the routines. In some embodiments, a control device 130 may request updates for routines from the cache that is implemented by the one or more playback devices 110. The cache may comprise data stored within the database of decoded routine instructions 1624.

Figure 17A:
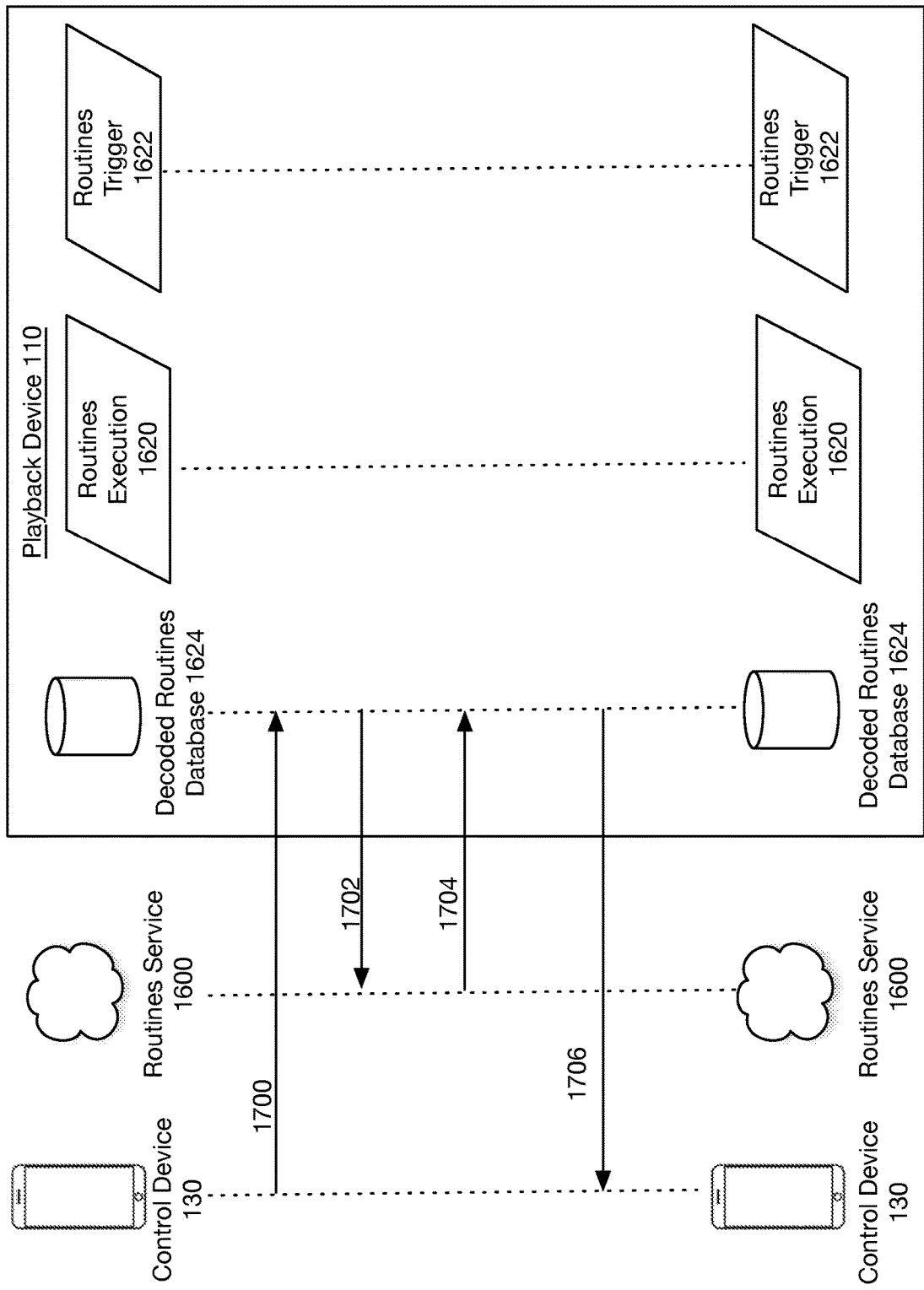
FIGS. 17A-17C are message flow diagrams of a media playback system in communication with cloud services.

FIG. 17A is a message flow diagram of a media playback system 100 in communication with a cloud service as depicted in FIG. 16. FIG. 17A depicts initial communications between a control device 130, a routine service 1600, and one or more playback devices 110 within a media playback system 100. An initial communication 1700 comprises a control device 130 requesting a list of playback modes or routines (also referred to as scenes) from the decoded routines database 1624 (also referred to as the "database of decoded routines instructions 1624") at the one or more playback devices 110.

In some embodiments, communication 1700 comprises an identification associated (e.g., account ID, user ID, household ID, system ID) with the particular playback system 100 and a request for a "RoutlineList" that is associated with the identification. In some embodiments, each routine is associated with its own routine ID that can be used within a playback system 100 to track and identify specific routines. For example, a playback device 110 may request an entire list of routines associated with a particular user or household by communication a user ID or household ID to routines service 1600. Similarly, a playback device 110 may be able to request a single routine from the routines service 1600 by communicating a routine ID associated with the desired routine. In some embodiments, to request a particular routine, a playback device 110 communications a user ID or a household ID along with the routine ID to the routine service 1600. The routine service 1600 uses the user ID or household ID to identify the correct set of routines, and then uses the routine ID to select the correct routine. Additionally or alternatively, in some embodiments, communication 1700 comprises an identification associated with the particular playback system 100, a request for a "RoutlineList" that is associated with the identification, and a "Type" variable that indicates the type of routines that are being requested. For instance, the particular playback system 100 may be associated with multiple different users, each with their own routines. Each user may be represented by a different "Type" variable that allows communication 1700 to request the specific routines associated with a particular user. The "Type" variable may also be associated with sets of routines for specific zones, groups, geographic locations, playback device configurations (e.g., bonded pairs, home theater system, etc.), usage context (e.g., commercial, business, hotel, restaurant), and other types of groupings.

In response to communication 1700, the one or more playback devices 110 send a communication 1702 to the routine service 1600 to request the current routines stored by the routine services 1600 within the routine database 1604. As explained above, communication 1702 may be requesting a verification, such as a hash, to verify that the routines stored in the decoded routines database 1624 are up-to-date. Additionally or alternatively, communication 1702 may be requesting that the routine service 1600 communicate all or a portion of the routines in the routines database 1604 to the one or more playback devices 110.

In response to communication 1702, the routine service 1600 sends communication 1704 to the one or more playback devices 110. In the case that communication 1704 comprises a validation, such as a hash, the playback devices 110 verifies that the routines stored in the decoded routines database 1624 are up-to-date. If the routines are determined to not be up-to-date, the one or more playback devices 110 request the necessary routines in order to update the routines stored within the decoded routines database 1624. In the case that communication 1704 comprises decoded routines, the one or more playback devices 110 store the decoded routines within the decoded routines database 1624.

Additionally, the one or more playback devices 110 send communication 1706 to the control devices. In some embodiments, communication 1624 comprises descriptions and/or names of the routines but does not include executable instructions. In contrast, in some embodiments, communication 1624 comprises the decoded routines with their associated executable instructions.

Figure 17B:
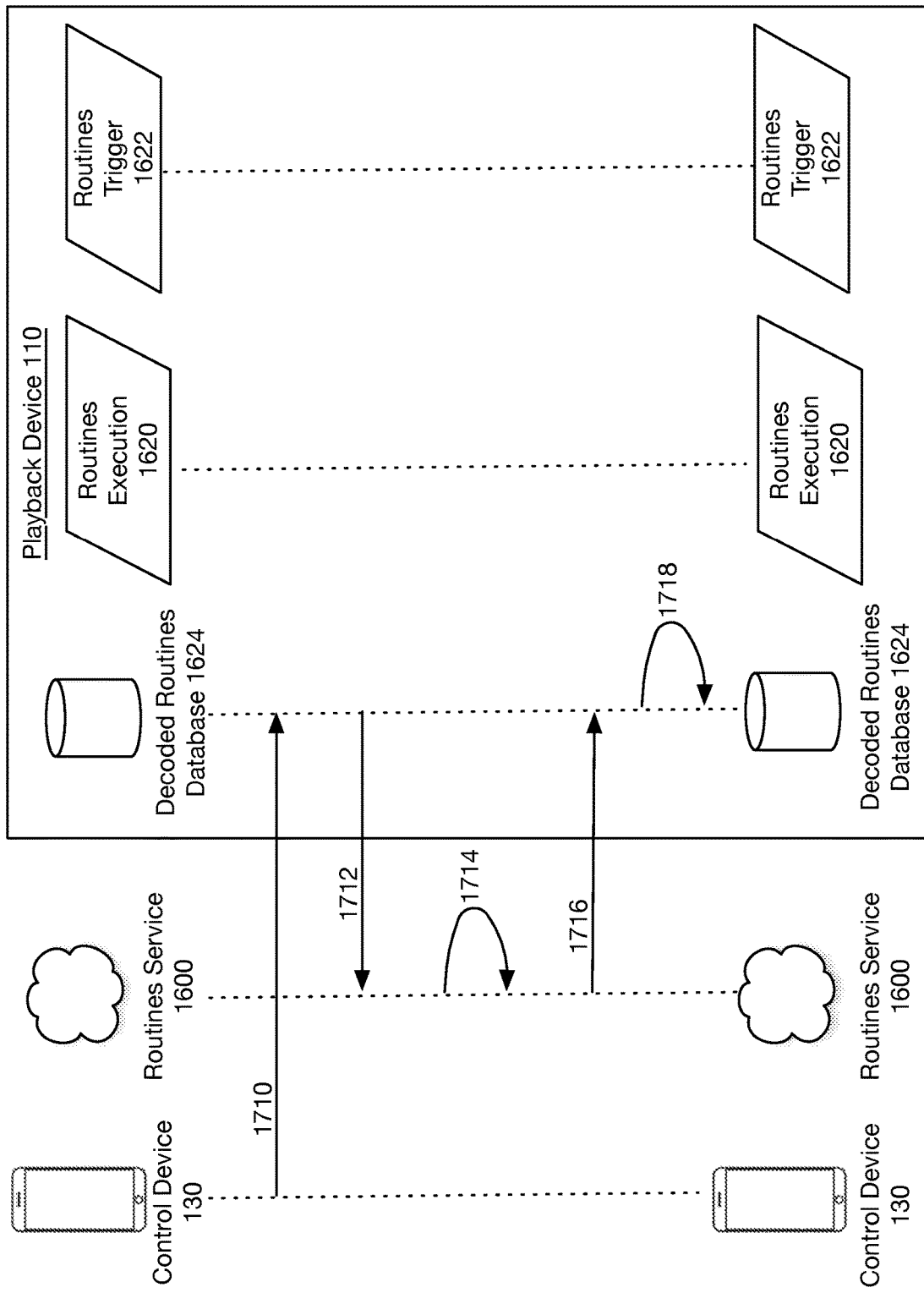

FIG. 17B depicts communications between a control device 130, a routine service 1600, and one or more playback devices 110 related to creating or editing a routine within a media playback system 100. Communication 1710 is generated by the control device 130 in response to a user editing or creating a routine. The process for editing or creating routines is described above with respect to FIGS. 9A-9D.

As an example, a user may provide the following intents while creating or editing a routine on the control device 130: (1) Set initial volume to 20, (2) Start playing Sleep Playback Mode: The Neighbor's Dog Finally Shut Up, (3) Ramp volume to 5 over the next 30 minutes, and (4) Stop after 60 minutes (from when content playback started). The control device 130 maps these user intents to a data structure that is communicable within the playback system 100. For example, the control device 130 may generate a JSON data structure in the following form: {"id": <something_generated>, "contentUri": "x-sonosapi-radio:sonos%3a1234", "initialVol": 20, "rampToVol": 5, "rampToVolOverTime": 30, "duration": 60}.

Communication 1710 is sent to the playback device 110 for initial storage in the decoded routines database 1624. In some embodiments, a newly created or modified routine has not yet been decoded, so the newly created or modified routine is stored at the playback device 110 until decoding is complete.

After receiving communication 1710, the one or more playback devices 110 send communication 1712 to the routine service 1600. Communication 1712 may comprise the routine or a description of the routine as provided by the control devices 130. For example, communication 1712 may comprise the JSON structure described above, the user intents described above, or some other data structure describing or configured to implement the user intents. In some embodiments, the control device 130 may further configure the data structure received in communication 1710 before sending it to the routines service 1600. For example, the control device 130 may be a group coordinator for a group of playback devices. The control device 130 may add information to the data structure relating to other group members, such as bonded playback devices 110.

Message 1714 comprises an internal message within the routines service 1600. In particular, message 1714 is sent by the routine services 1600 to the routine decoder 1602 for decoding. During decoding, the routines service 1600 may process the received data structure and add commands and information specific to the playback system 100 that will be executing the routine. For example, routine services 1600 may add information relating to groups, group coordinators, bonded playback devices, and other similar information to the routine.

In some embodiments, the decoding is stateless and utilizes the routines database 1604 for base definitions and a hardcoded mapping to the commands that are executable at the one or more playback devices 110. Accordingly, the routines services 1600 may decode the routine by analyzing the data structure and mapping information within the data structure to commands within the routines database 1604. For instance, the data structure may comprise an entry of ""rampToVolOverTime": 30". The routines service 1600 may map the data entry "rampToVolOverTime" to a particular command or set of commands for adjusting volume at one or more playback devices 110 over time. The routines service 1600 may further map the variable "30" to the same particular command or set of commands. As such, in some embodiments, the routines services 1600 decoding function comprises mapping information within the data structure received in communication 1712 to commands and variables stored within the routines database 1604 and generating a resulting routine that is executable at a playback device 110.

Once the routine has been transformed into a decoded routine, the routine service 1600 sends communication 1716 to the playback device. Communication 1716 may comprise the decoded routine. In some embodiments, the decoded routine comprises an ordered list of commands that are executable by one or more playback devices 110. For example, the decoded routine may comprise an ordered list of (1) a command to set a particular volume, (2) specific content to play, (3) a command to ramp volume, (4) a command to load a particular queue from the cloud. In an additional or alternative embodiment, the decoded routine may comprise executable code that is directly executable by one or more playback devices.

After receiving communication 1716, the one or more playback devices 110 stores the decoded routine within the decoded routines database 1624. The one or more playback devices 110 may also delete the newly created or modified routine that had been received in message 1710.

Message 1718 comprise an internal communication with the one or more playback devices 110. In particular, after receiving the decoded routine the one or more playback devices 110 generate a file to be shared within a local cache or to be shared with other playback devices 110 and/or control devices 130 within the media playback system 100. The generated file may be communicated through the one or more playback devices 110 pushing the updated file to the other playback devices 110 and/or control devices 130 or the other playback devices 110 and/or control devices 130 may query the one or more playback devices 110 for the file. Additional details regarding caching and sharing data within playback system 100 can be found, for example, in U.S. Pat. No. 10,747,493, which was incorporated by reference above.

In view of the above, one of skill in the art will appreciate that in some embodiments the control device 130 may send communication 1710 directly to the routines service 1600. The routines service 1600 may then decode 1714 the received routine and communicate the executable routine 1716 to the playback devices 110.

Figure 17C:
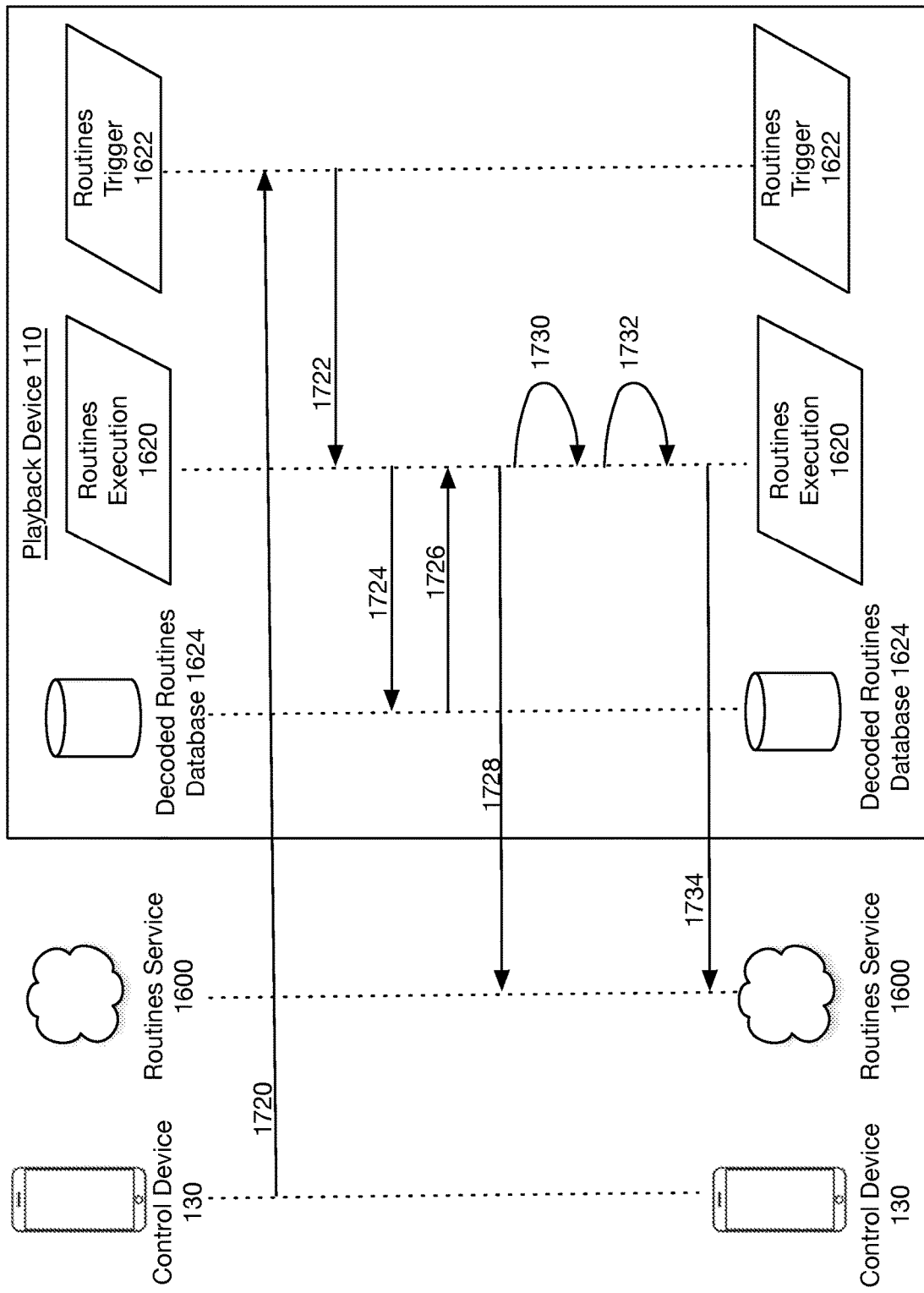

FIG. 17C depicts communications between a control device 130, a routine service 1600, and one or more playback devices 110 in response to detecting a trigger condition within a media playback system 100. In this embodiment, control device 130 generates communication 1720 in response to detecting a trigger condition. However, in view of the disclosure, one will appreciate that this is merely exemplary and that trigger conditions can be detected by the routine service 1600 or by the one or more playback devices 110. Communication 1720 is sent to the routines trigger function 1622 within the one or more playback devices 110.

The routines trigger function 1622 associates the detected trigger condition with a particular routine. In some embodiments, the particular routine comprises a routine associated with a playback mode, which when executed causes the one or more playback devices 110 to enter the playback mode. Additionally, in some embodiments, the routines trigger function 1622 accesses a list that associates different trigger functions with different routines.

The routine trigger function 1622 sends communication 1722 to the routines execution function 1620. Communication 1722 may comprise an identifier for the routine that is associated with the detected trigger condition. After receiving communication 1722, the routines execution function 1620 sends communication 1724 to the decoded routines database 1624. Communication 1722 may comprise an identifier for the desired routine. After receiving communication 1724, the decoded routines database 1624 sends the decoded routine to the routines execution function 1620 within communication 1726.

After receiving the communication 1726, the routine execution function 1620 sends communication 1728 to the routine service 1600. Communication 1728 may comprise instructions that the particular routine has been executed. Communication 1728 may allow third-party devices to respond to the execution of routines within the media playback system 100. For example, third-party devices may also be in communication, through an API, with the routine service 1600. Third-party devices may be able to register with the routine service 1600 in relation to particular routines. For instance, a user may be able to dim her bedroom lights with a routine. When the routine was executed by the routines execution function 1620, message 1028 would communicate the execution of the routine to the routine service 1600. Software associated with the third-party light system within the user's room would then receive a notification that the routine had been executed. In response, the third-party light system could cause the lights in the user's bedroom to dim.

After sending message 1728, the routines execution function 1620 performs a variable substitution in message 1730. Specifically, the decoded routines stored in the decoded routines database 1624 may be configured to allow for variable substitution by the executing one or more playback devices 110. The variable substitution may relate to variables that are local to the one or more playback devices 110, such as configurations of the one or more playback devices 110 and/or configurations of the media playback system 100.

Message 1732 represents the execution of the decoded routine by the routines execution function 1620. Once execution has completed, the routines execution function 1620 communicates message 1734 to the routines service 1600. Message 1734 comprises a message to the routine service 1600 that the execution of the particular routine has completed. Similar to message 1728, this information may be utilized by third-party devices to integrate with the media playback system 100. For instance, upon receiving a notification that the particular routine has completed, the third-party light system may cause the user's bedroom lights to return to their original brightness level.

Figure 18:
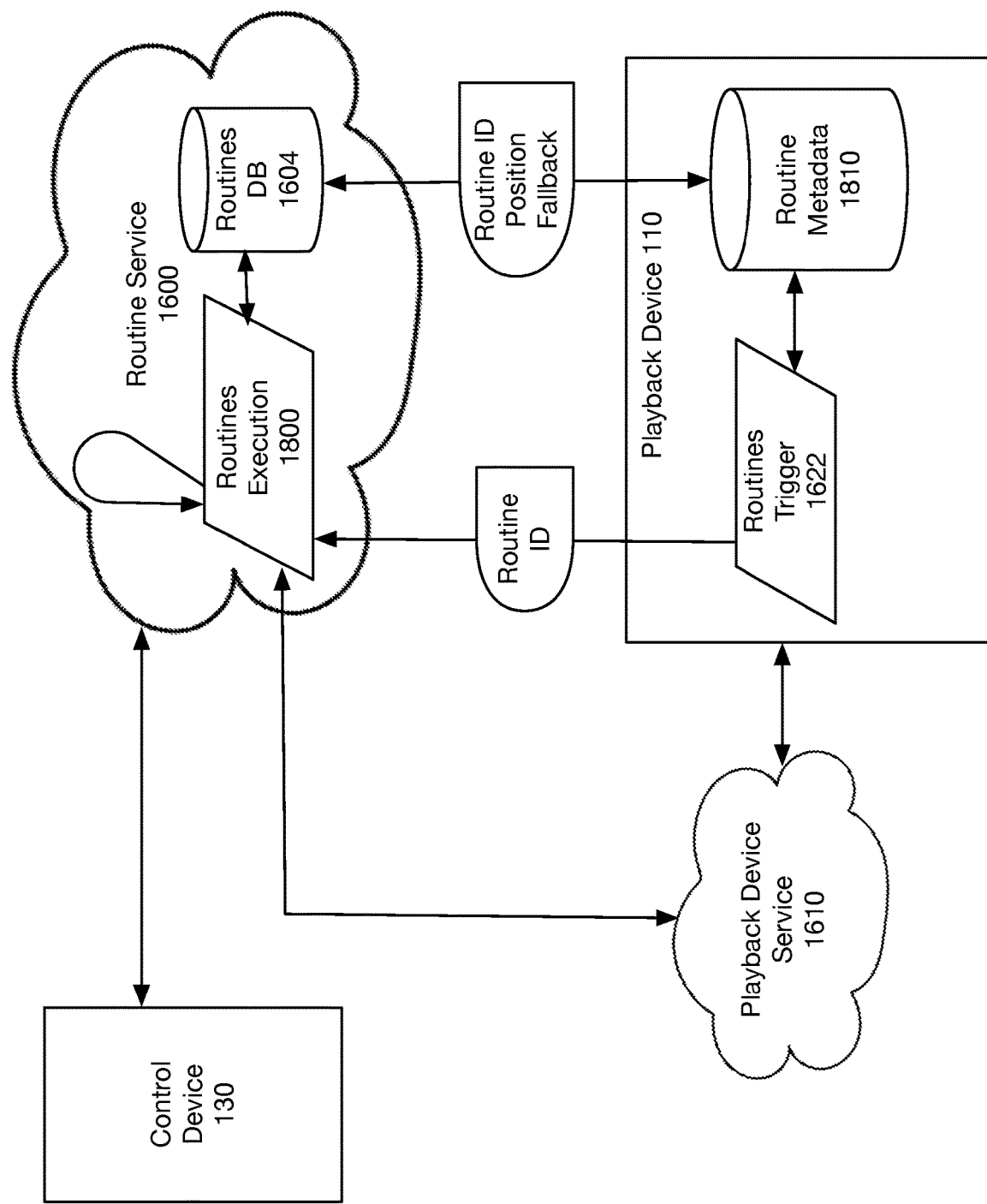
FIG. 18 shows a schematic diagram of a media playback system. in communication with cloud services

FIG. 18 shows a schematic diagram of a media playback system where the routines are executed by the routine service 1600. In some embodiments, the one or more playback devices 110 comprise a routines trigger function 1622 that detect the occurrence of a trigger condition at the one or more playback devices 110. For example, the routine trigger function 1622 can detect when a user interacts with a user interface at the one or more playback devices 110 in a way that triggers a routine.

When a trigger condition is detected by the one or more playback devices 110 or by the control device 130, the trigger condition is communicated to the routine service 1600 for processing. Once a trigger condition is received, the routine service 1600 identifies the associated routine in the routines database 1604. The routines execution function 1800 then executes the routines directly within the routine service 1600. Commands that are related to the routine are issued by the routine service 1600 directly to the one or more playback devices 110 or to the playback device service 1614, which then communicates the commands to the one or more playback devices 110. Upon receiving and executing the commands, the one or more playback devices 110 store metadata related to the routine in a routine metadata database 1810. One will appreciate that in this embodiment, the processing power used to execute the routines is hosted at the routine service 1600, which may comprise one or more servers. As such, the one or more playback devices 110 are protected from a potentially heavy processing load that may be associated with executing routines locally.

In some embodiments, the routine execution function 1620, 1800 may be hosted by the control device 130. The control device 130 may then execute one or more routines and communicate commands directly to the one or more playback devices 110 and/or routine service 1600. Additionally or alternatively, once a user has finished modifying or creating the routines, or scenes, the control device 130 may communicate the routines to a remote server for storage and/or further processing. In some embodiments, the one or more routines are executed at least in part by the one or more playback devices 110, at least in part by the control device 130, or at least in part by server that is remote to the control device. For instance, the control device 130 may be configured to generate executable instructions from the routines by at least partially decoding the routines using at least one processor at the control device 130. Further, the control device 130 may be configured to communicate the executable instructions (also referred to herein at "decoded routines" or "intermediate routine") to the appropriate playback device 110 in response to receiving an indication of a trigger condition.

Figure 19:
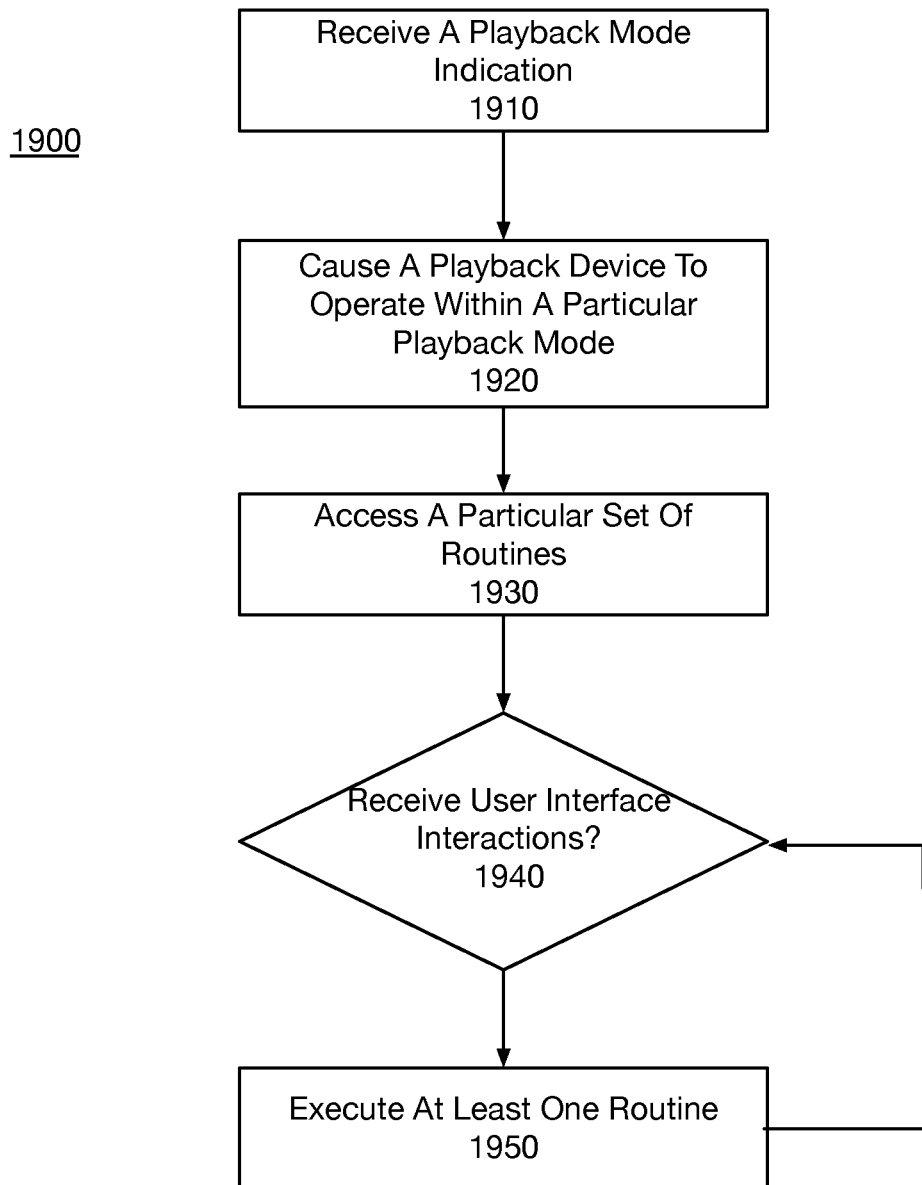
FIG. 19 shows a flow diagram for operating a playback device within a playback mode.

FIG. 19 shows a flow diagram 1900 for operating a playback device 110 within a playback mode. At step 1910 the playback device 110 receives a playback mode indication. At step 1920, after receiving a playback mode indication, the playback device 110 is caused to operate within a particular playback mode. FIGS. 8A and 8B, among other portions of this disclosure, depict a playback device 110 operating within a particular playback mode.

At step 1930 after initiating operation of the particular playback mode, the playback device 110 accesses a particular set of routines that is associated with the particular playback mode. The particular set of routines are configured such that when they are executed, they cause the playback device to play back particular media content with a particular user-defined acoustic parameter. Additionally, the particular set of routines are configured such that when they are executed, they configure the playback device to advance between one or more routines within the particular set of routines in response to one or more user interface interactions. For example, FIGS. 8A and 8B depicts an ordered set of routines 820(a-f) that may cause the playback devices 110 to play media content. Additionally, FIGS. 8A and 8B depict a user interface interaction 830 that causes the playback device 110 to advance between different routines.

At step 1940, the playback device 110 receives the one or more user interface interactions at a user interface associated with the playback device 110. For example, in FIG. 8B the playback device 110 receives the one or more user interface interactions 830 at a user interface (e.g., the control surface 313) in the form of a button swipe.

At step 1950, the playback device 110 executes at least one routine selected from the particular set of routines. In some embodiments, the playback device 110 will sequentially execute each routine within an ordered set of routines. Additionally, or alternatively, the control device may receive an additional user interface interaction which causes the playback device 110 to advance sequentially to the next routine within the ordered set of routines.

Figure 20:
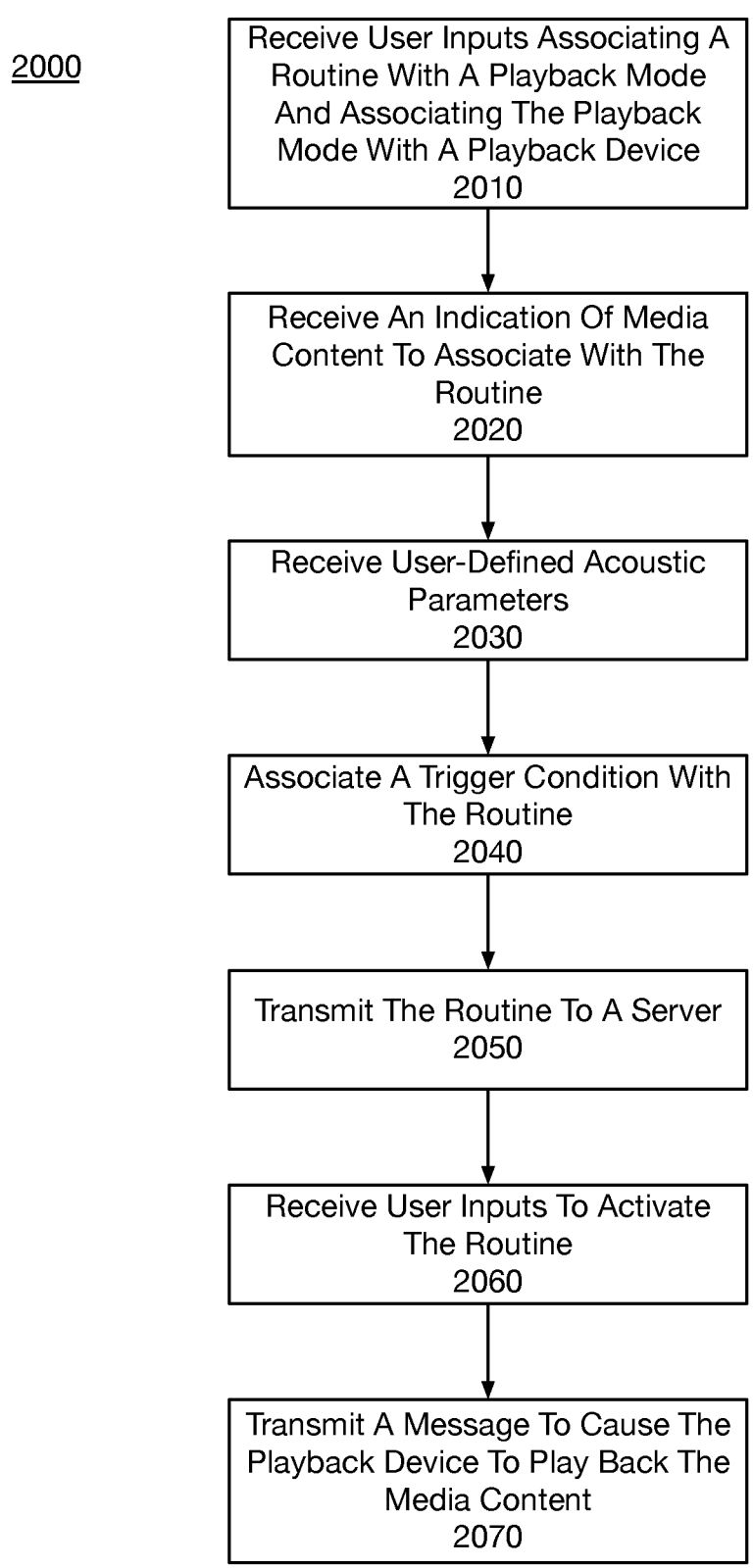
FIG. 20 shows a flow diagram for configuring a playback mode at a control device.

FIG. 20 shows a flow diagram 2000 for configuring a playback mode at a control device 130. At step 162010, the control device 130 receives, via a configuration interface 900, one or more first user inputs associating a particular routine with a particular playback mode and associating the particular playback mode with one or more playback devices 110. For example, FIGS. 9A-9E depict various different configuration interfaces 900(a-e) that illustrate different examples of associating routines with playback modes and playback modes with playback devices 110.

At step 2020, the control device 130 receives an indication of a particular media content to associate with the particular routine. For example, in FIG. 9A a first routine 922a is associated with the media content of "Seattle Rainfall." At step 2030, the control device 130 receive one or more user-defined acoustic parameters for the particular media content. The one or more user-defined acoustic parameters are configured to cause the one or more playback devices to play back the particular media content in accordance with the one or more user-defined acoustic parameters. For example, in FIG. 9A the configuration interface 900a provides options for a user to set one or more exemplary user-defined acoustic parameters related to the "volume" and "rain speed" of the "Seattle Rainfall" media content.

At step 2040, the control device 130 associates a particular trigger condition with the particular routine. The particular trigger condition comprises a condition that causes the particular routine to be executed. For example, in FIG. 9A a trigger condition field 930a allows a user to set an alarm that will cause the triggering of the first routine within the playback mode. One will appreciate, however, that the setting of the alarm is merely exemplary and that additional or alternative embodiments may allow a user to set a particular button press, a geolocation, or a number of other trigger conditions.

At step 2050, the control device 130 transmits, via the communication interface, the particular routine to a server remote from the control device 130. For example, in FIG. 17B the control device 130 communicates routines to the routine services 1600. At step 2060, the control device 130 receives one or more second user inputs to activate the particular routine. For example, in FIG. 8B the one or more playback devices 110 receives the one or more user interface interactions 830 (also referred to herein as "user interface inputs") at a user interface (e.g., the control surface 313) in the form of a button swipe.

After receiving the one or more second user inputs, at step 2070 the control device 130 transmits a message that causes the one or more playback devices 110 to play back the particular media content according to the one or more user-defined acoustic parameters. For example, in FIGS. 10-12 different examples are depicted of the control device 130 communicating messages that cause the one or more playback devices 110 to play back the particular media content according to the one or more user-defined acoustic parameters.

V. Conclusion

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

As discussed above, playback modes may comprise sets of routines that cause one or more playback devices to function in specified manners. In particular, the playback modes may cause user interfaces to operate in a specific manner that causes the one or more playback devices to advance within a given set of routines. As discussed above, a variety of different devices and intermediary devices may perform communication functions, decoding functions, execution functions, configuration functions, and other functions related to the routines and playback modes.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

What is claimed is:

1. A control device comprising:
a communication interface;
at least one processor; and
at least one non-transitory computer-readable medium comprising program instructions that are executable by the at least one processor such that the control device is configured to:
receive, via a configuration interface, one or more first user inputs associating a particular routine with a particular playback mode and associating the particular playback mode with one or more playback devices;
receive an indication of a particular media content to associate with the particular routine;
receive one or more user-defined acoustic parameters for the particular media content, wherein the one or more user-defined acoustic parameters are configured to cause the one or more playback devices to play back the particular media content in accordance with the one or more user-defined acoustic parameters;
associate a particular trigger condition with the particular routine, wherein the particular trigger condition comprises a condition that causes the particular routine to be executed;
transmit, via the communication interface, the particular routine to a routine service on a server remote from the control device, wherein the routine service is configured to verify that the one or more playback devices have access to the particular routine;
receive one or more second user inputs to activate the particular routine; and
after receiving the one or more second user inputs, transmit a message that causes the one or more playback devices to play back the particular media content according to the one or more user-defined acoustic parameters.

2. The control device of claim 1, wherein the program instructions that are executable by the at least one processor such that the control device is configured to receive, via the configuration interface, the one or more first user inputs associating the particular playback mode with the one or more playback devices comprises program instructions that are executable by the at least one processor such that the one or more playback devices are configured to:
receive through the configuration interface the one or more first user inputs associating the particular playback mode with multiple playback devices, wherein the particular routine comprises:
instructions that are configured to cause the multiple playback devices to play the particular media content, and
one or more user-defined acoustic parameters that configure the multiple playback devices to play the particular media content in accordance with the one or more user-defined acoustic parameters.

3. The control device of claim 2, wherein the one or more user-defined acoustic parameters configure at least one playback devices selected from the multiple playback devices to play the particular media content in a different manner than at least one other playback device selected from the multiple playback devices.

4. The control device of claim 1, wherein the at least one non-transitory computer-readable medium further comprises program instructions that are executable by the at least one processor such that the control device is configured to:
display, via the configuration interface, a single user interface entity representative of a group of the one or more playback devices, wherein the group of the one or more playback devices are configured to play back the particular media content in synchrony.

5. The control device of claim 4, wherein the program instructions that are executable by the at least one processor such that the one or more playback devices are configured to transmit a message that causes the one or more playback devices to playback the particular media content according to the one or more user-defined acoustic parameters comprises program instructions that are executable by the at least one processor such that the control device is configured to:
transmit the message that causes the group of the one or more playback devices to playback the particular media content according to the one or more user-defined acoustic parameters.

6. The control device of claim 5, wherein the at least one non-transitory computer-readable medium further comprises program instructions that are executable by the at least one processor such that the control device is configured to:

display, via the configuration interface, a setting for the one or more user-defined acoustic parameters that causes at least one play back device within the group of the one or more playback devices to play back the particular media content in a different manner than another playback device of the group of the one or more playback devices.

7. The control device of claim 1, wherein the at least one non-transitory computer-readable medium further comprises program instructions that are executable by the at least one processor such that the control device is configured to:
generate executable instructions by at least partially decoding the particular routine using the at least one processor; and
after receiving the particular trigger condition, communicate the executable instructions to the one or more playback devices.

8. The control device of claim 1, wherein the at least one non-transitory computer-readable medium further comprises program instructions that are executable by the at least one processor such that the control device is configured to:
receive, via a configuration interface, one or more third user inputs associating multiple routines with the particular playback mode; and
receive, via a configuration interface, one or more fourth user inputs ordering the multiple routines within an ordered set.

9. The control device of claim 1, wherein a particular trigger condition comprises the one or more second user inputs.

10. The control device of claim 1, wherein the particular routine is executed at least in part by the control device.

11. A computer-implemented method executed by a processor at a control device, the computer-implemented method comprising:
receiving, via a configuration interface, one or more first user inputs associating a particular playback mode with one or more playback devices;
receiving one or more user-defined acoustic parameters for particular media content that is associated with the particular playback mode, wherein the one or more user-defined acoustic parameters are configured to cause the one or more playback devices to play back the particular media content in accordance with the one or more user-defined acoustic parameters;
associating a particular trigger condition with the particular playback mode, wherein the particular trigger condition comprises a condition that causes the particular playback mode to be executed;
transmit a particular routine associated with the particular playback mode to a routine decoder on a server remote from the control device, wherein the routine decoder is configured to at least partially decode the particular routine for execution by the one or more playback devices;
receiving one or more second user inputs to activate the particular trigger condition; and
after receiving the one or more second user inputs, transmitting a message that causes the one or more playback devices to play back the particular media content according to the one or more user-defined acoustic parameters.

12. The computer-implemented method of claim 11, further comprising:
receiving through the configuration interface the one or more first user inputs associating the particular playback mode with multiple playback devices, wherein the particular routine comprises:
instructions that are configured to cause the multiple playback devices to play the particular media content, and
one or more user-defined acoustic parameters that configure the multiple playback devices to play the particular media content in accordance with the one or more user-defined acoustic parameters.

13. The computer-implemented method of claim 12, wherein the one or more user-defined acoustic parameters configure at least one playback devices selected from the multiple playback devices to play the particular media content in a different manner than at least one other playback device selected from the multiple playback devices.

14. The computer-implemented method of claim 11, further comprising:
displaying, via the configuration interface, a single user interface entity representative of a group of the one or more playback devices, wherein the group of the one or more playback devices are configured to play back the particular media content in synchrony.

15. The computer-implemented method of claim 14, wherein transmitting a message that causes the one or more playback devices to playback the particular media content according to the one or more user-defined acoustic parameters further comprises:
transmitting the message that causes the group of the one or more playback devices to playback the particular media content according to the one or more user-defined acoustic parameters.

16. The computer-implemented method of claim 15, further comprising:
displaying, via the configuration interface, a setting for the one or more user-defined acoustic parameters that causes at least one play back device within the group of the one or more playback devices to playback the particular media content in a different manner than another playback device of the group of the one or more playback devices.

17. The computer-implemented method of claim 11, further comprising:
generating executable instructions by at least partially decoding the particular routine using at least one processor at the control device; and
after receiving the particular trigger condition, communicating the executable instructions to the one or more playback devices.

18. The computer-implemented method of claim 11, further comprising:
receiving, via a configuration interface, one or more third user inputs associating multiple routines with the particular playback mode; and
receiving via a configuration interface, one or more fourth user inputs ordering the multiple routines within an ordered set.

19. The computer-implemented method of claim 11, wherein the particular routine is executed at least in part by the control device.

20. A non-transitory computer-readable storage media comprising computer-executable instructions that, when executed at a processor of a control device, cause the control device to:
receive, via a configuration interface, one or more first user inputs associating a particular playback mode with one or more playback devices;

receive one or more user-defined acoustic parameters for particular media content that is associated with the particular playback mode, wherein the one or more user-defined acoustic parameters are configured to cause the one or more playback devices to play back the particular media content in accordance with the one or more user-defined acoustic parameters;

associate a particular trigger condition with the particular playback mode, wherein the particular trigger condition comprise a condition that causes the particular playback mode to be executed;

receive one or more second user inputs to activate a particular routine, wherein the particular routine is associated with the particular playback mode; and after receiving the one or more second user inputs, transmit, to a routine service on a server remote from the control device, a message that causes the one or more playback devices to play back the particular media content according to the one or more user-defined acoustic parameters.

* * * * *